(12) United States Patent
Matsubayashi

(10) Patent No.: US 8,750,380 B2
(45) Date of Patent: Jun. 10, 2014

(54) TRANSMISSION APPARATUS, RECEPTION APPARATUS, FRAME RATE CONVERSION SYSTEM, AND FRAME RATE CONVERSION METHOD

(75) Inventor: Kei Matsubayashi, Kanagawa (JP)

(73) Assignee: Sony Corporation (JP)

( * ) Notice: Subject to any disclaimer, the term of this patent is extended or adjusted under 35 U.S.C. 154(b) by 992 days.

(21) Appl. No.: 12/450,350

(22) PCT Filed: Jan. 14, 2009

(86) PCT No.: PCT/JP2009/050389
§ 371 (c)(1),
(2), (4) Date: Sep. 9, 2010

(87) PCT Pub. No.: WO2009/093506
PCT Pub. Date: Jul. 30, 2009

(65) Prior Publication Data
US 2010/0329339 A1    Dec. 30, 2010

(30) Foreign Application Priority Data

Jan. 22, 2008 (JP) .................................. 2008-011870

(51) Int. Cl.
*H04N 7/12* (2006.01)
*H04N 11/02* (2006.01)
*H04N 5/14* (2006.01)
*H04N 7/00* (2011.01)
*G06F 3/14* (2006.01)
*H04N 21/41* (2011.01)
*G09G 5/00* (2006.01)
*H04N 21/4402* (2011.01)
*H04N 21/435* (2011.01)
*H04N 21/436* (2011.01)

(52) U.S. Cl.
CPC ......... *H04N 21/435* (2013.01); *G09G 2370/10* (2013.01); *G09G 2370/04* (2013.01); *G09G 2370/06* (2013.01); *G09G 2320/106* (2013.01); *G06F 3/1454* (2013.01); *H04N 21/4122* (2013.01); *G09G 5/006* (2013.01); *H04N 21/440281* (2013.01); *H04N 21/43615* (2013.01); *G09G 2370/12* (2013.01)
USPC ....................... 375/240.16; 348/571; 348/456

(58) Field of Classification Search
CPC ............ H04N 5/23232; H04N 7/0127; H04N 21/234381; H04N 7/468; H04N 1/32797; H04N 7/035; H04N 7/0255; H04N 7/083; H04N 7/08; H04N 7/066; H04N 21/43635
USPC .............................. 375/240.16; 348/571, 456
See application file for complete search history.

(56) References Cited

U.S. PATENT DOCUMENTS

| | | | |
|---|---|---|---|
| 2007/0211801 A1 | 9/2007 | Matsubayashi | |
| 2008/0151108 A1* | 6/2008 | Doswald | 348/456 |
| 2009/0153737 A1* | 6/2009 | Glen | 348/571 |

FOREIGN PATENT DOCUMENTS

| | | |
|---|---|---|
| EP | 1835746 A2 | 9/2007 |
| JP | 2007-274679 A | 10/2007 |
| JP | 2007-311884 A | 11/2007 |
| JP | 2008-061067 A | 3/2008 |

OTHER PUBLICATIONS

Hitachi et al : "HDMI Specification Version 1.3 a", Internet Citation, Nov. 10, 2006, XP 002476103.
Supplementary European Search Report EP 09703863, dated May 26, 2011.

* cited by examiner

*Primary Examiner* — Sath V Perungavoor
*Assistant Examiner* — Xiaolan Xu
(74) *Attorney, Agent, or Firm* — Lerner, David, Littenberg, Krumholz & Mentlik, LLP

(57) ABSTRACT

[Object] To provide a transmission apparatus, a reception apparatus, a frame rate conversion system, and a frame rate conversion method that are capable of transmitting reference control information even when a data amount of the reference control information is large.

[Solving Means] In a reproducing apparatus (151), a decode unit (152) decodes a certain amount of encoded video data. The decoded video data and reference control information (motion vector and identifier described above) obtained at a time of the decode are supplied to a transmission interface (153), and the transmission interface (153) transmits them to a display apparatus (161). The transmission interface (153) includes a first transmission channel for transmitting the decoded video data and a second transmission channel for transmitting the reference control information. Accordingly, a transmission data amount of the reference control information (per unit time) can be made larger than in a case where the reference control information is superimposed on a blanking area.

10 Claims, 27 Drawing Sheets

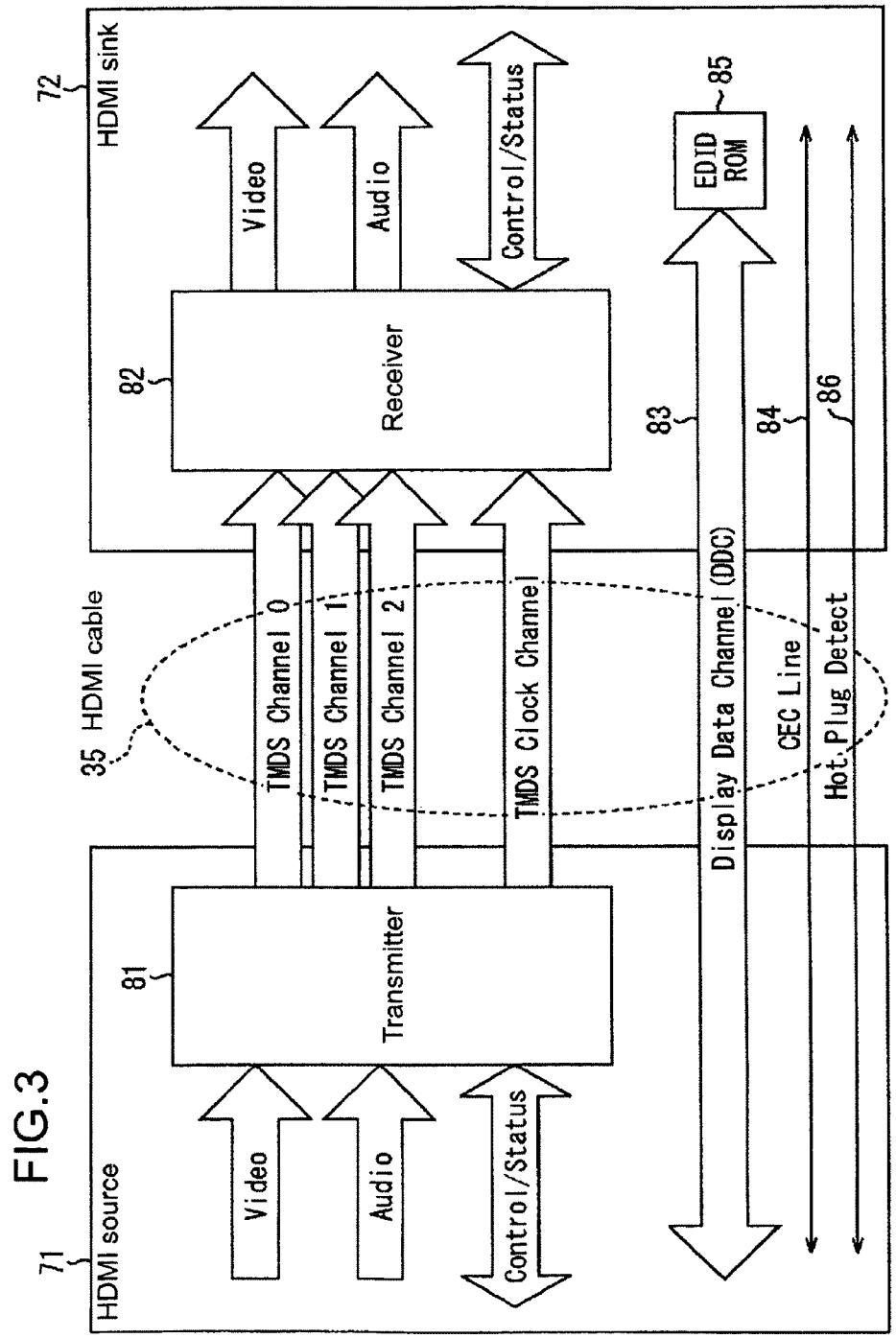

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved(N.C. on device) |
| 15 | SCL | 16 | SDA |
| 17 | DDC/CEC Ground | 18 | +5V Power |
| 19 | Hot Plug Detect | | |

HDMI pin assignment (in case of Type-A)

FIG.4

| PIN | Signal Assignment | PIN | Signal Assignment |
|---|---|---|---|
| 1 | TMDS Data2 Shield | 2 | TMDS Data2+ |
| 3 | TMDS Data2− | 4 | TMDS Data1 Shield |
| 5 | TMDS Data1+ | 6 | TMDS Data1− |
| 7 | TMDS Data0 Shield | 8 | TMDS Data0+ |
| 9 | TMDS Data0− | 10 | TMDS Clock Shield |
| 11 | TMDS Clock+ | 12 | TMDS Clock− |
| 13 | DDC/CEC Ground | 14 | CEC |
| 15 | SCL | 16 | SDA |
| 17 | Reserved | 18 | +5V Power |
| 19 | Hot Plug Detect | | |

HDMI pin assignment (in case of Type-C)

FIG.5

E-EDID data structure

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | Full Duplex | Half Duplex | Video Latency | | | | |
| 9 | Audio Latency | | | | | | | |
| 10 | | | | | | | | |
| 11 | Interlaced Video Latency | | | | | | | |
| 12 | Interlaced Audio Latency | | | | | | | |
| 13...N | Reserved (0) | | | | | | | |

E-EDID Vendor Specific Data Block Structure

FIG.9

TRANSMISSION APPARATUS, RECEPTION APPARATUS, FRAME RATE CONVERSION SYSTEM, AND FRAME RATE CONVERSION METHOD

CROSS-REFERENCES TO RELATED APPLICATIONS

The present application is a national phase entry under 35 U.S.C. §371 of International Application No. PCT/JP2009/050389 filed Jan. 14, 2009, published on Jul. 30, 2009 as WO 2009/093506 A1, which claims priority from Japanese Patent Application No. JP 2008-011870 filed in the Japanese Patent Office on Jan. 22, 2008.

TECHNICAL FIELD

The present invention relates to a frame rate conversion system, a frame rate conversion method, and a transmission apparatus and reception apparatus used in the system, for realizing a high frame rate of video data encoded using a motion vector.

BACKGROUND ART

For example, there is disclosed a technique of efficiently converting a frame rate when an apparatus that decodes an encoded video signal is separate from and an apparatus that displays the decoded video signal at a high frame rate (see, for example, Patent Document 1). It should be noted that in this frame rate conversion system, processing of converting the frame rate so as to increase it will be referred to as "high-frame-rating" hereinbelow.

Patent Document 1 shows an example in which a reproducing apparatus that decodes an encoded video signal is applied to, for example, a DVD player or a digital broadcast tuner, and an apparatus that receives it is applied to, for example, a receiver (display apparatus) that receives television broadcasts. As shown in FIG. 3 of Patent Document 1, a reproducing apparatus (1) and a display apparatus (5) are connected by a video cable (4).

In the reproducing apparatus (1), an encoder (3) superimposes reference control information that is output from a decoder (2) and includes at least a motion vector on a blanking area of a decoded video signal. In a reception equipment (5), a decoder (6) separates the reference control information from data in the blanking area of the video signal transmitted from the reproducing apparatus (1). Frame rate converters (7) to (11) perform high-frame-rating of the video signal by generating an interpolation frame using the reference control information.

Patent Document 1: Japanese Patent Application Laid-open No. 2007-274679 (paragraph [0031], FIG. 3)

DISCLOSURE OF THE INVENTION

Problem to be Solved by the Invention

However, an amount of data that can be incorporated in the blanking area cannot be said to be sufficient. For example, when transmitting large-volume video data, since an amount of reference control information of that video data also becomes large, a situation where the reference control information cannot be incorporated in the blanking area may occur.

In view of the circumstances as described above, an object of the present invention is to provide a transmission apparatus, a reception apparatus, a frame rate conversion system, and a frame rate conversion method that are capable of transmitting reference control information even when a data amount of the reference control information is large.

Another object of the present invention is to provide a transmission apparatus, a reception apparatus, a frame rate conversion system, and a frame rate conversion method that are capable of efficiently transmitting reference control information.

Means for Solving the Problem

For achieving the objects described above, according to the present invention, there is provided a transmission apparatus transmitting video data to a reception apparatus, including: a decode unit to decode encoded video data encoded by a compression coding method that uses a motion vector; and a transmission interface including a first transmission channel for transmitting the video data obtained by the decode to the reception apparatus and a second transmission channel for transmitting, to the reception apparatus, for the reception apparatus to generate an interpolation frame between frames of the video data and realize a high frame rate of the video data, reference control information that includes information on the motion vector and is obtained at a time the decode unit decodes the encoded video data.

For the reception apparatus to realize a high frame rate of the video data, the transmission apparatus transmits the reference control information including the information on the motion vector to the reception apparatus. The transmission apparatus includes the second transmission channel for transmitting the reference control information aside from the first transmission channel for transmitting the video data. Accordingly, the transmission apparatus can transmit a large amount of reference control information.

The second transmission channel is structured to be capable of performing one-way communication or bidirectional communication. When the second transmission channel is for bidirectional communication, either one of a half-duplex communication system and a full-duplex communication system may be adopted as a communication system thereof. In this case, a communication protocol is typically the Ethernet (registered trademark), but other protocols may be used instead.

The transmission apparatus further includes a superimposition unit to superimpose the reference control information on a blanking area of the video data obtained by the decode, and a control means for making a switch between processing of superimposing the reference control information on the blanking area by the superimposition unit and transmission processing of the reference control information from the second transmission channel. Accordingly, the transmission apparatus can superimpose the reference control information on the video data and transmit the superimposed video data to the reception apparatus from the first transmission channel.

The control means includes a judgment means for judging whether a data amount of the reference control information exceeds an allowable data amount of the reference control information that can be superimposed on the blanking area, and means for switching, when the data amount of the reference control information exceeds the allowable data amount, the superimposition processing by the superimposition unit to the transmission processing of the reference control information from the second transmission channel. Accordingly, the transmission apparatus can efficiently transmit the reference control information.

In the transmission apparatus, the control means includes a judgment means for judging whether a congestion is caused in a network between the second transmission channel and the reception apparatus, and means for switching, when the congestion is caused, the transmission processing of the reference control information from the second transmission channel to the superimposition processing of the reference control information by the superimposition unit. Accordingly, the reference control information can be transmitted efficiently.

The judgment on whether a congestion is caused only needs to be made based on a packet loss count or rate, a delay time, and the like. Alternatively, the judgment on whether a congestion is caused may be executed by other well-known methods. Moreover, the transmission apparatus may be customizable such that a definition of a congestion can be selected or set by a user.

For example, the reference control information includes, in addition to the motion vector, an identifier that indicates a form of a predictive compensation and an identifier that indicates a display order of the decoded video data.

The transmission interface is, for example, an HDMI (High Definition Multimedia Interface). In this case, the second transmission channel may correspond to at least one line out of a reserved line, an HPD (Hot-Plug Detect) line, an SCL (Serial Clock) line, and an SDA (Serial Data) line of the HDMI.

When all of the reserved line, the HPD line, the SCL line, and the SDA line are used, the full-duplex communication system using, for example, a twist pair only needs to be adopted.

When two lines out of the four lines are used, a twist pair only needs to be constituted by those two lines. Alternatively, when two lines out of the four lines are used, it is also possible to use one of them for transmission and the other for reception, for example.

Alternatively, it is also possible to transmit the reference control information using three lines out of the four lines. In this case, two lines for transmission (or reception) are used as a twist pair and one line for reception (or transmission) is used as a single wire.

According to another aspect of the present invention, there is provided a transmission apparatus transmitting video data to a reception apparatus, including: a decode unit to decode encoded video data encoded by a compression coding method that uses a motion vector; a transmission interface including a first transmission channel for transmitting the video data obtained by the decode to the reception apparatus and a second transmission channel for transmitting, to the reception apparatus, for the reception apparatus to generate an interpolation frame between frames of the video data and realize a high frame rate of the video data, reference control information that includes information on the motion vector and is obtained at a time the decode unit decodes the encoded video data; a superimposition unit to superimpose the reference control information on a blanking area of the video data obtained by the decode; a judgment means for judging whether a data amount of the reference control information exceeds an allowable data amount of the reference control information that can be superimposed on the blanking area; and a control means for switching, when the data amount of the reference control information exceeds the allowable data amount, superimposition processing by the superimposition unit to transmission processing of the reference control information from the second transmission channel. According to the present invention, the transmission apparatus can efficiently transmit reference control information.

According to the present invention, there is provided a reception apparatus receiving video data transmitted from a transmission apparatus including a decode unit to decode encoded video data encoded by a compression coding method that uses a motion vector and a transmission interface including a first transmission channel for transmitting the video data obtained by the decode, the reception apparatus including: a reception interface including a first reception channel for receiving the video data and a second reception channel for receiving reference control information that includes information on the motion vector and is obtained at a time the decode unit decodes the encoded video data, the reference control information being transmitted from a second transmission channel of the transmission interface; and a frame rate conversion unit to generate an interpolation frame between frames of the received video data using the received reference control information to thus realize a high frame rate of the video data.

According to the present invention, there is provided a frame rate conversion system including a transmission apparatus and a reception apparatus. The transmission apparatus includes a decode unit to decode encoded video data encoded by a compression coding method that uses a motion vector, and a transmission interface including a first transmission channel for transmitting the video data obtained by the decode and a second transmission channel for transmitting reference control information that includes information on the motion vector and is obtained at a time the decode unit decodes the encoded video data. The reception apparatus includes a reception interface including a first reception channel for receiving the transmitted video data and a second reception channel for receiving the transmitted reference control information, and a frame rate conversion unit to generate an interpolation frame between frames of the received video data using the received reference control information to thus realize a high frame rate of the video data.

According to the present invention, there is provided a frame rate conversion method including: decoding, by a transmission apparatus including a transmission interface, encoded video data encoded by a compression coding method that uses a motion vector; transmitting, by the transmission apparatus, the video data obtained by the decode from a first transmission channel of the transmission interface; transmitting, by the transmission apparatus, reference control information that includes information on the motion vector and is obtained at a time the decode unit decodes the encoded video data, from a second transmission channel of the transmission interface; receiving, by a reception apparatus including a reception interface, the transmitted video data using a first reception channel of the reception interface; receiving, by the reception apparatus, the transmitted reference control information using a second reception channel of the reception interface; and generating, by the reception apparatus, an interpolation frame between frames of the received video data using the received reference control information to thus realize a high frame rate of the video data.

Effect of the Invention

As described above, according to the present invention, reference control information can be transmitted even when a data amount of the reference control information is large, and the reference control information can therefore be transmitted efficiently.

BEST MODES FOR CARRYING OUT THE INVENTION

Hereinafter, embodiments of the present invention will be described with reference to the drawings.

FIG. 1 is a diagram showing a structure of a general picture transmission system as a reference example of this embodiment. Hereinafter, "picture" refers to both a still image and a moving image while mainly referring to each frame of a moving image. "Video" refers to a moving image. However, in describing embodiments of the present invention, those two are not clearly differentiated and have substantially the same meaning.

In FIG. 1, a receiver 11 for receiving digital television broadcasts (hereinafter, referred to as digital TV), an AV amplifier 12, and a reproducing apparatus 151 are installed in a living room on a left-hand side of a user residence in the figure. The digital TV 11 and AV amplifier 12 and the AV amplifier and reproducing apparatus 151 are connected by an HDMI cable 13 and an HDMI cable 15, respectively.

Moreover, a hub 16 is installed in the living room, and the digital TV 11 and the reproducing apparatus 151 are connected to the hub 16 by a LAN (Local Area Network) cable 17 and a LAN cable 18, respectively. Furthermore, in the figure, a digital TV 19 is installed in a bedroom on a right-hand side from the living room, and the digital TV 19 is connected to the hub 16 via a LAN cable 20.

In a case where a content recorded in the reproducing apparatus 151 is reproduced and a picture is displayed on the digital TV 11, for example, the reproducing apparatus 151 decodes pixel data and audio data for reproducing the content and supplies the resultant uncompressed pixel data and audio data to the digital TV 11 via the HDMI cable 15, the AV amplifier 12, and the HDMI cable 13. Then, the digital TV 11 displays a picture or outputs an audio based on the pixel data and audio data supplied from the reproducing apparatus 151.

Moreover, in a case where a content recorded in the reproducing apparatus 151 is reproduced and a picture is displayed on the digital TV 11 and the digital TV 19 at the same time, the reproducing apparatus 151 supplies compressed pixel data and audio data for reproducing the content to the digital TV 11 via the LAN cable 18, the hub 16, and the LAN cable 17, and also supplies them to the digital TV 19 via the LAN cable 18, the hub 16, and the LAN cable 20.

Then, the digital TV 11 and the digital TV 19 decode the pixel data and audio data supplied from the reproducing apparatus 151 and displays a picture or outputs an audio based on the resultant uncompressed pixel data and audio data.

Furthermore, in a case where the digital TV has received pixel data and audio data for reproducing a television-broadcasted program, when the received audio data is, for example, 5.1 channel surround audio data and the audio data received by the digital TV 11 therefore cannot be decoded, the digital TV 11 converts the audio data into an optical signal and transmits it to the AV amplifier 12.

The AV amplifier 12 receives the optical signal transmitted from the digital TV 11 and performs a photoelectric conversion thereon, and decodes the resultant audio data. Then, the AV amplifier 12 amplifies the decoded uncompressed audio data as necessary and reproduces the audio from a surround speaker connected to the AV amplifier 12. Accordingly, by decoding the received pixel data, displaying a picture based on the decoded pixel data, and outputting an audio by the AV amplifier 12 based on the audio data supplied to the AV amplifier 12, the digital TV 11 reproduces a 5.1 channel surround program.

FIG. 2 is a diagram showing a structure of a picture transmission system according to an embodiment to which the present invention is applied.

The picture transmission system is constituted of a digital TV 31, an amplifier 32, a reproducing apparatus 33, and a digital TV 34. The digital TV 31 and amplifier 32 and the amplifier 32 and reproducing apparatus 33 are respectively connected by an HDMI(R) cable 35 and an HDMI(R) cable 36 as communication cables conforming to an HDMI(R). In addition, the digital TV 31 and the digital TV 34 are connected by a LAN cable 37 for a LAN, such as the Ethernet (registered trademark).

In the example of FIG. 2, the digital TV 31, the amplifier 32, and the reproducing apparatus 33 are installed in a living room on a left-hand side of a user residence in the figure, and the digital TV 34 is installed in a bedroom on a right-hand side from the living room.

The reproducing apparatus 33 is constituted of, for example, a DVD player or a hard disk recorder, and decodes pixel data and audio data for reproducing a content and supplies the resultant uncompressed pixel data and audio data to the amplifier 32 via the HDMI(R) cable 36.

The amplifier 32 is constituted of, for example, an AV amplifier, and upon being supplied with the pixel data and the audio data from the reproducing apparatus 33, amplifies the supplied audio data as necessary. Moreover, the amplifier 32 supplies the audio data amplified as necessary and the pixel data that have been supplied from the reproducing apparatus 33 to the digital TV 31 via the HDMI(R) cable 35. The digital TV 31 displays a picture or outputs an audio based on the pixel data and the audio data supplied from the amplifier 32, and thus reproduces a content.

Furthermore, the digital TV 31 and the amplifier 32 are capable of performing bidirectional communication such as IP communication at high speed using the HDMI(R) cable 35, and the amplifier 32 and the reproducing apparatus 33 are also capable of performing bidirectional communication such as IP communication at high speed using the HDMI(R) cable 36.

Specifically, by performing IP communication with the amplifier 32, the reproducing apparatus 33 can transmit compressed pixel data and audio data to the amplifier 32 via the HDMI(R) cable 36 as data conforming to an IP, and the amplifier 32 can receive the compressed pixel data and audio data transmitted from the reproducing apparatus 33.

Further, by performing IP communication with the digital TV 31, the amplifier 32 can transmit compressed pixel data and audio data to the digital TV 31 via the HDMI(R) cable 35 as data conforming to the IP, and the digital TV 31 can receive the compressed pixel data and audio data transmitted from the amplifier 32.

Therefore, the digital TV 31 can transmit the received pixel data and audio data to the digital TV 34 via the LAN cable 37. Moreover, the digital TV 31 decodes the received pixel data and audio data and, based on the resultant uncompressed pixel data and audio data, displays a picture or outputs an audio and thus reproduces a content.

The digital TV 34 receives and decodes the pixel data and the audio data transmitted from the digital TV 31 via the LAN cable 37 and, based on the uncompressed pixel data and audio data obtained by the decode, displays a picture or outputs an audio and thus reproduces a content. Accordingly, in the digital TV 31 and the digital TV 34, the same content or different contents can be reproduced at the same time.

Furthermore, in a case where the digital TV 31 has received pixel data and audio data for reproducing a program as a television-broadcasted content, when the received audio data is, for example, 5.1 channel surround audio data and the audio data received by the digital TV 31 therefore cannot be decoded, the digital TV 31 transmits, by performing IP communication with the amplifier 32, the received audio data to the amplifier 32 via the HDMI(R) cable 35.

The amplifier 32 receives and decodes the audio data transmitted from the digital TV 31 and amplifies the decoded audio data as necessary. Then, the 5.1 channel surround audio is reproduced from a speaker (not shown) connected to the amplifier 32.

The digital TV 31 decodes the received pixel data as well as transmitting the audio data to the amplifier 32 via the HDMI (R) cable 35, and reproduces a program by displaying a picture based on the pixel data obtained by the decode.

As described above, since electronic apparatuses such as the digital TV 31, the amplifier 32, and the reproducing apparatus 33 connected by the HDMI(R) cable 35 and the HDMI (R) cable 36 can perform high-speed IP communication using HDMI(R) cables in the picture transmission system shown in FIG. 2, a LAN cable corresponding to the LAN cable 17 of FIG. 1 is unnecessary.

Moreover, by connecting the digital TV 31 and the digital TV 34 by the LAN cable 37, data received by the digital TV 31 from the reproducing apparatus 33 via the HDMI(R) cable 36, the amplifier 32, and the HDMI(R) cable 35 can be additionally transmitted to the digital TV 34 via the LAN cable 37. Therefore, a LAN cable and an electronic apparatus corresponding to the LAN cable 18 and the hub 16 of FIG. 1 are unnecessary.

As shown in FIG. 1, in the conventional picture transmission system, different types of cables have been necessary depending on data to be transmitted and received and a communication system, and wirings of cables connecting the electronic apparatuses have been complex. On the other hand, in the picture transmission system shown in FIG. 2, since bidirectional communication such as IP communication can be performed between the electronic apparatuses connected by the HDMI(R) cables at high speed, it is possible to simplify connections between the electronic apparatuses. In other words, wirings of cables connecting the electronic apparatuses that have been complex in the conventional art can be made simpler.

Next, FIG. 3 shows a structural example of an HDMI(R) source and an HDMI(R) sink incorporated in respective electronic apparatuses mutually connected by an HDMI(R) cable, for example, an HDMI(R) source provided in the amplifier 32 of FIG. 2 and an HDMI(R) sink provided in the digital TV 31.

An HDMI(R) source 71 and an HDMI(R) sink 72 are connected by a single HDMI(R) cable 35, and the HDMI(R) source 71 and the HDMI(R) sink 72 are capable of performing high-speed bidirectional IP communication using the HDMI(R) cable 35 while maintaining compatibility with the existing HDMI(R).

The HDMI(R) source 71 unidirectionally transmits, to the HDMI(R) sink 72, using a plurality of channels, a differential signal corresponding to pixel data of an uncompressed picture of 1 screen in an active video area as a section obtained by removing a horizontal flyback section (horizontal blanking area) and a vertical flyback section (vertical blanking area) from a section ranging from one vertical synchronization signal to the next vertical synchronization signal, and unidirectionally transmits, to the HDMI(R) sink 72, using a plurality of channels, differential signals corresponding to at least audio data associated with the picture, control data, other auxiliary data, and the like in the horizontal flyback unit or the vertical flyback unit.

Specifically, the HDMI(R) source 71 includes a transmitter 81. The transmitter 81 converts the differential signals corresponding to the pixel data of the uncompressed picture and serially transmits them unidirectionally to the HDMI(R) sink 72 connected thereto via the HDMI(R) cable 35 using three TMDS channels #0, #1, and #2 as the plurality of channels.

The TMDS channels #0, #1, and #2 provided in the transmitter 81 function as a first transmission channel. In addition, the TMDS channels #0, #1, and #2 provided in a receiver 82 function as a first reception channel.

Further, the transmitter 81 converts the differential signals corresponding to the audio data associated with the uncompressed picture, necessary control data, other auxiliary data, and the like and serially transmits them unidirectionally to the HDMI(R) sink 72 connected thereto via the HDMI(R) cable 35 using the three TMDS channels #0, #1, and #2.

Furthermore, the transmitter 81 transmits pixel clocks synchronized with the pixel data transmitted by the three TMDS channels #0, #1, and #2 to the HDMI(R) sink 72 connected thereto via the HDMI(R) cable 35 using a TMDS clock channel. Here, in a single TMDS channel #i (i=0, 1, 2), 10 bits of pixel data is transmitted during 1 clock of the pixel clocks.

The HDMI(R) sink 72 receives the differential signal corresponding to the pixel data transmitted unidirectionally from the HDMI(R) source 71 using a plurality of channels in the active area section, and receives the differential signals corresponding to the audio data and the control data transmitted unidirectionally from the HDMI(R) source 71 using the plurality of channels in the horizontal flyback unit or the vertical flyback unit.

Specifically, the HDMI(R) sink 72 includes the receiver 82. The receiver 82 receives, using the TMDS channels #0, #1, and #2, the differential signal corresponding to the pixel data and the differential signals corresponding to the audio data and control data, that are transmitted unidirectionally from the HDMI(R) source 71 connected thereto via the HDMI(R) cable 35, in sync with the pixel clocks similarly transmitted from the HDMI(R) source 71 using the TMDS clock channel.

As a transmission channel of an HDMI(R) system constituted of the HDMI(R) source 71 and the HDMI(R) sink 72, there are also transmission channels called DDC (Display Data Channel) 83 and CEC line 84 in addition to the three TMDS channels #0 to #2 as transmission channels for serially transmitting, in one direction, the pixel data and audio data in sync with the pixel clocks from the HDMI(R) source 71 to the HDMI(R) sink 72 and the TMDS clock channel as a transmission channel for transmitting the pixel clocks.

The DDC 83 is constituted of two signal lines (not shown) included in the HDMI(R) cable 35 and used for the HDMI(R) source 71 to read out E-EDID (Enhanced Extended Display Identification Data) from the HDMI(R) sink 72 connected thereto via the HDMI(R) cable 35.

Specifically, in addition to the receiver 82, the HDMI(R) sink 72 includes an EDIDROM (EDID ROM (Read Only Memory)) 85 that stores the E-EDID as information on its own settings and performance. The HDMI(R) source reads out, from the HDMI(R) sink 72 connected thereto via the HDMI(R) cable 35, E-EDID stored in the EDIDROM 85 of the HDMI(R) sink 72 via the DDC 83, and recognizes, based on the E-EDID, the settings and performance of the HDMI(R) sink 72, that is, a picture format (profile) that (the electronic apparatus including) the HDMI(R) sink 72 supports like RGB (Red, Green, Blue), YCbCr4:4:4, and YCbCr4:2:2.

It should be noted that although not shown, similar to the HDMI(R) sink 72, the HDMI(R) source 71 can store E-EDID and transmit the E-EDID to the HDMI(R) sink 72 as necessary.

The CEC line 84 is constituted of a single signal line (not shown) included in the HDMI(R) cable 35 and used for performing bidirectional communication of control data between the HDMI(R) source 71 and the HDMI(R) sink 72.

Further, the HDMI(R) source 71 and the HDMI(R) sink 72 can perform bidirectional IP communication by transmitting, for example, a frame conforming to IEEE (Institute of Electrical and Electronics Engineers) 802.3 to the HDMI(R) sink 72 and the HDMI(R) source 71 via the DDC 83 or the CEC line 84.

Furthermore, the HDMI(R) cable 35 includes a signal line 86 connected to a pin called Hot Plug Detect, and the HDMI (R) source 71 and the HDMI(R) sink 72 can use the signal line 86 to detect a connection of a new electronic apparatus, that is, the HDMI(R) sink 72 or the HDMI(R) source 71.

Next, FIGS. 4 and 5 each show a pin assignment of a connector (not shown) provided in the HDMI(R) source 71 or the HDMI(R) sink 72 connected to the HDMI(R) cable 35.

It should be noted that in FIGS. 4 and 5, a pin number for specifying a connector pin is described on a left-hand column (PIN column), and a name of a signal allocated to a pin specified by the pin number described on the left-hand column is described on a right-hand column on the same row (Signal Assignment column).

FIG. 4 shows a pin assignment of a connector called Type-A of the HDMI(R).

Two signal lines as differential signal lines through which differential signals TMDS Data #I+ and TMDS Data #i− of a TMDS channel #i are transmitted are respectively connected to a pin to which TMDS Data #i+ is allocated (pins with pin numbers 1, 4, and 7) and a pin to which TMDS Data #i− is allocated (pins with pin numbers 3, 6, and 9).

Further, the CEC line 84 through which a CEC signal as control data is transmitted is connected to a pin with a pin number 13, and a pin with a pin number 14 is a reserved pin. If bidirectional IP communication can be performed using this reserved pin, compatibility with the existing HDMI(R) can be maintained. In this regard, so as to enable differentiation signals to be transmitted using the CEC line 84 and a signal line connected to the pin with the pin number 14, the signal line connected to the pin with the pin number 14 and the CEC line 84 are connected as a differential twist pair and shielded, and grounded to ground lines of the CEC line 84 and the DDC 83 that are connected to a pin with a pin number 17.

In addition, a signal line through which an SDA (Serial Data) signal such as E-EDID is transmitted is connected to a pin with a pin number 16. A signal line through which an SCL (Serial Clock) signal as a clock signal used in a synchronization at a time of transmitting and receiving the SDA signal is transmitted is connected to a pin with a pin number 15. The DDC 83 of FIG. 3 is constituted of the signal line through which the SDA signal is transmitted and the signal line through which the SCL signal is transmitted.

Further, like the CEC line 84 and the signal line connected to the pin with the pin number 14, the signal line through which the SDA signal is transmitted and the signal line through which the SCL signal is transmitted are connected as a differential twist pair and shielded so as to enable the differential signals to be transmitted, and grounded to the ground lines connected to the pin with the pin number 17.

In addition, the signal line 86 through which a signal for detecting a connection of a new electronic apparatus is transmitted is connected to a pin with a pin number 19.

FIG. 5 shows a pin assignment of a connector called Type-C or Type-mini of the HDMI(R).

Two signal lines as differential signal lines through which differential signals TMDS Data #i+ and TMDS Data #i− of a TMDS channel #i are transmitted are respectively connected to a pin to which TMDS Data #i+ is allocated (pins with pin numbers 2, 5, and 8) and a pin to which TMDS Data #i− is allocated (pins with pin numbers 3, 6, and 9).

Further, the CEC line 84 through which a CEC signal is transmitted is connected to the pin with the pin number 14, and the pin with the pin number 17 is a reserved pin. As in the case of Type-A, the signal line connected to the pin with the pin number 17 and the CEC line 84 are connected as a differential twist pair and shielded, and grounded to ground lines of the CEC line 84 and the DDC 83 that are connected to the pin with the pin number 13.

In addition, the signal line through which an SDA signal is transmitted is connected to the pin with the pin number 16, and the signal line through which an SCL signal is transmitted is connected to the pin with the pin number 15. As in the case of Type-A, the signal line through which an SDA signal is transmitted and the signal line through which an SCL signal is transmitted are connected as a differential twist pair and shielded so as to enable the differential signals to be transmitted, and grounded to the ground lines connected to the pin with the pin number 13. Also, the signal line 86 through which a signal for detecting a connection of a new electronic apparatus is transmitted is connected to the pin with the pin number 19.

Next, FIG. 6 is a diagram showing a structure of the HDMI (R) source 71 and the HDMI(R) sink 72 that perform IP communication by a half-duplex communication system using the CEC line 84 and the signal line connected to the reserved pin of the connector of the HDMI(R). It should be noted that FIG. 6 shows a structural example of parts related to the half-duplex communication in the HDMI(R) source 71 and the HDMI(R) sink 72. Moreover, in FIG. 6, parts corresponding to those of FIG. 3 are denoted by the same reference numerals, and descriptions thereof will be omitted as appropriate.

The HDMI(R) source 71 is constituted of the transmitter 81, a switching control unit 121, and a timing control unit 122. Also, the transmitter 81 is provided with a conversion unit 131, a decode unit 132, and a switch 133.

Supplied to the conversion unit 131 is Tx data as data transmitted from the HDMI(R) source 71 to the HDMI(R) sink 72 through bidirectional IP communication between the HDMI(R) source 71 and the HDMI(R) sink 72. The Tx data is, for example, compressed pixel data and audio data.

The conversion unit 131 is constituted of, for example, a differential amplifier, and converts the supplied Tx data into a differential signal constituted of two partial signals. Moreover, the conversion unit 131 transmits to the receiver 82 the differential signal obtained by the conversion via the CEC line 84 and a signal line 141 connected to a reserved pin of a connector (not shown) provided in the transmitter 81. In other words, the conversion unit 131 supplies one of the partial signals constituting the differential signal obtained by the conversion to the switch 133 via the CEC line 84, more specifically, a signal line that is provided in the transmitter 81 and connected to the CEC line 84 of the HDMI(R) cable 35, and supplies the other one of the partial signals constituting the differential signal to the receiver 82 via the signal line 141, more specifically, a signal line that is provided in the transmitter 81 and connected to the signal line 141 of the HDMI(R) cable 35, and the signal line 141.

The decode unit 132 is constituted of, for example, a differential amplifier, and input terminals thereof are connected to the CEC line 84 and the signal line 141. Under control of the timing control unit 122, the decode unit 132 receives the differential signal transmitted from the receiver 82 via the CEC line 84 and the signal line 141, that is, the differential signal constituted of the partial signal on the CEC line 84 and the partial signal on the signal line 141, decodes it into Rx data as the original data, and outputs it. Here, the Rx data is data transmitted from the HDMI(R) sink 72 to the HDMI(R) source 71 through bidirectional IP communication between the HDMI(R) source 71 and the HDMI(R) sink 72, such as a command that requests a transmission of pixel data and audio data.

A CEC signal from the HDMI(R) source 71 or the partial signal constituting the differential signal corresponding to the Tx data from the conversion unit 131 is supplied to the switch 133 at a timing of transmitting data, and a CEC signal from the receiver 82 or the partial signal constituting the differential signal corresponding to the Rx data from the receiver is supplied at a timing of receiving data. Under control of the switching control unit 121, the switch 133 selects and outputs the CEC signal from the HDMI(R) source 71 or the CEC signal from the receiver 82, or the partial signal constituting the differential signal corresponding to the Tx data or the partial signal constituting the differential signal corresponding to the Rx data.

In other words, at the timing at which the HDMI(R) source 71 transmits data to the HDMI(R) sink 72, the switch 133 selects either the CEC signal supplied from the HDMI(R) source 71 or the partial signal supplied from the conversion unit 131 and transmits the selected CEC signal or partial signal to the receiver 82 via the CEC line 84.

Moreover, at the timing at which the HDMI(R) source 71 receives the data transmitted from the HDMI(R) sink 72, the switch 133 receives the CEC signal transmitted from the receiver 82 via the CEC line 84 or the partial signal of the differential signal corresponding to the Rx data, and supplies the received CEC signal or partial signal to the HDMI(R) source 71 or the decode unit 132.

The switching control unit 121 controls the switch 133 and switches the switch 133 so that either one of the signals supplied to the switch 133 is selected. The timing control unit 122 controls a timing at which the decode unit 132 receives the differential signal.

The HDMI(R) sink 72 is constituted of the receiver 82, a timing control unit 123, and a switching control unit 124. In addition, the receiver 82 is provided with a conversion unit 134, a switch 135, and a decode unit 136.

The conversion unit 134 is constituted of, for example, a differential amplifier, and is supplied with Rx data. Under control of the timing control unit 123, the conversion unit 134 converts the supplied Rx data into a differential signal constituted of two partial signals, and transmits to the transmitter 81 the differential signal obtained by the conversion via the CEC line 84 and the signal line 141. In other words, the conversion unit 134 supplies one of the partial signals constituting the differential signal obtained by the conversion to the switch 135 via the CEC line 84, more specifically, a signal line that is provided in the receiver 82 and connected to the CEC line 84 of the HDMI(R) cable 35, and supplies the other one of the partial signals constituting the differential signal to the transmitter 81 via the signal line 141, more specifically, a signal line that is provided in the receiver 82 and connected to the signal line 141 of the HDMI(R) cable 35, and the signal line 141.

The CEC signal from the transmitter 81 or the partial signal constituting the differential signal corresponding to the Tx data from the transmitter 81 is supplied to the switch 135 at a timing of receiving data, and the partial signal constituting the differential signal corresponding to the Rx data from the conversion unit 134 or the CEC signal from the HDMI(R) sink 72 is supplied at a timing of transmitting data. Under control of the switching control unit 124, the switch 135 selects and outputs the CEC signal from the transmitter 81 or the CEC signal from the HDMI(R) sink 72, or the partial signal constituting the differential signal corresponding to the Tx data or the partial signal constituting the differential signal corresponding to the Rx data.

In other words, at the timing at which the HDMI(R) sink 72 transmits data to the HDMI(R) source 71, the switch 135 selects either the CEC signal supplied from the HDMI(R) sink 72 or the partial signal supplied from the conversion unit 134 and transmits the selected CEC signal or partial signal to the transmitter 81 via the CEC line 84.

Moreover, at the timing at which the HDMI(R) sink 72 receives the data transmitted from the HDMI(R) source 71, the switch 135 receives the CEC signal transmitted from the transmitter 81 via the CEC line 84 or the partial signal of the differential signal corresponding to the Tx data, and supplies the received CEC signal or partial signal to the HDMI(R) sink 72 or the decode unit 136.

The decode unit 136 is constituted of, for example, a differential amplifier, and input terminals thereof are connected to the CEC line 84 and the signal line 141. The decode unit 136 receives the differential signal transmitted from the transmitter 81 via the CEC line 84 and the signal line 141, that is, the differential signal constituted of the partial signal on the CEC line 84 and the partial signal on the signal line 141, decodes it into Tx data as the original data, and outputs it.

The switching control unit 124 controls the switch 135 and switches the switch 135 so that either one of the signals supplied to the switch 135 is selected. The timing control unit 123 controls a timing at which the conversion unit 134 transmits the differential signal.

Further, in a case where the HDMI(R) source 71 and the HDMI(R) sink 72 perform IP communication by a full-duplex communication system using the CEC line 84, the signal line 141 connected to the reserved pin, the signal line through which the SDA signal is transmitted, and the signal line through which the SCL signal is transmitted, the HDMI(R) source 71 and the HDMI(R) sink 72 are structured as shown in FIG. 7, for example. It should be noted that in FIG. 7, parts corresponding to those of FIG. 6 are denoted by the same reference numerals, and descriptions thereof will be omitted as appropriate.

The HDMI(R) source 71 is constituted of the transmitter 81, the switching control unit 121, and a switching control unit 971. Also, the transmitter 81 is provided with the conversion unit 131, the switch 133, a switch 181, a switch 182, and a decode unit 183.

An SDA signal from the HDMI(R) source 71 is supplied to the switch 181 at a timing of transmitting data, and an SDA signal from the receiver 82 or the partial signal constituting the differential signal corresponding to the Rx data from the receiver 82 is supplied at a timing of receiving data. Under control of the switching control unit 971, the switch 181 selects and outputs the SDA signal from the HDMI(R) source 71, the SDA signal from the receiver 82, or the partial signal constituting the differential signal corresponding to the Rx data.

In other words, at the timing at which the HDMI(R) source 71 receives data transmitted from the HDMI(R) sink 72, the switch 181 receives either the SDA signal transmitted from the receiver 82 via an SDA line 191 as the signal line through which an SDA signal is transmitted or the partial signal of the differential signal corresponding to the Rx data, and supplies the received SDA signal or partial signal to the HDMI(R) source 71 or the decode unit 183.

Moreover, at the timing at which the HDMI(R) source 71 transmits the data to the HDMI(R) sink 72, the switch 181 transmits the SDA signal supplied from the HDMI(R) source 71 to the receiver 82 via the SDA line 191, or does not transmit anything to the receiver 82.

The SCL signal from the HDMI(R) source 71 is supplied to the switch 182 at a timing of transmitting data, and the partial signal constituting the differential signal corresponding to the Rx data from the receiver 82 is supplied at a timing of receiving data. Under control of the switching control unit 971, the switch 182 selects and outputs either the SCL signal or the partial signal constituting the differential signal corresponding to the Rx data.

In other words, at the timing at which the HDMI(R) source 71 receives the data transmitted from the HDMI(R) sink 72, the switch 182 receives the partial signal of the differential signal corresponding to the Rx data, that has been transmitted from the receiver 82 via an SCL line 192 as the signal line through which an SCL signal is transmitted, and supplies the received partial signal to the decode unit 183, or does not receive anything.

Moreover, at the timing at which the HDMI(R) source 71 transmits the data to the HDMI(R) sink 72, the switch 182 transmits the SCL signal supplied from the HDMI(R) source 71 to the receiver 82 via the SCL line 192 or does not transmit anything.

The decode unit 183 is constituted of, for example, a differential amplifier, and input terminals thereof are connected to the SDA line 191 and the SCL line 192. The decode unit 183 receives the differential signal transmitted from the receiver 82 via the SDA line 191 and the SCL line 192, that is, the differential signal constituted of the partial signal on the SDA line 191 and the partial signal on the SCL line 192, decodes it into Rx data as the original data, and outputs it.

The switching control unit 971 controls the switch 181 and the switch 182 and switches the switch 181 and the switch 182 so that either one of the supplied signals is selected for each of the switch 181 and the switch 182.

The HDMI(R) sink 72 is constituted of the receiver 82, the switching control unit 124, and a switching control unit 972. In addition, the receiver is provided with the switch 135, the decode unit 136, a conversion unit 184, a switch 185, and a switch 186.

The conversion unit 184 is constituted of, for example, a differential amplifier, and is supplied with Rx data. The conversion unit 184 converts the supplied Rx data into a differential signal constituted of two partial signals, and transmits to the transmitter 81 the differential signal obtained by the conversion via the SDA line 191 and the SCL line 192. In other words, the conversion unit 184 transmits one of the partial signals constituting the differential signal obtained by the conversion to the transmitter 81 via the switch 185, and transmits the other one of the partial signals constituting the differential signal to the transmitter 81 via the switch 186.

The partial signal constituting the differential signal corresponding to the Rx data from the conversion unit 184 or the SDA signal from the HDMI(R) sink 72 is supplied to the switch 185 at a timing of transmitting data, and the SDA signal from the transmitter 81 is supplied at a timing of receiving data. Under control of the switching control unit 972, the switch 185 selects and outputs the SDA signal from the HDMI(R) sink 72, the SDA signal from the transmitter 81, or the partial signal constituting the differential signal corresponding to the Rx data.

In other words, at the timing at which the HDMI(R) sink 72 receives data transmitted from the HDMI(R) source 71, the switch 185 receives the SDA signal transmitted from the transmitter 81 via the SDA line 191 and supplies the received SDA signal to the HDMI(R) sink 72, or does not receive anything.

Moreover, at the timing at which the HDMI(R) sink 72 transmits the data to the HDMI(R) source 71, the switch 185 transmits the SDA signal supplied from the HDMI(R) sink 72 or the partial signal supplied from the conversion unit 184 to the transmitter 81 via the SDA line 191.

The partial signal constituting the differential signal corresponding to the Rx data from the conversion unit 184 is supplied to the switch. 186 at a timing of transmitting data, and the SCL signal from the transmitter 81 is supplied at a timing of receiving data. Under control of the switching control unit 972, the switch 186 selects and outputs either the partial signal constituting the differential signal corresponding to the Rx data or the SCL signal.

In other words, at the timing at which the HDMI(R) sink 72 receives data transmitted from the HDMI(R) source 71, the switch 186 receives the SCL signal transmitted from the transmitter 81 via the SCL line 192 and supplies the received SCL signal to the HDMI(R) sink 72, or does not receive anything.

Moreover, at the timing at which the HDMI(R) sink 72 transmits the data to the HDMI(R) source 71, the switch 186 transmits the partial signal supplied from the conversion unit 184 to the transmitter 81 via the SCL line 192, or does not transmit anything.

The switching control unit 972 controls the switch 185 and the switch 186 and switches the switch 185 and the switch 186 so that either one of the supplied signals is selected for each of the switch 185 and the switch 186.

Incidentally, which of the half-duplex communication and the full-duplex communication is possible for the IP communication performed between the HDMI(R) source 71 and the HDMI(R) sink 72 depends on the structures of the HDMI(R) source 71 and the HDMI(R) sink 72. In this regard, the HDMI(R) source 71 references E-EDID received from the HDMI(R) sink 72 to judge which of the half-duplex communication and the full-duplex communication is to be performed, or whether to perform bidirectional communication by an exchange of CEC signals.

The E-EDID received by the HDMI(R) source 71 is constituted of a basic block and an expansion block as shown in FIG. 8, for example.

At a head of the basic block of the E-EDID, data expressed as "E-EDID1.3 Basic Structure" defined by an E-EDID 1.3 standard is arranged, followed by timing information expressed as "Preferred timing" for maintaining compatibility with conventional E-EDID and timing information expressed as "2nd timing" different from "Preferred timing" for maintaining compatibility with the conventional E-EDID.

Moreover, in the basic block, subsequent to "2nd timing", information expressed as "Monitor NAME" that indicates a name of a display apparatus and information expressed as "Monitor Range Limits" that indicates the number of pixels that can be displayed when aspect ratios are 4:3 and 16:9 are arranged sequentially.

On the other hand, subsequent to information that is expressed as "Speaker Allocation" regarding speakers on both sides and arranged at a head of the expansion block, there are sequentially arranged information expressed as "VIDEO SHORT" that indicates a displayable picture size, a frame rate, and one of interlace and progressive, data describing information on an aspect ratio and the like, data expressed as "AUDIO SHORT" that describes information on a reproducible audio codec system, sampling frequency, cutoff band, codec bit count, and the like, and information expressed as "Speaker Allocation" regarding the speakers on both sides.

In addition, in the expansion block, subsequent to "Speaker Allocation", data expressed as "Vender Specific" uniquely defined for each manufacturer, timing information expressed as "3rd timing" for maintaining compatibility with the conventional E-EDID, and timing information expressed as "4th timing" for maintaining compatibility with the conventional E-EDID are arranged.

Furthermore, the data expressed as "Vender Specific" has a data structure shown in FIG. 9. In other words, the data expressed as "Vender Specific" is provided with 0-th to N-th blocks each of a 1-byte block.

In the 0-th block arranged at a head of the data expressed as "Vender Specific", a header expressed as "Vendor-Specific tag code (=3)" that indicates a data area of the data "Vender Specific" and information expressed as "Length (=N)" that indicates a length of the data "Vender Specific" are arranged.

Moreover, in the first to third blocks, information expressed as "24 bit IEEE Registration Identifier (0x000C03) LSB first" that indicates a number "0x000C03" registered for the HDMI(R) is arranged. In addition, in the fourth block and the fifth block, 24-bit information expressed as "A", "C", and "D" that indicate physical addresses of sink apparatuses are arranged.

In the sixth block, a flag expressed as "Supports-AI" that indicates a function supported by the sink apparatus, information respectively expressed as "DC-48 bit", "DC-36 bit", and "DC-30 bit" that designate bit counts per pixel, a flag expressed as "DC-Y444" that indicates whether the sink apparatus supports a transmission of a YCbCr4:4:4 picture, and a flag expressed as "DVI-Dual" that indicates whether the sink apparatus supports dual DVI (Digital Visual Interface) are arranged.

Further, in the seventh block, information expressed as "Max-TMDS-Clock" that indicates a maximum frequency of a TMDS pixel clock is arranged. Furthermore, in the eighth block, a flag expressed as "Latency" that indicates presence/absence of delay information of a video and audio, a full-duplex flag expressed as "Full-duplex" that indicates whether full-duplex communication is possible, and a flag expressed as "Half-duplex" that indicates whether half-duplex communication is possible are arranged.

Here, the full-duplex flag set (e.g., set to "1") indicates that the HDMI(R) sink 72 has a function of performing full-duplex communication, that is, has the structure shown in FIG. 7, and the full-duplex flag that has been reset (e.g., set to "0") indicates that the HDMI(R) sink 72 does not have the function of performing full-duplex communication.

Similarly, the half-duplex flag set (e.g., set to "1") indicates that the HDMI(R) sink 72 has a function of performing half-duplex communication, that is, has the structure shown in FIG. 6, and the half-deplex flag that has been reset (e.g., set to "0") indicates that the HDMI(R) sink 72 does not have the function of performing half-duplex communication.

Further, in the ninth block of the data expressed as "Vender Specific", delay time data of a progressive video, that is expressed as "Video Latency", is arranged. In the tenth block, delay time data of an audio associated with the progressive video, that is expressed as "Audio Latency", is arranged. Furthermore, in the eleventh block, delay time data of an interlace video, that is expressed as "Interlaced Video Latency", is arranged. In the twelfth block, delay time data of an audio associated with the interlace video, that is expressed as "Interlaced Audio Latency", is arranged.

Based on the full-duplex flag and the half-duplex flag contained in the E-EDID received from the HDMI(R) sink 72, the HDMI(R) source 71 judges which of half-duplex communication and full-duplex communication is to be performed or whether to perform bidirectional communication by an exchange of CEC signals, and performs bidirectional communication with the HDMI(R) sink 72 based on a result of the judgment.

For example, when the HDMI(R) source 71 has the structure shown in FIG. 6, although the HDMI(R) source 71 can perform half-duplex communication with the HDMI(R) sink 72 shown in FIG. 6, it cannot perform half-duplex communication with the HDMI(R) sink 72 shown in FIG. 7.

In this regard, upon power-on of the electronic apparatus in which the HDMI(R) source 71 is provided, the HDMI(R) source 71 starts communication processing and performs bidirectional communication corresponding to the function of the HDMI(R) sink 72 connected to the HDMI(R) source 71.

Hereinafter, referring to a flowchart of FIG. 10, communication processing carried out by the HDMI(R) source 71 shown in FIG. 6 will be described.

In Step S11, the HDMI(R) source 71 judges whether a new electronic apparatus has been connected to the HDMI(R) source 71. For example, the HDMI(R) source 71 judges whether a new electronic apparatus in which the HDMI(R) sink 72 is provided has been connected based on a magnitude of a voltage applied to a pin called Hot Plug Detect to which the signal line 86 is connected.

When judged in Step S11 that a new electronic apparatus is not connected, communication is not performed, and the communication processing therefore ends.

On the other hand, when judged in Step S11 that a new electronic apparatus has been connected, in Step 512, the switching control unit 121 controls the switch 133 and switches the switch 133 so that a CEC signal from the HDMI (R) source 71 is selected at a time of transmitting data and a CEC signal from the receiver 82 is selected at a time of receiving data.

In Step S13, the HDMI(R) source 71 receives E-EDID transmitted from the HDMI(R) sink 72 via the DDC 83. In other words, the HDMI(R) sink 72 reads out the E-EDID from the EDIDROM 85 upon detecting a connection of the HDMI(R) source 71 and transmits the read-out E-EDID to the HDMI(R) source 71 via the DDC 83. Thus, the HDMI(R) source 71 receives the E-EDID transmitted from the HDMI (R) sink 72.

In Step S14, the HDMI(R) source 71 judges whether half-duplex communication with the HDMI(R) sink 72 is possible. In other words, the HDMI(R) source 71 references the E-EDID received from the HDMI(R) sink 72 to judge whether the half-duplex flag "Half-duplex" of FIG. 9 is set, and when the half-duplex flag is set, for example, judges that bidirectional IP communication using a half-duplex communication system, that is, half-duplex communication is possible.

When judged in Step S14 that the half-duplex communication is possible, in Step S15, the HDMI(R) source 71 transmits, as channel information indicating a channel used for the bidirectional communication, a signal notifying that IP communication by a half-duplex communication system using the CEC line 84 and the signal line 141 is to be performed to the receiver 82 via the switch 133 and the CEC line 84.

In other words, when the half-duplex flag is set, the HDMI (R) source 71 can grasp that the HDMI(R) sink 72 has the structure shown in FIG. 6 and half-duplex communication using the CEC line 84 and the signal line 141 is possible.

Therefore, the channel information is transmitted to the HDMI(R) sink 72 to notify that half-duplex communication is to be performed.

In Step S16, the switching control unit 121 controls the switch 133 and switches the switch 133 so that a differential signal corresponding to Tx data from the conversion unit 131 is selected at a time of transmitting data and a differential signal corresponding to Rx data from the receiver 82 is selected at a time of receiving data.

In Step S17, the respective units of the HDMI(R) source 71 perform bidirectional IP communication with the HDMI(R) sink 72 using a half-duplex communication system, and the communication processing is thus ended. Specifically, at the time of transmitting data, the conversion unit 131 converts the Tx data supplied from the HDMI(R) source 71 into a differential signal, supplies one of partial signals constituting the differential signal obtained by the conversion to the switch 133, and transmits the other one of the partial signals to the receiver 82 via the signal line 141. The switch 133 transmits the partial signal supplied from the conversion unit 131 to the receiver 82 via the CEC line 84. As a result, the differential signal corresponding to the Tx data is transmitted from the HDMI(R) source 71 to the HDMI(R) sink 72.

Further, at the time of receiving data, the decode unit 132 receives the differential signal corresponding to the Rx data transmitted from the receiver 82. Specifically, the switch 133 receives the partial signal of the differential signal corresponding to the Rx data, that has been transmitted from the receiver 82 via the CEC line 84, and supplies the received partial signal to the decode unit 132. The decode unit 132 decodes the differential signal constituted of the partial signal supplied from the switch 133 and the partial signal supplied from the receiver 82 via the signal line 141 into Rx data as the original data under control of the timing control unit 122, and outputs it to the HDMI(R) source 71.

Accordingly, the HDMI(R) source 71 transmits and receives various types of data such as control data, pixel data, and audio data to/from the HDMI(R) sink 72.

Further, when judged in Step S14 that half-duplex communication is not possible, in Step S18, the respective units of the HDMI(R) source 71 transmit and receive CEC signals to perform bidirectional communication with the HDMI(R) sink 72, and the communication processing is thus ended.

Specifically, by transmitting a CEC signal to the receiver 82 via the switch 133 and the CEC line 84 at the time of transmitting data and receiving a CEC signal transmitted from the receiver 82 via the switch 133 and the CEC line 84 at the time of receiving data, the HDMI(R) source 71 transmits and receives control data to/from the HDMI(R) sink 72.

Thus, the HDMI(R) source 71 references the half-duplex flag and performs half-duplex communication with the HDMI(R) sink 72 that can perform the half-duplex communication using the CEC line 84 and the signal line 141.

By thus switching the switch 133 to select the data to be transmitted and the data to be received and performing half-duplex communication, that is, IP communication that uses a half-duplex communication system with the HDMI(R) sink 72 using the CEC line 84 and the signal line 141, high-speed bidirectional communication can be performed while maintaining compatibility with the conventional HDMI(R).

Moreover, similar to the HDMI(R) source 71, the HDMI(R) sink 72 starts communication processing upon power-on of the electronic apparatus in which the HDMI(R) sink 72 is provided, and performs bidirectional communication with the HDMI(R) source 71.

Hereinafter, referring to a flowchart of FIG. 11, communication processing carried out by the HDMI(R) sink 72 shown in FIG. 6 will be described.

In Step S41, the HDMI(R) sink 72 judges whether a new electronic apparatus has been connected to the HDMI(R) sink 72. For example, the HDMI(R) sink 72 judges whether a new electronic apparatus in which the HDMI(R) source 71 is provided has been connected based on a magnitude of a voltage applied to a pin called Hot Plug Detect to which the signal line 86 is connected.

When judged in Step S41 that a new electronic apparatus is not connected, communication is not performed, and the communication processing therefore ends.

On the other hand, when judged in Step S41 that a new electronic apparatus has been connected, in Step S42, the switching control unit 124 controls the switch 135 and switches the switch 135 so that a CEC signal from the HDMI(R) sink 72 is selected at a time of transmitting data and a CEC signal from the transmitter 81 is selected at a time of receiving data.

In Step S43, the HDMI(R) sink 72 reads out E-EDID from the EDIDROM 85 and transmits the read-out E-EDID to the HDMI(R) source 71 via the DDC 83.

In Step S44, the HDMI(R) sink 72 judges whether channel information transmitted from the HDMI(R) source 71 has been received.

Specifically, channel information indicating a channel used for bidirectional communication is transmitted from the HDMI(R) source 71 according to functions of the HDMI(R) source 71 and the HDMI(R) sink 72. When the HDMI(R) source 71 has the structure shown in FIG. 6, for example, since the HDMI(R) source 71 and the HDMI(R) sink 72 can perform half-duplex communication using the CEC line 84 and the signal line 141, channel information notifying that IP communication that uses the CEC line 84 and the signal line 141 is to be performed is transmitted from the HDMI(R) source 71 to the HDMI(R) sink 72. The HDMI(R) sink 72 receives the channel information transmitted from the HDMI(R) source 71 via the switch 135 and the CEC line 84 and judges that the channel information has been received.

On the other hand, when the HDMI(R) source 71 does not have the function of performing half-duplex communication, channel information is not transmitted from the HDMI(R) source 71 to the HDMI(R) sink 72. Thus, the HDMI(R) sink 72 judges that channel information is not received.

When judged in Step S44 that channel information has been received, the process advances to Step S45 in which the switching control unit 124 controls the switch 135 and switches the switch 135 so that a differential signal corresponding to Rx data from the conversion unit 134 is selected at a time of transmitting data and a differential signal corresponding to Tx data from the transmitter 81 is selected at a time of receiving data.

In Step S46, the respective units of the HDMI(R) sink 72 perform bidirectional IP communication with the HDMI(R) source 71 using a half-duplex communication system, and the communication processing is thus ended. Specifically, at the time of transmitting data, the conversion unit 134 converts the Rx data supplied from the HDMI(R) sink 72 into a differential signal under control of the timing control unit 123, supplies one of partial signals constituting the differential signal obtained by the conversion to the switch 135, and transmits the other one of the partial signals to the transmitter 81 via the signal line 141. The switch 135 transmits the partial signal supplied from the conversion unit 134 to the transmitter 81 via the CEC line 84. As a result, the differential signal corresponding to the Rx data is transmitted from the HDMI(R) sink 72 to the HDMI(R) source 71.

Further, at the time of receiving data, the decode unit 136 receives the differential signal corresponding to the Tx data transmitted from the transmitter 81. Specifically, the switch 135 receives the partial signal of the differential signal corresponding to the Tx data, that has been transmitted from the transmitter 81 via the CEC line 84, and supplies the received partial signal to the decode unit 136. The decode unit 136 decodes the differential signal constituted of the partial signal supplied from the switch 135 and the partial signal supplied from the transmitter 81 via the signal line 141 into Tx data as the original data, and outputs it to the HDMI(R) sink 72.

Accordingly, the HDMI(R) sink 72 transmits and receives various types of data such as control data, pixel data, and audio data to/from the HDMI(R) source 71.

Further, when judged in Step S44 that the channel information is not received, in Step S47, the respective units of the HDMI(R) sink 72 transmit and receive CEC signals to perform bidirectional communication with the HDMI(R) source 71, and the communication processing is thus ended.

Specifically, by transmitting a CEC signal to the transmitter 81 via the switch 135 and the CEC line 84 at the time of transmitting data and receiving a CEC signal transmitted from the transmitter 81 via the switch 135 and the CEC line 84 at the time of receiving data, the HDMI(R) sink 72 transmits and receives control data to/from the HDMI(R) source 71.

Thus, upon receiving the channel information, the HDMI (R) sink 72 uses the CEC line 84 and the signal line 141 to perform half-duplex communication with the HDMI(R) sink 72.

By thus switching the switch 135 to select the data to be transmitted and the data to be received and performing half-duplex communication with the HDMI(R) source 71 using the CEC line 84 and the signal line 141, the HDMI(R) sink 72 can perform high-speed bidirectional communication while maintaining compatibility with the conventional HDMI(R).

Moreover, when the HDMI(R) source 71 has the structure shown in FIG. 7, the HDMI(R) source 71 judges in the communication processing whether the HDMI(R) sink 72 has a function of performing full-duplex communication based on the full-duplex flag contained in the E-EDID, and performs bidirectional communication corresponding to a result of the judgment.

Hereinafter, referring to a flowchart of FIG. 12, communication processing carried out by the HDMI(R) source 71 shown in FIG. 7 will be described.

In Step S71, the HDMI(R) source 71 judges whether a new electronic apparatus has been connected to the HDMI(R) source 71. When judged in Step S71 that a new electronic apparatus is not connected, communication is not performed, and the communication processing therefore ends.

On the other hand, when judged in Step S71 that a new electronic apparatus has been connected, in Step S72, the switching control unit 971 controls the switch 181 and the switch 182 and switches the switch 181 and the switch 182 to make the switch 181 select the SDA signal from the HDMI(R) source 71 and make the switch 182 select the SCL signal from the HDMI(R) source 71 at the time of transmitting data, and make the switch 181 select the SDA signal from the receiver 82 at the time of receiving data.

In Step S73, the switching control unit 121 controls the switch 133 and switches the switch 133 so that the CEC signal from the HDMI(R) source 71 is selected at the time of transmitting data and the CEC signal from the receiver 82 is selected at the time of receiving data.

In Step S74, the HDMI(R) source 71 receives E-EDID transmitted from the HDMI(R) sink 72 via the SDA line 191 of the DDC 83. Specifically, the HDMI(R) sink 72 reads out E-EDID from the EDIDROM 85 upon detecting a connection of the HDMI(R) source 71, and transmits the read-out E-EDID to the HDMI(R) source 71 via the SDA line 191 of the DDC 83. Thus, the HDMI(R) source 71 receives the E-EDID transmitted from the HDMI(R) sink 72.

In Step S75, the HDMI(R) source 71 judges whether full-duplex communication with the HDMI(R) sink is possible. Specifically, the HDMI(R) source 71 refers to the E-EDID received from the HDMI(R) sink 72 to judge whether the full-duplex flag "Full Duplex" shown in FIG. 9 is set, and when the full-duplex flag is set, judges that bidirectional IP communication using a full-duplex communication system, that is, full-duplex communication is possible.

When judged in Step S75 that full-duplex communication is possible, in Step S76, the switching control unit 971 controls the switch 181 and the switch 182 and switches the switch 181 and the switch 182 so that the differential signal corresponding to the Rx data from the receiver 82 is selected at the time of receiving data.

In other words, the switching control unit 971 switches the switch 181 and the switch 182 so that, out of partial signals constituting the differential signal corresponding to the Rx data transmitted from the receiver 82, the partial signal transmitted via the SDA line 191 is selected by the switch 181 and the partial signal transmitted via the SCL line 192 is selected by the switch 182 at the time of receiving data.

Because the SDA line 191 and the SCL line 192 constituting the DDC 83 are not used after the E-EDID is transmitted from the HDMI(R) sink 72 to the HDMI(R) source 71, that is, the SDA signal and the SCL signal are not transmitted and received via the SDA line 191 and the SCL line 192, the switch 181 and the switch 182 are switched so as to use the SDA line 191 and the SCL line 192 as transmission channels of Rx data in the full-duplex communication.

In Step S77, the HDMI(R) source 71 transmits, as channel information indicating a channel used for the bidirectional communication, a signal notifying that IP communication by a full-duplex communication system that uses the CEC line 84 and signal line 141 and the SDA line 191 and SCL line 192 is to be performed to the receiver 82 via the switch 133 and the CEC line 84.

In other words, when the full-duplex flag is set, the HDMI (R) source 71 can grasp that the HDMI(R) sink 72 has the structure shown in FIG. 7 and full-duplex communication using the CEC line 84 and signal line 141 and the SDA line 191 and SCL line 192 is possible. Therefore, the channel information is transmitted to the HDMI(R) sink 72 to notify that full-duplex communication is to be performed.

In Step S78, the switching control unit 121 controls the switch 133 and switches the switch 133 so that a differential signal corresponding to Tx data from the conversion unit 131 is selected at a time of transmitting data. In other words, the switching control unit 121 switches the switch 133 so that a partial signal of the differential signal corresponding to the Tx data, that has been supplied from the conversion unit 131 to the switch 133, is selected.

In Step S79, the respective units of the HDMI(R) source 71 perform bidirectional IP communication with the HDMI(R) sink 72 using a full-duplex communication system, and the communication processing is thus ended. Specifically, at the time of transmitting data, the conversion unit 131 converts the Tx data supplied from the HDMI(R) source 71 into a differential signal, supplies one of partial signals constituting the differential signal obtained by the conversion to the switch 133, and transmits the other one of the partial signals to the receiver 82 via the signal line 141. The switch 133 transmits the partial signal supplied from the conversion unit 131 to the receiver 82 via the CEC line 84. As a result, the differential signal corresponding to the Tx data is transmitted from the HDMI(R) source 71 to the HDMI(R) sink 72.

Further, at the time of receiving data, the decode unit 183 receives the differential signal corresponding to the Rx data, that has been transmitted from the receiver 82. Specifically, the switch 181 receives the partial signal of the differential signal corresponding to the Rx data, that has been transmitted from the receiver 82 via the SDA line 191, and supplies the received partial signal to the decode unit 183. Moreover, the switch 182 receives the other one of the partial signals of the differential signal corresponding to the Rx data, that has been transmitted from the receiver 82 via the SCL line 192, and supplies the received partial signal to the decode unit 183. The decode unit 183 decodes the differential signal constituted of the partial signals supplied from the switch 181 and the switch 182 into Rx data as the original data, and outputs it to the HDMI(R) source 71.

Accordingly, the HDMI(R) source 71 transmits and receives various types of data such as control data, pixel data, and audio data to/from the HDMI(R) sink 72.

Further, when judged in Step S75 that full-duplex communication is not possible, in Step S80, the respective units of the HDMI(R) source 71 transmit and receive CEC signals to perform bidirectional communication with the HDMI(R) sink 72, and the communication processing is thus ended.

Specifically, by transmitting a CEC signal to the receiver 82 via the switch 133 and the CEC line 84 at the time of transmitting data and receiving a CEC signal transmitted from the receiver 82 via the switch 133 and the CEC line 84 at the time of receiving data, the HDMI(R) source 71 transmits and receives control data to/from the HDMI(R) sink 72.

Thus, the HDMI(R) source 71 references the full-duplex flag and performs full-duplex communication with the HDMI (R) sink 72 that can perform the full-duplex communication using the CEC line 84 and signal line 141 and the SDA line 191 and SCL line 192.

By thus switching the switch 133, the switch 181, and the switch 182 to select the data to be transmitted and the data to be received and performing full-duplex communication with the HDMI(R) sink 72 using the CEC line 84 and signal line 141 and the SDA line 191 and SCL line 192, high-speed bidirectional communication can be performed while maintaining compatibility with the conventional HDMI(R).

Moreover, also when the HDMI(R) sink 72 has the structure shown in FIG. 7, the HDMI(R) sink 72 carries out communication processing as in the case of the HDMI(R) sink 72 shown in FIG. 6, and performs bidirectional communication with the HDMI(R) source 71.

Hereinafter, referring to a flowchart of FIG. 13, communication processing carried out by the HDMI(R) sink 72 shown in FIG. 7 will be described.

In Step S111, the HDMI(R) sink 72 judges whether a new electronic apparatus has been connected to the HDMI(R) sink 72. When judged in Step S111 that a new electronic apparatus is not connected, communication is not performed, and the communication processing therefore ends.

On the other hand, when judged in Step S111 that a new electronic apparatus has been connected, in Step S112, the switching control unit 972 controls the switch 185 and the switch 186 and switches the switch 185 and the switch 186 so that an SDA signal from the HDMI(R) sink 72 is selected by the switch 185 at a time of transmitting data and an SDA signal from the transmitter 81 is selected by the switch 185 and an SCL signal from the transmitter 81 is selected by the switch 186 at a time of receiving data.

In Step S113, the switching control unit 124 controls the switch 135 and switches the switch 135 so that a CEC signal from the HDMI(R) sink 72 is selected at the time of transmitting data and a CEC signal from the transmitter 81 is selected at the time of receiving data.

In Step S114, the HDMI(R) sink 72 reads out E-EDID from the EDIDROM 85 and transmits the read-out E-EDID to the HDMI(R) source 71 via the switch 185 and the SDA line 191 of the DDC 83.

In Step 5115, the HDMI(R) sink 72 judges whether channel information transmitted from the HDMI(R) source 71 has been received.

Specifically, channel information indicating a channel used for bidirectional communication is transmitted from the HDMI(R) source 71 according to functions of the HDMI(R) source 71 and the HDMI(R) sink 72. When the HDMI(R) source 71 has the structure shown in FIG. 7, for example, since the HDMI(R) source 71 and the HDMI(R) sink 72 can perform full-duplex communication, channel information notifying that IP communication by a full-duplex communication system that uses the CEC line 84 and signal line 141 and the SDA line 191 and SCL line 192 is to be performed is transmitted from the HDMI(R) source 71 to the HDMI(R) sink 72. Thus, The HDMI(R) sink 72 receives the channel information transmitted from the HDMI(R) source 71 via the switch 135 and the CEC line 84 and judges that the channel information has been received.

On the other hand, when the HDMI(R) source 71 does not have the function of performing full-duplex communication, channel information is not transmitted from the HDMI(R) source 71 to the HDMI(R) sink 72. Thus, the HDMI(R) sink 72 judges that channel information is not received.

When judged in Step S115 that the channel information has been received, the process advances to Step S116 in which the switching control unit 972 controls the switch 185 and the switch 186 and switches the switch 185 and the switch 186 so that a differential signal corresponding to Rx data from the conversion unit 184 is selected at the time of transmitting data.

In Step S117, the switching control unit 124 controls the switch 135 and switches the switch 135 so that a differential signal corresponding to Tx data from the transmitter 81 is selected at the time of receiving data.

In Step S118, the respective units of the HDMI(R) sink 72 perform bidirectional IP communication with the HDMI(R) source 71 using a full-duplex communication system, and the communication processing is thus ended. Specifically, at the time of transmitting data, the conversion unit 184 converts the Rx data supplied from the HDMI(R) sink 72 into a differential signal, supplies one of partial signals constituting the differential signal obtained by the conversion to the switch 185, and supplies the other one of the partial signals to the switch 186. The switch 185 and the switch 186 transmit the partial signals supplied from the conversion unit 184 to the transmitter 81 via the SDA line 191 and the SCL line 192. As a result, the differential signal corresponding to the Rx data is transmitted from the HDMI(R) sink 72 to the HDMI(R) source 71.

Further, at the time of receiving data, the decode unit 136 receives the differential signal corresponding to the Tx data transmitted from the transmitter 81. Specifically, the switch 135 receives a partial signal of the differential signal corresponding to the Tx data, that has been transmitted from the transmitter 81 via the CEC line 84, and supplies the received partial signal to the decode unit 136. The decode unit 136 decodes the differential signal constituted of the partial signal supplied from the switch 135 and the partial signal supplied from the transmitter 81 via the signal line 141 into Tx data as the original data, and outputs it to the HDMI(R) sink 72.

Accordingly, the HDMI(R) sink 72 transmits and receives various types of data such as control data, pixel data, and audio data to/from the HDMI(R) source 71.

Further, when judged in Step S115 that the channel information is not received, in Step S119, the respective units of the HDMI(R) sink 72 transmit and receive CEC signals to perform bidirectional communication with the HDMI(R) source 71, and the communication processing is thus ended.

As described above, upon receiving the channel information, the HDMI(R) sink 72 performs full-duplex communication with the HDMI(R) sink 72 using the CEC line 84 and signal line 141 and the SDA line 191 and SCL line 192.

By thus switching the switch 135, the switch 185, and the switch 186 to select the data to be transmitted and the data to be received and performing full-duplex communication with the HDMI(R) source 71 using the CEC line 84 and signal line 141 and the SDA line 191 and SCL line 192, the HDMI(R) sink 72 can perform high-speed bidirectional communication while maintaining compatibility with the conventional HDMI(R).

It should be noted that in the example of FIG. 7, the HDMI (R) source 71 has a structure in which the conversion unit 131 is connected to the CEC line 84 and the signal line 141 and the decode unit 183 is connected to the SDA line 191 and the SCL line 192. However, a structure in which the decode unit 183 is connected to the CEC line 84 and the signal line 141 and the conversion unit 131 is connected to the SDA line 191 and the SCL line 192 is also possible.

In such a case, the switch 181 and the switch 182 are connected to the decode unit 183 as well as the CEC line 84 and the signal line 141, and the switch 133 is connected to the conversion unit 131 as well as the SDA line 191.

Further, the HDMI(R) sink 72 shown in FIG. 7 may also have a structure in which the conversion unit 184 is connected to the CEC line 84 and the signal line 141 and the decode unit 136 is connected to the SDA line 191 and the SCL line 192. In such a case, the switch 185 and the switch 186 are connected to the conversion unit 184 as well as the CEC line 84 and the signal line 141 and the switch 135 is connected to the decode unit 136 as well as the SDA line 191.

Furthermore, it is also possible for the CEC line 84 and the signal line 141 to be the replaced with the SDA line 191 and the SCL line 192 in FIG. 6. In other words, the conversion unit 131 and the decode unit 132 of the HDMI(R) source 71 and the conversion unit 134 and the decode unit 136 of the HDMI (R) sink 72 may be connected to the SDA line 191 and the SCL line 192 so that the HDMI(R) source 71 and the HDMI (R) sink perform IP communication using a half-duplex communication system. In addition, in this case, a reserved pin of a connector to which the signal line 141 is connected may be used to detect a connection of an electronic apparatus.

Moreover, the HDMI(R) source 71 and the HDMI(R) sink 72 may each have both of the function of performing half-duplex communication and the function of performing full-duplex communication. In such a case, the HDMI(R) source 71 and the HDMI(R) sink 72 can perform IP communication using a half-duplex communication system or a full-duplex communication system according to a function of an electronic apparatus connected thereto.

In a case where the HDMI(R) source 71 and the HDMI(R) sink 72 each have both of the function of performing half-duplex communication and the function of performing full-duplex communication, the HDMI(R) source 71 and the HDMI(R) sink 72 are structured as shown in FIG. 14, for example. It should be noted that in FIG. 14, parts corresponding to those of FIGS. 6 and 7 are denoted by the same reference numerals, and descriptions thereof will be omitted as appropriate.

The HDMI(R) source 71 shown in FIG. 14 is constituted of the transmitter 81, the switching control unit 121, the timing control unit 122, and the switching control unit 971. The transmitter 81 is provided with the conversion unit 131, the decode unit 132, the switch 133, the switch 181, the switch 182, and the decode unit 183. In other words, the HDMI(R) source 71 of FIG. 14 has a structure in which the timing control unit 122 and the decode unit 132 of FIG. 6 are added to the HDMI(R) source 71 shown in FIG. 7.

Moreover, the HDMI(R) sink 72 shown in FIG. 14 is constituted of the receiver 82, the timing control unit 123, the switching control unit 124, and the switching control unit 972. The receiver 82 is provided with the conversion unit 134, the switch 135, the decode unit 136, the conversion unit 184, the switch 185, and the switch 186. In other words, the HDMI (R) sink 72 of FIG. 14 has a structure in which the timing control unit 123 and the conversion unit 134 of FIG. 6 are added to the HDMI(R) sink 72 shown in FIG. 7.

Next, communication processing carried out by the HDMI (R) source 71 and the HDMI(R) sink 72 shown in FIG. 14 will be described.

First, referring to a flowchart of FIG. 15, communication processing carried out by the HDMI(R) source 71 shown in FIG. 14 will be described. It should be noted that since processes of Steps S151 to S154 are the same as the processes of Steps S71 to S74 of FIG. 12, descriptions thereof will be omitted.

In Step S155, the HDMI(R) source 71 judges whether full-duplex communication with the HDMI(R) sink 72 is possible. In other words, the HDMI(R) source 71 references E-EDID received from the HDMI(R) sink 72 to judge whether the full-duplex flag "Full Duplex" of FIG. 9 is set.

When judged in Step S155 that full-duplex communication is possible, that is, the HDMI(R) sink 72 shown in FIG. 14 or 7 is connected to the HDMI(R) source 71, in Step S156, the switching control unit 971 controls the switch 181 and the switch 182 and switches the switch 181 and the switch 182 so that a differential signal corresponding to Rx data from the receiver 82 is selected at a time of receiving data.

On the other hand, when judged in Step S155 that full-duplex communication is not possible, in Step S157, the HDMI(R) source 71 judges whether half-duplex communication is possible. Specifically, the HDMI(R) source 71 references the received E-EDID to judge whether the half-duplex flag "Half Duplex" of FIG. 9 is set. In other words, the HDMI(R) source 71 judges whether the HDMI(R) sink 72 shown in FIG. 6 is connected to the HDMI(R) source 71.

When judged in Step S157 that half-duplex communication is possible or when the switch 181 and the switch 182 are switched in Step S156, in Step S158, the HDMI(R) source 71 transmits channel information to the receiver 82 via the switch 133 and the CEC line 84.

Here, since the HDMI(R) sink 72 has the function of performing full-duplex communication when it is judged in Step S155 that full-duplex communication is possible, the HDMI (R) source 71 transmits to the receiver 82 via the switch 133 and the CEC line 84, as the channel information, a signal notifying that IP communication using the CEC line 84 and signal line 141 and the SDA line 191 and SCL line 192 is to be performed.

Further, since the HDMI(R) sink 72 has the function of performing half-duplex communication although not having the function of performing full-duplex communication when it is judged in Step S157 that half-duplex communication is possible, the HDMI(R) source 71 transmits to the receiver 82 via the switch 133 and the CEC line 84, as the channel information, a signal notifying that IP communication using the CEC line 84 and the signal line 141 is to be performed.

In Step S159, the switching control unit 121 controls the switch 133 and switches the switch 133 so that a differential signal corresponding to Tx data from the conversion unit 131 is selected at a time of transmitting data and a differential signal corresponding to Rx data transmitted from the receiver 82 is selected at a time of receiving data. It should be noted that when the HDMI(R) source 71 and the HDMI(R) sink 72 perform full-duplex communication, at the time data is received in the HDMI(R) source 71, a differential signal corresponding to Rx data is not transmitted from the receiver 82 via the CEC line 84 and the signal line 141. Therefore, the decode unit 132 is not supplied with a differential signal corresponding to Rx data.

In Step S160, the respective units of the HDMI(R) source 71 perform bidirectional IP communication with the HDMI(R) sink 72, and the communication processing is thus ended.

Specifically, when the HDMI(R) source 71 performs full-duplex communication with the HDMI(R) sink 72 and when performing half-duplex communication therewith, at a time of transmitting data, the conversion unit 131 converts Tx data supplied from the HDMI(R) source 71 into a differential signal, transmits one of partial signals constituting the differential signal obtained by the conversion to the receiver 82 via the switch 133 and the CEC line 84, and transmits the other one of the partial signals to the receiver 82 via the signal line 141.

Moreover, when the HDMI(R) source 71 performs full-duplex communication with the HDMI(R) sink 72, at the time of receiving data, the decode unit 183 receives the differential signal corresponding to the Rx data, that has been transmitted from the receiver 82, decodes the received differential signal into Rx data as the original data, and outputs it to the HDMI(R) source 71.

On the other hand, when the HDMI(R) source 71 performs half-duplex communication with the HDMI(R) sink 72, at the time of receiving data, the decode unit 132 receives the differential signal corresponding to the Rx data, that has been transmitted from the receiver 82, under control of the timing control unit 122, decodes the received differential signal into Rx data as the original data, and outputs it to the HDMI(R) source 71.

Accordingly, the HDMI(R) source 71 transmits and receives various types of data such as control data, pixel data, and audio data to/from the HDMI(R) sink 72.

Further, when judged in Step S157 that half-duplex communication is not possible, in Step S161, the respective units of the HDMI(R) source 71 transmit and receive CEC signals via the CEC line 84 to perform bidirectional communication with the HDMI(R) sink 72, and the communication processing is thus ended.

As described above, the HDMI(R) source 71 references the full-duplex flag and the half-duplex flag and performs full-duplex communication or half-duplex communication according to the function of the HDMI(R) sink 72 as a communication counterpart.

By thus switching the switch 133, the switch 181, and the switch 182 to select the data to be transmitted and the data to be received according to the function of the HDMI(R) sink 72 as the communication counterpart and performing full-duplex communication or half-duplex communication, high-speed bidirectional communication can be performed by selecting an optimal communication method while maintaining compatibility with the conventional HDMI(R).

Next, referring to a flowchart of FIG. 16, communication processing carried out by the HDMI(R) sink 72 shown in FIG. 14 will be described. It should be noted that since processes of Steps S191 to S194 are the same as the processes of Steps S111 to S114 of FIG. 13, descriptions thereof will be omitted.

In Step S195, the HDMI(R) sink 72 receives channel information transmitted from the HDMI(R) source 71 via the switch 135 and the CEC line 84. It should be noted that when the HDMI(R) source 71 connected to the HDMI(R) sink 72 does not have the function of performing full-duplex communication nor the function of performing half-duplex communication, channel information is not transmitted from the HDMI(R) source 71 to the HDMI(R) sink 72. Thus, the HDMI(R) sink 72 does not receive channel information.

In Step S196, the HDMI(R) sink 72 judges whether to perform full-duplex communication based on the received channel information. When having received channel information that notifies that IP communication using the CEC line 84 and signal line 141 and the SDA line 191 and SCL line 192 is to be performed, for example, the HDMI(R) sink 72 judges that full-duplex communication is to be performed.

When judged in Step S196 that full-duplex communication is to be performed, in Step S197, the switching control unit 972 controls the switch 185 and the switch 186 and switches the switch 185 and the switch 186 so that a differential signal corresponding to Rx data from the conversion unit 184 is selected at a time of transmitting data.

Further, when judged in Step S196 that full-duplex communication is not to be performed, in Step S198, the HDMI(R) sink 72 judges whether to perform half-duplex communication based on the received channel information. When having received channel information that notifies that IP communication using the CEC line and the signal line 141 is to be performed, the HDMI(R) sink 72 judges that half-duplex communication is to be performed.

When judged in Step S198 that half-duplex communication is to be performed or when the switch 185 and the switch 186 are switched in Step S197, in Step S199, the switching control unit 124 controls the switch 135 and switches the switch 135 so that a differential signal corresponding to Rx data from the conversion unit 134 is selected at a time of transmitting data and a differential signal corresponding to Tx data from the transmitter 81 is selected at a time of receiving data.

It should be noted that when the HDMI(R) source 71 and the HDMI(R) sink 72 perform full-duplex communication, at the time data is transmitted in the HDMI(R) sink 72, a differential signal corresponding to Rx data is not transmitted from the conversion unit 134 to the transmitter 81. Thus, the switch 135 is not supplied with the differential signal corresponding to Rx data.

In Step S200, the respective units of the HDMI(R) sink 72 perform bidirectional IP communication with the HDMI(R) source 71, and the communication processing is thus ended.

Specifically, when the HDMI(R) sink 72 performs full-duplex communication with the HDMI(R) source 71, at the time of transmitting data, the conversion unit 184 converts the Rx data supplied from the HDMI(R) sink 72 into a differential signal, transmits one of partial signals constituting the differential signal obtained by the conversion to the transmitter 81 via the switch 185 and the SDA line 191, and transmits the other one of the partial signals to the transmitter 81 via the switch 186 and the SCL line 192.

Further, when the HDMI.(R) sink 72 performs half-duplex communication with the HDMI(R) source 71, at the time of transmitting data, the conversion unit 134 converts the Rx data supplied from the HDMI(R) sink 72 into a differential signal, transmits one of partial signals constituting the differential signal obtained by the conversion to the transmitter 81 via the switch 135 and the CEC line 84, and transmits the other one of the partial signals to the transmitter 81 via the signal line 141.

Furthermore, when the HDMI(R) sink 72 performs full-duplex communication with the HDMI(R) source 71 and when performing half-duplex communication therewith, at the time of receiving data, the decode unit 136 receives a differential signal corresponding to Tx data, that has been transmitted from the transmitter 81, decodes the received differential signal into Tx data as the original data, and outputs it to the HDMI(R) sink 72.

Moreover, when judged in Step S198 that half-duplex communication is not to be performed, that is, when channel information is not received, in Step S201, the respective units of the HDMI(R) sink 72 transmit and receive CEC signals to perform bidirectional communication with the HDMI(R) source 71, and the communication processing is thus ended.

As described above, the HDMI(R) sink 72 performs full-duplex communication or half-duplex communication according to the received channel information, that is, the function of the HDMI(R) source 71 as a communication counterpart.

By thus switching the switch 135, the switch 185, and the switch 186 to select the data to be transmitted and the data to be received according to the function of the HDMI(R) source 71 as the communication counterpart and performing full-duplex communication or half-duplex communication, high-speed bidirectional communication can be performed by selecting an optimal communication method while maintaining compatibility with the conventional HDMI(R).

Further, by connecting the HDMI(R) source 71 and the HDMI(R) sink 72 by the HDMI(R) cable 35 including the CEC line 84 and signal line 141 that are mutually connected as a differential twist pair, shielded, and grounded to a ground line and the SDA line 191 and SCL line 192 that are mutually connected as a differential twist pair, shielded, and grounded to a ground line, high-speed bidirectional IP communication using a half-duplex communication system or a full-duplex communication system can be performed while maintaining compatibility with the conventional HDMI(R) cable.

By selecting data to be transmitted out of one or a plurality of pieces of data to be transmitted and transmitting the selected data to a communication counterpart via a predetermined signal line, and by selecting data to be received out of one or a plurality of pieces of data to be received that is/are transmitted from the communication counterpart and receiving the selected data, high-speed bidirectional IP communication can be performed between the HDMI(R) source 71 and the HDMI(R) sink 72 via the HDMI(R) cable 35 while maintaining compatibility as an HDMI(R), that is, while allowing pixel data of an uncompressed picture to be transmitted unidirectionally at high speed from the HDMI(R) source 71 to the HDMI(R) sink 72.

As a result, in a case where a source apparatus as an electronic apparatus that incorporates the HDMI(R) source 71, such as the reproducing apparatus 33 shown in FIG. 2, has a function as a server such as a DLNA (Digital Living Network Alliance) and a sink apparatus as an electronic apparatus that incorporates the HDMI(R) sink 72, such as the digital TV 31 shown in FIG. 2, has a communication interface for a LAN such as the Ethernet (registered trademark), through bidirectional IP communication via an electronic apparatus such as the amplifier 32 connected directly or via an HDMI(R) cable, it is possible to transmit a content from the source apparatus to the sink apparatus via the HDMI (R) cable and also transmit a content from the source apparatus, from the sink apparatus to another apparatus (e.g., digital TV 34 shown in FIG. 2) connected to the LAN communication interface of the sink apparatus.

Furthermore, by the bidirectional IP communication between the HDMI(R) source 71 and the HDMI(R) sink 72, control commands and responses can be exchanged at high speed between the source apparatus incorporating the HDMI (R) source 71 and the sink apparatus incorporating the HDMI (R) sink 72, which are connected by the HDMI(R) cable 35, and it becomes possible to perform quick-response inter-apparatus control.

The series of processes described above may be realized by dedicated hardware or software. When the series of processes are realized by software, a program constituting that software is installed in, for example, a microcomputer that controls the HDMI(R) source 71 and the HDMI(R) sink 72.

In this regard, FIG. 17 shows a structural example of an embodiment of a computer in which a program for executing the series of processes described above is installed.

The program can be recorded in advance in an EEPROM (Electrically Erasable Programmable Read-only Memory) 305 or a ROM 303 as a built-in recording medium of a computer.

Alternatively, the program can be stored (recorded) temporarily or permanently in a removable recording medium such as a flexible disc, a CD-ROM (Compact Disc Read Only Memory), an MO (Magneto Optical) disc, a DVD (Digital Versatile Disc), a magnetic disc, and a semiconductor memory. Such a removable recording medium can be provided as so-called package software.

It should be noted that in addition to being installed in a computer from the removable recording medium as described above, the program may be transferred wirelessly to a computer from a download site via a satellite for digital satellite broadcast or transferred to the computer by wire via a network such as a LAN or the Internet so that the computer can receive the thus-transferred program by an input/output interface 306 and install it in the built-in EEPROM 305.

The computer includes a built-in CPU (Central Processing Unit) 302. The input/output interface 306 is connected to the CPU 302 via a bus 301, and the CPU 302 loads the program stored in the ROM (Read Only Memory) 303 or the EEPROM 305 into a RAM (Random Access Memory) 304 and executes it. Accordingly, the CPU 302 carries out the processing according to the flowcharts described above or processing carried out by the structures in the block diagrams described above.

Here, in the specification, process steps that describe a program for causing a computer to execute various types of processing do not necessarily need to be processed in time-series along a sequence described in the flowchart, and processes that are executed in parallel or individually (e.g., parallel process or process by object) are also included.

Moreover, the program may be processed by a single computer or may be processed dispersively by a plurality of computers.

In this embodiment, bidirectional IP communication is performed between the HDMI(R) source 71 and the HDMI (R) sink 72 by controlling a timing of selecting data and a reception timing and transmission timing of a differential signal as necessary. However, bidirectional communication may instead be performed by a protocol other than the IP.

It should be noted that an embodiment of the present invention is not limited to the above embodiment, and various modifications may be made without departing from the gist of the present invention.

According to the above embodiment, bidirectional communication can be performed. In particular, it is possible to perform high-speed bidirectional communication while maintaining compatibility in a communication interface capable of unidirectionally transmitting pixel data of an uncompressed picture and audio data associated with that picture at high speed, for example.

Incidentally, although some parts overlap the technique that has already been described above, many audio/video apparatuses are implemented with a LAN communication function for the purposes of bidirectional program viewing, high-level remote control, a reception of an electronic program table, and the like.

As means for forming a network among the audio/video apparatuses, there are options including laying of a dedicated cable such as CAT5, wireless communication, and lamp line communication.

However, a dedicated cable makes an inter-apparatus connection complex, and wireless or lamp line connection is disadvantageous in that a complex modulation circuit and transceiver are expensive.

In this regard, in the above embodiment, there is disclosed a technique of adding a LAN communication function without adding a new connector electrode to the HDMI.

Since the HDMI is an interface for performing video and audio data transmission, replacement and authentication of connected apparatus information, and communication of apparatus control data by using one cable, an advantage that LAN communication can be performed with an addition of the LAN function thereto, without using a dedicated cable nor wireless communication, is large.

Incidentally, in the technique disclosed as the above embodiment, the differential transmission channel used in the LAN communication is used for the replacement and authentication of connected apparatus information and communication of apparatus control data.

In the HDMI, connected apparatus electric characteristics are severely restricted in terms of a parasitic capacitance and an impedance also with respect to DDC that performs replacement and authentication of connected apparatus information and CEC that performs communication of apparatus control data.

Specifically, a DDC terminal parasitic capacitance of an apparatus is required to be 50 pF or less. The connection terminal is required to be grounded to ground GND at 200Ω or less at a time of LOW output and connected by pull-up to a power source at about 2Ω in a HIGH state.

On the other hand, transmission/reception terminals are required to be terminated at at least about 100Ω in a high frequency range in order to stabilize communication in LAN communication for transmitting a high-speed signal.

FIG. 19 shows a state where a transmitter 404 and a transmitter 405 for LAN communication, that are constantly connected to DDC lines of an existing HDMI source apparatus 401 and HDMI sink apparatus 402, are AC-coupled.

In order to satisfy the DDC parasitic capacitance restrictions, it is required that a LAN transmitter/receiver circuit added to the DDC lines has AC coupling via a sufficiently small capacitance. Since a LAN signal is largely attenuated and distorted, there is a fear that the transmitter/receiver circuit for compensating this may become complex and expensive.

A transition between HIGH and LOW during DDC communication may hinder LAN communication. In other words, there is a fear that the LAN does not function during a DDC communication period.

In this regard, hereinafter, as a more preferable embodiment, a description will be given on a communication system having a characteristic that, in an interface that performs video and audio data transmission, replacement and authentication of connected apparatus information, communication of apparatus control data, and LAN communication by using basically one cable, the LAN communication is performed by bidirectional communication via a pair of differential transmission channels and a connection state of the interface is notified based on a DC bias potential of at least one of the transmission channels.

The technique described hereinbelow does not necessarily need to have a selection unit as in the above embodiment.

FIG. 18 is a circuit diagram showing a first structural example of the communication system in which a connection state of the interface is notified based on a DC bias potential of at least one of the transmission channels.

FIG. 19 is a diagram showing a structural example of the system in a case where the Ethernet (registered trademark) is used.

As shown in FIG. 18, a communication system 400 is constituted of a LAN function expansion HDMI (hereinafter, abbreviated to EH) source apparatus 401, an EH sink apparatus 402, an EH cable 403 for connecting the EH source apparatus and the EH sink apparatus, an Ethernet (registered trademark) transmitter 404, and an Ethernet (registered trademark) receiver 405.

The EH source apparatus 401 includes a LAN signal transmitter circuit 411, a terminating resistor 412, AC coupling capacitors 413 and 414, a LAN signal receiver circuit 415, a subtracting circuit 416, a pull-up resistor 421, a resistor 422 and a capacitor 423 forming a low-pass filter, a comparator 424, a pull-down resistor 431, a resistor 432 and a capacitor 433 forming a low-pass filter, and a comparator 434.

The EH sink apparatus 402 includes a LAN signal transmitter circuit 441, a terminating resistor 442, AC coupling capacitors 443 and 444, a LAN signal receiver circuit 445, a subtracting circuit 446, a pull-down resistor 451, a resistor 452 and a capacitor 453 forming a low-pass filter, a comparator 454, a choke coil 461, and resistors 462 and 463 serially connected between a power source potential and a reference potential.

Provided in the EH cable 403 are differential transmission channels constituted of a reserved line 501 and an HPD Line 502, and a source-side terminal 511 of the reserved line 501, a source-side terminal 512 of the HPD Line 502, a sink-side terminal 521 of the reserved line 501, and a sink-side terminal 522 of the HPD line are formed. The reserved line 501 and the HPD line 502 are connected as a differential twist pair.

In this case, the source-side terminal 511 of the reserved line 501 and the source-side terminal 512 of the HPD Line 502 function as a second transmission channel. Moreover, the sink-side terminal 521 of the reserved line 501 and the sink-side terminal 522 of the HPD Line function as a second reception channel.

In the communication system 400 having the structure as described above, the terminals 511 and 512 are connected to the terminating resistor 412, the LAN signal transmitter circuit 411, and the LAN signal receiver circuit 415 via the AC coupling capacitors 413 and 414 in the EH source apparatus 401.

The subtracting circuit 416 receives a sum signal SG417 of a transmission signal voltage generated by a current output from the LAN signal transmitter circuit 411 with the terminating resistor 412 and transmission channels 501 and 502 as a load, and a reception signal voltage as a signal transmitted from the EH sink apparatus 402.

In the subtracting circuit 416, a signal SG413 obtained by subtracting a transmission signal SG411 from the sum signal SG412 is a net signal transmitted from the sink.

The sink apparatus 402 has a similar circuit network, and by those circuits, the source apparatus 4011 and the sink apparatus 402 perform bidirectional LAN communication.

In addition to the LAN communication described above, the HPD line 502 notifies the source apparatus 401 that the cable 403 has been connected to the sink apparatus 402 by a DC bias level.

The resistors 462 and 463 and the choke coil 461 of the sink apparatus 402 bias the HPD line 502 to about 4 V via the terminal 522 when the cable 403 is connected to the sink apparatus 402.

The source apparatus 401 extracts a DC bias of the HPD line 502 by the low-pass filter constituted of the resistor 432 and the capacitor 433, and the comparator 434 compares it with a reference potential Vref2 (e.g., 1.4 V).

If the cable 403 is not connected to the source apparatus 402, a potential of the terminal 512 is lower than the reference potential Vref2 at the pull-down resistor 431 and is higher if connected.

Therefore, if an output signal SG415 of the comparator 434 is HIGH, it indicates that the cable 403 is connected to the sink apparatus 402.

On the other hand, if the output signal SG415 of the comparator 434 is LOW, it indicates that the cable 403 is not connected to the sink apparatus 402.

In the first structural example, there is additionally provided a function of mutually recognizing, from a DC bias potential of the reserved line 501, which of an EH-compliant apparatus and a non-EH-compliant HDMI apparatus the apparatuses connected at both ends of the cable 403 are.

The EH source apparatus 401 pulls up (+5 V) the reserved line 501 by the resistor 421, and the EH sink apparatus 402 pulls it down by the resistor 451.

These resistors 421 and 451 do not exist in the non-EH-compliant apparatus.

The comparator 424 of the EH source apparatus 401 compares a DC potential of the reserved line 501 that has passed through the low-pass filter constituted of the resistor 422 and capacitor 423 with a reference voltage Vref1.

If the sink apparatus 402 supports EH and has a pull down, the potential of the reserved line 501 becomes 2.5 V, and if not supporting EH and is opened, the potential becomes 5 V. Therefore, if the reference potential Vref1 is set to 3.75 V, it is possible to make a distinction between a compliant sink apparatus and a non-compliant sink apparatus.

The comparator 454 of the sink apparatus 402 compares a DC potential of the reserved line 501 that has passed through the low-pass filter constituted of the resistor 452 and the capacitor 453 with a reference voltage Vref3.

If the source apparatus 402 supports EH and has a pull-up function, the potential becomes 2.5 V, and if not supporting EH, the potential becomes 0 V. Therefore, if the reference potential is set to 1.25 V, it is possible to make a distinction between an EH-compliant apparatus and a non-EH-compliant apparatus.

As described above, according to the first structural example, in the interface that performs video and audio data transmission, replacement and authentication of connected apparatus information, communication of apparatus control data, and LAN communication by using one cable 403, the LAN communication is performed by bidirectional communication via a pair of differential transmission channels, and a connection state of the interface is notified by a DC bias potential of at least one of the transmission channels. Therefore, it becomes possible to perform spatial separation in which the SCL line and the SDA line are not physically used in LAN communication.

As a result, due to the division, a LAN communication circuit can be formed irrespective of an electrical specification defined for DDC, with the result that stable and reliable LAN communication can be realized at a low cost.

It should be noted that it is also possible to provide the pull-up resistor 421 shown in FIG. 18 in the EH cable 403 instead of the EH source apparatus 401. In such a case, terminals of the pull-up resistor 421 are respectively connected to the reserved line 501 and a line (signal line) connected to a power source (power source potential) out of the lines provided in the EH cable 403.

Furthermore, it is also possible to provide the pull-down resistor 451 and the resistor 463 shown in FIG. 18 in the EH cable 403 instead of the EH sink apparatus 402. In such a case, terminals of the pull-down resistor 451 are respectively connected to the reserved line 501 and a line connected to the ground (reference potential) (ground line) out of the lines provided in the EH cable 403. Also, terminals of the resistor 463 are respectively connected to the HPD Line 502 and the line connected to the ground (reference potential) (ground line) out of the lines provided in the EH cable 403.

FIG. 20 is a circuit diagram showing a second structural example of the communication system in which a connection state of the interface is notified by a DC bias potential of at least one of the transmission channels.

Fundamentally similar to the first structural example, a communication system 600 is characterized by having a structure in which, in an interface that performs video and audio data transmission, replacement and authentication of connected apparatus information, communication of apparatus control data, and LAN communication by using one cable, the LAN communication is performed by unidirectional communication via two pairs of differential transmission channels, and a connection state of the interface is notified by a DC bias potential of at least one of the transmission channels, and that at least two transmission channels are used time-divisionally with the LAN communication, for communication for replacement and authentication of connected apparatus information.

As shown in FIG. 20, the communication system 600 is constituted of a LAN function expansion HDMI (hereinafter, abbreviated to EH) source apparatus 601, an EH sink apparatus 602, and an EH cable 603 for connecting the EH source apparatus and the EH sink apparatus.

The EH source apparatus 601 includes a LAN signal transmitter circuit 611, terminating resistors 612 and 613, AC coupling capacitors 614 to 617, a LAN signal receiver circuit 618, an inverter 620, a resistor 621, a resistor 622 and a capacitor 623 forming a low-pass filter, a comparator 624, a pull-down resistor 631, a resistor 632 and a capacitor 633 forming a low-pass filter, a comparator 634, a NOR gate 640, analog switches 641 to 644, an inverter 635, analog switches 646 and 747, DDC transceivers 651 and 652, and pull-up resistors 653 and 654.

The EH sink apparatus 602 includes a LAN signal transmitter circuit 661, terminating resistors 662 and 663, AC coupling capacitors 664 to 667, a LAN signal receiver circuit 668, a pull-down resistor 671, a resistor 672 and a capacitor 673 forming a low-pass filter, a comparator 674, a choke coil 681, resistors 682 and 683 serially connected between a power source potential and a reference potential, analog switches 691 to 694, an inverter 695, analog switches 696 and 697, DDC transceivers 701 and 702, and a pull-up resistor 703.

Provided in the EH cable 603 are differential transmission channels constituted of a reserved line 801 and an SCL line 803 and differential transmission channels constituted of an SDA line 804 and an HPD line 802, and source-side terminals 811 to 814 thereof and sink-side terminals 821 to 824 are formed.

The reserved line 801 and SCL line 803 and the SDA line 804 and HPD line 802 are connected as differential twist pairs. The terminals 811 to 814 connected thereto function as a second transmission channel.

In the communication system 600 structured as described above, the terminals 811 and 813 are connected to the transmitter circuit 611 for transmitting a LAN transmission signal SG611 to the sink and the terminating resistor 612 via the AC coupling capacitors 614 and 615 and the analog switches 641 and 642, in the source apparatus 601.

The terminals 814 and 812 are connected to the receiver circuit 618 for receiving a LAN signal from the sink apparatus 602 and the terminating resistor 613 via the AC coupling capacitors 616 and 617 and the analog switches 643 and 644.

In the sink apparatus 602, the terminals 821 to 824 are connected to the transmitter and receiver circuits 668 and 661 and the terminating resistors 662 and 663 via the AC coupling capacitors 664, 665, 666, and 667 and the analog switches 691 to 694.

The analog switches 641 to 644 and 691 to 694 are turned on when LAN communication is performed and opened when DDC communication is performed.

The source apparatus 601 connects the terminals 813 and 814 to the DDC transceivers 651 and 652 and the pull-up resistors 653 and 654 via other analog switches 646 and 647.

The sink apparatus 602 connects the terminals 823 and 824 to the DDC transceivers 701 and 702 and the pull-up resistor 703 via the analog switches 696 and 697.

The analog switches 646, 647, 696, and 697 are turned on when DDC communication is performed and opened when DLAN communication is performed.

A recognition mechanism of an EH-compliant apparatus based on a potential of the reserved line 801 is basically the same as that of the first structural example except that the resistor 62 of the source apparatus 601 is driven by the inverter 620.

When an input to the inverter 620 is HIGH, the resistor 621 becomes a pull-down resistor, thus providing a 0 V state which is the same as a case where a non-EH-compliant apparatus is connected as seen from the sink apparatus 602.

Consequently, a signal SG623 indicating an EH compliance identification result of the sink apparatus 602 becomes LOW, the analog switches 691 to 694 controlled by the signal SG623 are opened, and the analog switches 696 and 697 controlled by a signal obtained by inverting the signal SG623 by the inverter 695 are turned on.

As a result, the sink apparatus 602 enters a state where the SCL line 803 and the SDA line 804 are disconnected from the LAN transceiver and connected to the DDC transceiver.

On the other hand, in the source apparatus 601, an input to the inverter 620 is also input to the NOR gate 640, and an output SG614 thereof is set to LOW.

The analog switches 641 to 6444 controlled by the output signal SG614 of the NOR gate 640 are opened, and the analog switches 646 and 647 controlled by a signal obtained by inverting the signal SG614 by the inverter 645 are turned on.

As a result, the source apparatus 601 also enters a state where the SCL line 803 and the SDA line 804 are disconnected from the LAN transceiver and connected to the DDC transceiver.

Conversely, when an input to the inverter 620 is LOW, both the source apparatus 601 and the sink apparatus 602 enter a state where the SCL line 803 and the SDA line 804 are disconnected from the DDC transceiver and connected to the LAN transceiver.

The circuits 631 to 634 and 681 to 683 for confirming the connection based on a DC bias potential of the HPD line 802 have the same functions as those of the first structural example.

In other words, in addition to the LAN communication described above, the HPD Line 802 notifies the source apparatus 601 that the cable 803 has been connected to the sink apparatus 602 by a DC bias level.

The resistors 682 and 683 and the choke coil 681 of the sink apparatus 602 bias the HPD line 802 to about 4 V via the terminal 822 when the cable 603 is connected to the sink apparatus 602.

The source apparatus 601 extracts a DC bias of the HPD line 802 by the low-pass filter constituted of the resistor 632 and the capacitor 633, and the comparator 634 compares it with the reference potential Vref2 (e.g., 1.4 V).

If the cable 603 is not connected to the source apparatus 602, a potential of the terminal 812 is lower than the reference potential Vref2 at the pull-down resistor 631 and is higher if connected.

Therefore, if an output signal SG613 of the comparator 634 is HIGH, it indicates that the cable 803 is connected to the sink apparatus 602.

On the other hand, if the output signal SG613 of the comparator 634 is LOW, it indicates that the cable 603 is not connected to the sink apparatus 602.

As described above, according to the second structural example, in the interface that performs video and audio data transmission, replacement and authentication of connected apparatus information, communication of apparatus control data, and LAN communication by using one cable, the LAN communication is performed by unidirectional communication via two pairs of differential transmission channels, and a connection state of the interface is notified by a DC bias potential of at least one of the transmission channels, and further, at least two transmission channels are used time-divisionally with LAN communication, for communication for replacement and authentication of connected apparatus information. Therefore, it is possible to perform a time division to obtain a time slot in which the SCL line and the SDA line are connected to a LAN communication circuit by a switch and a time slot in which they are connected to a DDC circuit and form a LAN communication circuit irrespective of the electrical specification defined for DDC by this division, with the result that stable and reliable LAN communication can be realized at a low cost.

It should be noted that it is also possible to provide the resistor 621 shown in FIG. 20 in the EH cable 603 instead of the EH source apparatus 601. In such a case, terminals of the resistor 621 are respectively connected to the reserved line 801 and a line (signal line) connected to a power source (power source potential) out of the lines provided in the EH cable 603.

Furthermore, it is also possible to provide the pull-down resistor 671 and the resistor 683 shown in FIG. 20 in the EH cable 603 instead of the EH sink apparatus 602. In such a case, terminals of the pull-down resistor 671 are respectively connected to the reserved line 801 and a line connected to the ground (reference potential) (ground line) out of the lines provided in the EH cable 603. Also, terminals of the resistor 683 are respectively connected to the HPD Line 802 and the line connected to the ground (reference potential) (ground line) out of the lines provided in the EH cable 603.

As described heretofore, in the embodiment associated with FIGS. 2 to 17, out of 19 HDMI pins, SDA and SCL are used as a first differential pair, and CEC and Reserved are used as a second pair to thus realize full duplex communication in which unidirectional communication is performed by each pair.

However, for SDA and SCL, H is pull-up of 1.5 KΩ and L is pull-down of low impedance. Also for CEC, H is pull-up of 27 KΩ and L is pull-down of low impedance.

Retaining these functions in order to have compatibility with the existing HDMI may lead to a fear that it becomes difficult to share a function of the LAN for performing high-speed data communication which is required to have ends of a transmission channel matched and terminated.

In this regard, in the first structural example, full duplex communication is realized by one-pair bidirectional communication using Reserved and HPD as a differential pair while avoiding the use of SDA, SCL, and CEC lines.

Since HPD is a flag signal based on a DC level, injection of a LAN signal by AC coupling and transmission of plug information based on a DC level are compatible. Newly added to Reserved is a function of mutually recognizing a terminal having a LAN function by a DC level using a method similar to HPD.

In the second structural example, HPD and SDA, and SCL and Reserved make two pairs of differential pairs to realize two-pair full duplex communication in which unidirectional communication is performed by each pair.

Timings of burst-type DDC communication using SDA and SCL in the HDMI are controlled with the transmitter being a master at all times.

In this example, analog switches are operated so that, when a transmitter performs DDC communication, SDA and SCL lines are connected to the DDC transceiver, and when DDC communication is not performed, the lines are connected to the LAN transceiver.

These switch operation signals are also transmitted to a receiver at a DC level of the Reserved line, and a similar SW switch is performed on the receiver side.

By adopting the structure described above, as a first effect, SCL, SDA, and CEC communication is not influenced by noises in LAN communication and stable DDC and CEC communication can constantly be secured.

This is achieved by physically separating the LAN from those lines in the first structural example and cutting off a LAN signal from the lines by the switches during DDC communication in the second structural example.

As a second effect, it becomes possible to perform stable communication having a large margin because LAN communication is performed by lines having ideal terminations.

This is because, in the first structural example, since a LAN signal is superimposed on lines like Reserved and HPD that transmit a signal only by a DC level, terminating impedance can be maintained at an ideal value in a sufficiently broad frequency band necessary for LAN communication, and in the second structural example, terminating circuits for the LAN unpermitted for DDC communication are connected by the switches only during LAN communication.

FIGS. 21A to 21E are diagrams showing bidirectional communication waveforms in the communication system of the structural examples.

FIG. 21A shows a signal waveform transmitted from an EH sink apparatus, FIG. 21B shows a signal waveform received by the EH sink apparatus, FIG. 21C shows a signal waveform passing through a cable, FIG. 21D shows a signal received by an EH source apparatus, and FIG. 21E shows a signal waveform transmitted from the EH source apparatus.

FIG. 22 is a block diagram showing a structure of a frame rate conversion system according to an embodiment of the present invention.

The frame rate conversion system includes a reproducing apparatus 151 as a transmission apparatus and a display apparatus 161 as a reception apparatus connected to the reproducing apparatus 151 via a cable 4. The reproducing apparatus 151 and the display apparatus 161 are separated. Examples of the reproducing apparatus 151 include a disk player, a digital tuner, a camera-integrated VTR, a decode apparatus for decoding compression-coded data, and various STBs (Set Top Boxes). Examples of the display apparatus 161 include a TV and a display device.

The reproducing apparatus 151 includes a decode unit 152 and a transmission interface 153. For example, encoded video data encoded by a compression coding method that uses a motion vector, such as MPEG (Moving Picture Experts Group), is supplied to the decode unit 152. The compression coding method is not limited to MPEG and any method may be used as long as a motion vector is used as will be described later. The decode unit 152 is, for example, an MPEG-standard decoder.

As is well known, in the decode unit 152, a quantized transform coefficient, a motion vector, an identifier indicating a form of a predictive compensation of each decoded picture, an identifier indicating a display order of the decoded pictures, and the like are decoded by a variable length decode circuit (not shown). Moreover, in the decode unit 152, decoded information is supplied to an inverse quantization circuit or a compensation circuit (not shown). The identifier indicating a form of a predictive compensation indicates which of an in-picture prediction (I picture), a forward-direction prediction (P picture), and a bidirectional prediction (B picture) is being used. Of the quantized transform coefficient, the motion vector, the identifier indicating a form of a predictive compensation, and an identifier indicating a display order, the motion vector, the identifier indicating a form of a predictive compensation, and the identifier indicating a display order are supplied as reference control information to the transmission interface 203.

The transmission interface 153 receives video data decoded by the decode unit 152 and transmits the video data and the reference control information to the display apparatus 161 via the cable 4. The transmission interface 153 is constituted of any one of the HDMI source 71 (see FIG. 3), the EH source 401 (see FIG. 18), and the EH source 601 (see FIG. 20) described above, for example.

For the cable 4, any one of the HDMI cable 35 (see FIG. 3), the EH cable 403 (see FIG. 18), and the EH cable 603 (see FIG. 20) described above is used, for example.

The reproducing apparatus 151 includes circuits requisite therefor, such as a CPU 41, a RAM 42, and a ROM 43. Blocks of the reproducing apparatus 151 function under control of the CPU 41.

The display apparatus 161 includes a reception interface 163 and a frame rate conversion unit 162. The frame rate conversion unit 162 includes a video buffer 164, a motion vector buffer 165, an interpolation vector generation unit 166, an interpolation frame generation unit 167, and a selector 168.

The reception interface 163 is connected to the cable 4 and receives the video data transmitted from the reproducing apparatus 151 via the cable 4. The reception interface 163 is constituted of any one of the HDMI sink 72, the EH sink 402, and the EH sink 602 described above, for example.

The transmission interface 153 transmits the decoded video data (also audio data, auxiliary data, etc.) using a TMDS channel as the first channel. On the other hand, the transmission interface 153 transmits reference control information using a high-speed data line as the second channel.

In other words, when the cable 4 is the HDMI cable 35, the high-speed data line is at least one of a CEC line and an HPD line. When the cable 4 is the EH cable 403, the high-speed data line is at least one of the reserved line 501 and the HPD Line 502. Alternatively, when the cable 4 is the EH cable 603, the high-speed data line is at least one of a combination of the reserved line 801 and an SCL line and a combination of an SDA line and an HPD line.

The reception interface 163 supplies the video data from which the reference control information is separated and the identifier indicating a form of a predictive compensation of each picture and an identifier of a display order that are contained in the reference control information to the video buffer 164 as a real-frame picture. In addition, the reception interface 163 supplies the motion vector in the reference control information to the motion vector buffer 165. Moreover, the reception interface 163 uses the reference control information and outputs a control signal for controlling the respective units of the display apparatus 161.

The display apparatus 161 includes circuits requisite therefor, such as a CPU 51, a RAM 52, and a ROM 53. The blocks of the display apparatus 161 function under control of the CPU 51.

Of the reference control information, the reception interface 163 may output, for example, the identifier indicating a form of a predictive compensation and the identifier indicating a display order to supply them to the CPU 51. In this case, the CPU 51 generates the control signal.

The interpolation vector generation unit 166 generates an interpolation vector by using, out of motion vectors stored in the motion vector buffer 165, a motion vector used in a prediction of pictures of real frames before and after an interpolation frame. For example, a length of a motion vector is a length corresponding to a time interval between real frames. Further, in high frame rate display, an interpolation frame is generated so as to be interposed between real frames. Therefore, the interpolation vector generation unit 166 generates an interpolation vector by, for example, converting a motion vector into a length proportional to a time interval between a real frame and an interpolation frame.

The interpolation frame generation unit 167 reads out pictures of real frames before and after the interpolation frame from the video buffer 164 based on the identifiers described above. Then, the interpolation frame generation unit 167 uses the interpolation vector generated by the interpolation vector generation unit 166 to generate an interpolation frame interposed between those pictures based on a prediction.

The selector 168 selectively outputs, at a display timing matched with a converted frame rate, a frame of the picture (real frame) in the video buffer 164 and the interpolation frame generated by the interpolation frame generation unit 167. The high-frame-rated video data thus output from the selector 168 is supplied to a display drive circuit (not shown) of the display apparatus 161 to be displayed on a screen of the display apparatus 161.

Out of the pictures in the video buffer 164, a picture that is selected by the selector 168 and has become unnecessary in generating an interpolation frame is deleted by being overwritten by a picture newly supplied from the reception interface 163. Also, out of the motion vectors in the motion vector buffer 165, a motion vector that has become unnecessary in generating an interpolation vector is deleted by being overwritten by a motion vector newly supplied from the reception interface 163.

Next, an operation of the frame conversion system structured as described above will be described. FIG. 23 is a flowchart showing processing of the reproducing apparatus 151, and FIG. 24 is a flowchart showing processing of the display apparatus 161.

As shown in FIG. 23, in the reproducing apparatus 151, the decode unit 152 decodes a certain amount of encoded video data (Step S1). The decoded video data and reference control information obtained at a time of decode (motion vector and identifiers described above) are supplied to the transmission interface 153 to be transmitted therefrom to the display apparatus 161 (Step S2). After that, the process returns to Step S1 and the process is repeated for the next certain amount of encoded video data.

As shown in FIG. 24, in the display apparatus 161, the reception interface 163 receives the transmitted video data and reference control information (Step S21).

An identifier indicating a form of a predictive compensation of each picture and an identifier indicating a display order in the reference control information are added to the video data, and the data is recorded in the video buffer 164 (Step S22). When there is an unnecessary picture in the video buffer 164 in Step S22, the unnecessary picture is deleted by overwrite. Moreover, the motion vector in the reference control information is recorded in the motion vector buffer 165 (Step S23). When there is an unnecessary motion vector in the motion vector buffer 165 in Step S22, the unnecessary picture is deleted by overwrite.

Subsequently, the CPU 51 judges whether a necessary amount of pictures for generating an interpolation frame have been recorded in the video buffer 164 (Step S24). When judged NO, the process returns to Step S21, and the processes of Steps S21 to S24 are repeated.

Step S24 is carried out for the following purpose. Since, when generating an interpolation frame, pictures of real frames before and after that frame are used, a picture of a real frame displayed after the interpolation frame also becomes necessary. For example, as shown in FIG. 25, in a case where the interpolation frame generation unit 167 generates an interpolation frame represented by C1 between an I picture and a B1 picture as real frames using a motion vector, the I picture, the B1 picture, and a complementary vector that is half the motion vector 73 become necessary. The motion vector 73 is a motion vector between I and B1.

Moreover, a delay time T1 exists before the I picture is read out from the video buffer 164 since being input to the display apparatus 161. Furthermore, a time T2 for generating the interpolation frame C1 becomes necessary. Therefore, a time that the interpolation frame C1 can be displayed on the display apparatus 161 becomes a time between a time the B1 picture as a real frame is input and a time a B2 picture is input.

The same holds true for a case where an interpolation frame represented by C2 is generated between the B1 picture and the B2 picture as real frames or a case where an interpolation frame represented by C3 is generated between the B2 picture and a P picture as real frames.

It should be noted that in the example of FIG. 25, the timing at which the B1 picture is recorded in the video buffer 164 is the same as the timing at which the I picture is displayed. Similarly, the timing at which the B2 picture is recorded is the same as the timing at which the B1 picture is recorded. As a matter of course, those timings do not need to be the same.

In the example of FIG. 25, the interpolation frame has been generated using nearest real frames before and after that. However, real frames that are additionally apart in terms of time may be used instead. For example, as shown in FIG. 25, for generating the interpolation frame C1, an interpolation vector that is ¼ the motion vector 76 between I and B2 and the B2 picture may be used. Alternatively, an interpolation vector that is ⅙ the motion vector 78 between I and P and the P picture may be used. In those cases, a timing at which the interpolation frame is displayed is additionally delayed.

In this regard, in Step S24 of FIG. 24, a judgment is made on whether a necessary amount of pictures for generating an interpolation frame have been recorded. When the amount of pictures is insufficient, the processes of Steps S21 to S24 are repeated.

When judged YES in Step S24, the interpolation vector generation unit 166 generates an interpolation vector by using, out of motion vectors recorded in the motion vector buffer 165, a motion vector used for a prediction of pictures of real frames before and after the interpolation frame (Step S25).

Subsequently, the interpolation frame generation unit 167 reads out pictures of real frames before and after the interpolation frame from the video buffer 164 based on the identifiers, and uses the interpolation vector generated by the interpolation vector generation unit 166 to generate an interpolation frame interposed between those pictures based on a prediction (Step S26).

At a display timing matched with the converted frame rate, the selector 168 selects and outputs a frame of each of the picture in the video buffer 164 and the interpolation frame generated by the interpolation frame generation unit 167 (Step S27). After that, the process returns to Step S21.

As described above, in this embodiment, the reference control information is transmitted via a line connecting the first transmission channel and the second reception channel. Accordingly, a transmission data amount of the reference control information (per unit time) can be made larger than in a case where the reference control information is superimposed on a blanking area.

Further, in a case where the transmission interface 153 and the reception interface 163 are an HDMI, various types of control information have conventionally been transmitted through a CEC line. However, in the frame rate conversion system according to this embodiment, various types of control information are transmitted and received via a high-speed data line connecting the second transmission channel and the second reception channel as described above.

In this embodiment, even when the reproducing apparatus 151 equipped with the decode unit 152 and the display apparatus 161 equipped with the frame rate conversion unit 167 are separated, a frame rate conversion can be carried out without any problem. In other words, the display apparatus 161 can generate a natural interpolation frame using a motion vector and perform a frame rate conversion, without requiring a detection unit having high processing performance for detecting a motion vector within a limited time before a next frame is displayed after the frame rate conversion or power consumption for the detection processing.

Since the interpolation frame is not generated on the reproducing apparatus 151 side in this embodiment, it becomes unnecessary to use a high-transmission-data-amount cable that supports a high frame rate video as the cable 4 that connects the reproducing apparatus 151 and the display apparatus 161.

Since the display apparatus 161 does not perform the decode in this embodiment, it is possible to input output video data from the reproducing apparatus compatible with various coding methods that use a motion vector (reproducing apparatus having a structure in which a decode unit compatible with a coding method that uses a motion vector, other than MPEG, is provided instead of the decode unit 152, and video data and reference control information are supplied to the transmission interface 153 from that decode unit) to the display apparatus and realize a high frame rate thereof.

In this embodiment, the reproducing apparatus 151 includes the second transmission channel for transmitting reference control information in addition to the first transmission channel for transmitting video data. Accordingly, the reproducing apparatus 151 becomes capable of transmitting a large amount of reference control information. Conventionally, in a case where reference control information is superimposed on a blanking area of video data, the reference control information has sometimes been superimposed on the blanking area after being compressed, in view of an allowable data amount in the blanking area. However, the circuits and power consumption for compressing the reference control information as described above become unnecessary.

FIG. 26 is a block diagram showing a structure of a frame rate conversion system according to another embodiment of the present invention. In descriptions below, descriptions on blocks, functions, and the like that are the same as those of the frame rate conversion system according to the embodiment shown in FIG. 22 and the like will be simplified or omitted, and different points will mainly be described.

This frame rate conversion system includes a reproducing apparatus 201 and a display apparatus 231.

A transmission interface 203 of the reproducing apparatus 201 includes a switch 204 (204a, 204b), a superimposition unit 205, a control unit 206, a first transmission channel 207, and a second transmission channel 208.

The superimposition unit 205 is a circuit that superimposes the reference control information described above on a blanking area of decoded video data supplied from a decode unit 202. The video data on which the reference control information has been superimposed by the superimposition unit 205 is transmitted to the display apparatus 231 via the first transmission channel 207 and the cable 4.

The superimposition unit 205 and the switches 204a and 204b do not need to be provided inside the transmission interface 203 and may instead be provided outside the transmission interface 203 in the reproducing apparatus 201, for example.

In a case where the transmission interface 203 is an HDMI, the first transmission channel 207 is a TMDS transmission channel and the second transmission channel 208 is a channel corresponding to a high-speed data line. A structure of the high-speed data line is as described above.

The control unit 206 uses the switch 204 to make a switch between, at predetermined timings, superimposition processing by the superimposition unit 205 and processing of transmitting, without carrying out the superimposition processing by the superimposition unit 205, input video data from the first transmission channel 207 as it is.

When connecting the switch 204a to the superimposition unit 205, the control unit 206 also connects the switch 204b to the superimposition unit 205. Conversely, when not connecting the switch 204a to the superimposition unit 205, the control unit 206 transmits video data from the first transmission channel 207 and also transmits reference control information from the second transmission channel 208 without connecting the switch 204b to the superimposition unit 205.

Alternatively, the lines may be switched with the switch 204b (204a) interlocking with the switch 204a (204b).

Hereinafter, a state where the switches 204a and 204b are connected to the superimposition unit 205 will be referred to as state A and when not, state B, for convenience.

A reception interface 233 of the display apparatus 231 includes a separation unit 235, a first reception channel 237, and a second reception channel 238.

The separation unit 235 is a circuit that separates reference control information from a blanking area of video data received by the first reception channel 237. In a case where reference control information is not superimposed on a blanking area of video data, the input video data is supplied to the frame rate conversion unit 162 as it is. Moreover, in the case where reference control information is not superimposed on a blanking area of video data, the reception interface 233 receives the reference control information via the second reception channel 238.

The separation unit 235 does not need to be provided inside the reception interface 233 and may instead be provided outside the reception interface 233 in the display apparatus 231, for example.

In a case where the reception interface 233 is an HDMI, the first reception channel 237 is a TMDS reception channel and the second reception channel 238 is a high-speed data line.

In a case where the transmission interface 203 and the reception interface 163 are an HDMI, reference control information only needs to be superimposed on video data as follows.

FIG. 27 is a diagram showing an example of a data island area (example where active video is 720×480 pixels) as in-video-frame audio/AUX transmission period in the HDMI. At predetermined pixel positions in a horizontal blanking area corresponding to 138 pixels in each active line and a vertical blanking area corresponding to 45 lines, data island areas are located dispersively.

When the reproducing apparatus 151 and the display apparatus 161 shown in FIG. 22 transmit and receive video data according to an HDMI standard (as HDMI source and HDMI sink, respectively), the superimposition unit 205 and the separation unit 235 may be structured as parts of the HDMI transmitter 81 and the HDMI receiver 82 (see FIG. 3), respectively. It is only necessary for the superimposition unit 205 to superimpose reference control information as a type of AUX data on a data island area of FIG. 27 and the separation unit 235 to separate the reference control information from the data island area.

Next, an operation of the thus-structured frame rate conversion system shown in FIG. 26 will be described. FIG. 28 is a flowchart showing processing of the reproducing apparatus 201. FIG. 29 is a flowchart showing processing of the display apparatus 231.

The decode unit 152 decodes a certain amount of encoded video data (Step S31). The CPU 41 judges whether a data amount of reference control information, for example, exceeds an allowable data amount of reference control information that can be superimposed on a blanking area (Step S32) (judgment means). For example, the CPU 41 judges whether reference control information of video data corresponding to 1 frame, for example, can be accommodated at predetermined pixel positions set in horizontal and vertical blanking areas of video data corresponding to 1 frame (or each of a plurality of frames).

When the data amount of reference control information does not exceed the allowable data amount of reference control information that can be superimposed on a blanking area, the control unit 206 sets the switch 204 to the state A. Accordingly, the control unit 206 superimposes the reference control information on the blanking area and transmits the video data from the first transmission channel 207 (Step S33).

When the data amount of reference control information exceeds the allowable data amount of reference control information that can be superimposed on a blanking area, the control unit 206 sets the switch 204 to the state B. Accordingly, decoded video data is transmitted from the first transmission channel 207 as it is, and reference control information obtained at a time of the decode is transmitted from the second transmission channel 208 (Step S34).

Here, a case where the reproducing apparatus 201 and the display apparatus 231 are connected via a network is also possible. In a case where the second transmission channel 208 and the second reception channel 238 are, for example, the Ethernet (registered trademark), the network is LAN. Thus, when a network is connected between the second transmission channel 208 and the second reception channel 238, a congestion may be caused in the network. In this regard, in Step S5, the control unit 206 judges whether a congestion is caused in the network (Step S35) (judgment means). When a congestion is not caused, the process of Step S34 is continued. When a congestion is caused, the CPU 41 returns to the process of Step S32.

It should be noted that the judgment on whether a congestion is caused in the network only needs to be made based on a packet loss count or rate, a delay time, and the like. Alternatively, the judgment on whether a congestion is caused may be executed by other well-known methods. Moreover, the transmission apparatus may be customizable such that a user can select or set a definition of a congestion.

As shown in FIG. 29, when reference control information is superimposed on video data received by the first reception channel 237 in the display apparatus 231, the separation unit 235 extracts the reference control information from the video data (Step S51a). Processes of Steps S52 to S57 are the same as those of Steps S22 to S27 shown in FIG. 24. When the reference control information is not superimposed on the video data received by the first reception channel 237, the reference control information is received via the second reception channel 238 (Step S51b).

Thus, since a path of reference control information is switched as appropriate, the reproducing apparatus 201 can efficiently transmit reference control information.

An embodiment of the present invention is not limited to the above embodiments, and various other embodiments may be adopted.

The frame rate conversion system is not limited to the structure shown in FIG. 3. For example, in FIG. 3, an apparatus (including PC (Personal Computer) etc.) having at least a function of converting a frame rate may be used instead of the display apparatus 161. In this case, the display apparatus only needs to be connected to the frame rate conversion apparatus.

The Ethernet (registered trademark) has been exemplified as a high-speed data line as the second channel. However, protocols such as ATM (Asynchronous Transfer Mode) and DTM (Dynamic Synchronous Transfer Mode), a wireless protocol such as Wi-Fi, or USB (Universal Serial Bus) may be used. Alternatively, the transmission interface 203 and the reception interface 163 may be wireless interfaces. The HDMI may be wireless.

The flowchart shown in FIG. 28 may be processing that ends in Step S34 without the judgment processing of Step S35. Also, a default of the transmission processing of the reproducing apparatus 201 may be transmission processing of reference control information that uses the second transmission channel 208 (without superimposition processing), and Step S23 may be executed as necessary (e.g., based on judgment processing of Step S32).

Finally, a modified example of the embodiment described in FIGS. 26 to 29 will be described below.

In the above embodiment, the superimposition unit 205 of the reproducing apparatus 201 has superimposed reference control information on a blanking area of video data in an uncompressed manner. However, the superimposition unit 205 may compress the reference control information and superimpose it on the blanking area, and the separation unit 235 of the display apparatus 231 may expand the reference control information separated from the blanking area of the video data. Accordingly, a limited band frequency of a blanking area of a transmission signal can be used efficiently.

In the above embodiment, all the motion vectors have been superimposed on blanking areas of video data. Instead, for example, only effective motion vectors like motion vectors with a small macro block differential may be superimposed on the blanking areas of video data. Accordingly, when dealing with MPEG-4 or the like that performs compression highly efficiently using motion vectors from a plurality of videos, a limited band frequency of a blanking area of a transmission signal can be used efficiently.

Instead of the reproducing apparatus 201 transmitting video data and the like to the display apparatus 231, it is possible for the CPU 51 of the display apparatus 231 to conversely transmit a control signal to the reproducing apparatus 201. Accordingly, the reproducing apparatus 201 may receive the control signal and instruct to start reproduction, confirm whether reference control information can be transmitted, instruct whether reception thereof is possible, or instruct a transmission data amount. For example, since an apparatus conforming to an HDMI standard is capable of transmitting a control signal for bidirectional control of a CEC protocol as described above, a control signal may be transmitted to the reproducing apparatus 201 by the CEC protocol. Accordingly, it becomes possible to transmit reference control information or dynamically control a transmission data amount only between apparatuses to which this embodiment is applied.

Even when the display apparatus 231 receives video data while displaying a video other than that received video data, the separation unit 235 may separate reference control information from that input video data. The display apparatus 231 only needs to record the video data to which an identifier indicating a form of a predictive compensation and an identifier indicating a display order are added in the video buffer 164 and record a motion vector in the motion vector buffer 165. Accordingly, when executing high-frame-rating of the input video data and displaying it thereafter, the display apparatus 231 can readily display the video since there is no need to wait for a delay time represented by T1 in FIG. 25.

The identifier indicating a display order does not need to be contained in the reference control information when an order of decoding compression-coded video data and a display order of decoded pictures are the same or when a display order of pictures decoded by the display apparatus 231 are known unambiguously. Further, the identifier indicating a form of a predictive compensation does not need to be contained in the reference control information when the form of a predictive compensation of each picture (e.g., which of I picture, P picture, and B picture that is) is apparent from motion vectors themselves.

It should be noted that the "frame" of video described heretofore conceptually includes a "field". For example, an allowable data amount in the judgment processing of Step 32 shown in FIG. 28 may be set as an allowable data amount for one frame or each of a plurality of frames.

BRIEF DESCRIPTION OF DRAWINGS

FIG. 3 A diagram showing a structural example of an HDMI(R) source and an HDMI(R) sink.

FIG. 4 A diagram showing a Type-A connector pin assignment of an HDMI(R).

FIG. 5 A diagram showing a Type-C connector pin assignment of the HDMI(R).

FIG. 9 A diagram showing a Vender Specific data structure.

Figure 1:
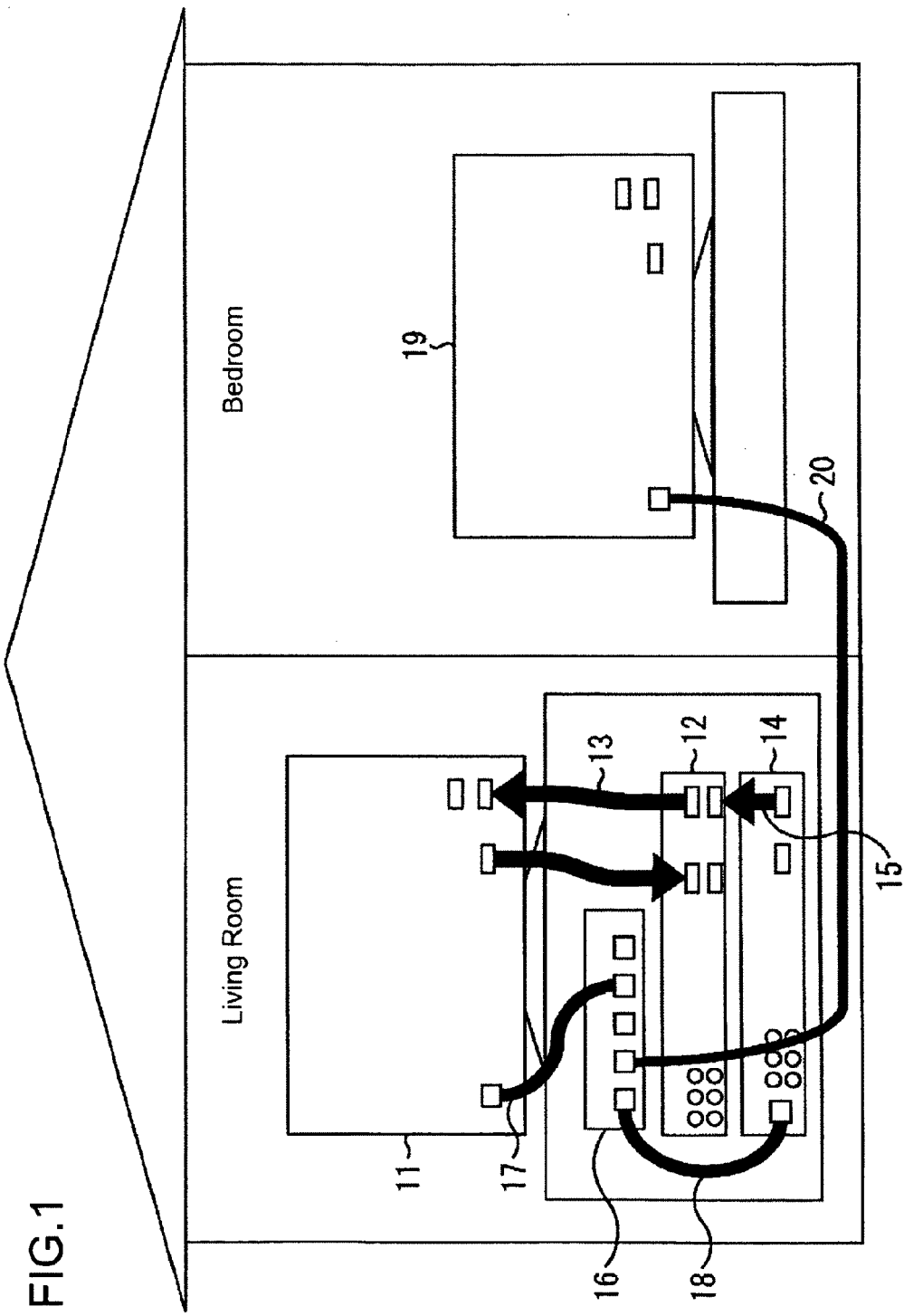
FIG. 1 A diagram showing a structure of a general picture transmission system.
Figure 2:
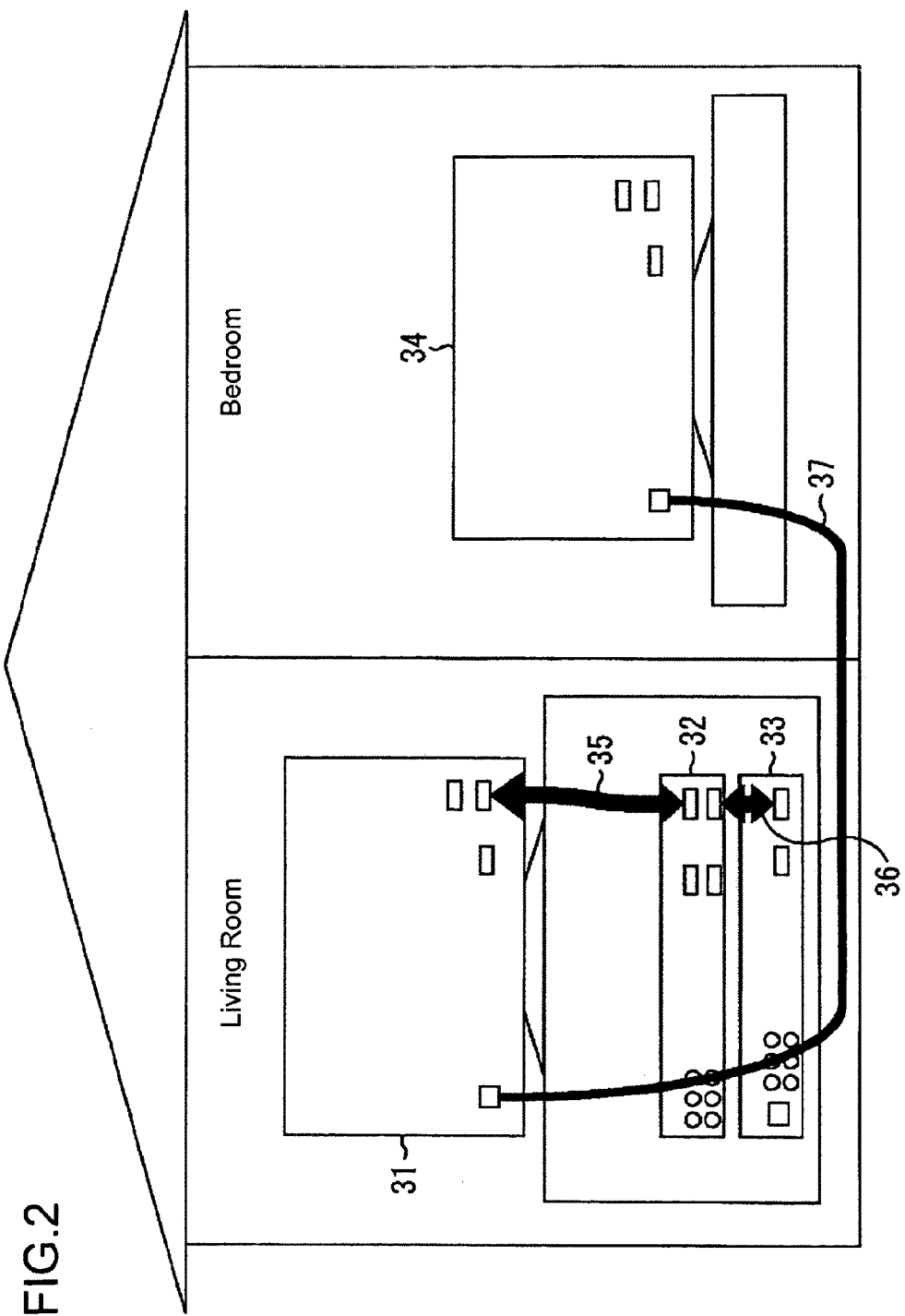
FIG. 2 A diagram showing a structure of a picture transmission system according to an embodiment to which the present invention is applied.
Figure 6:
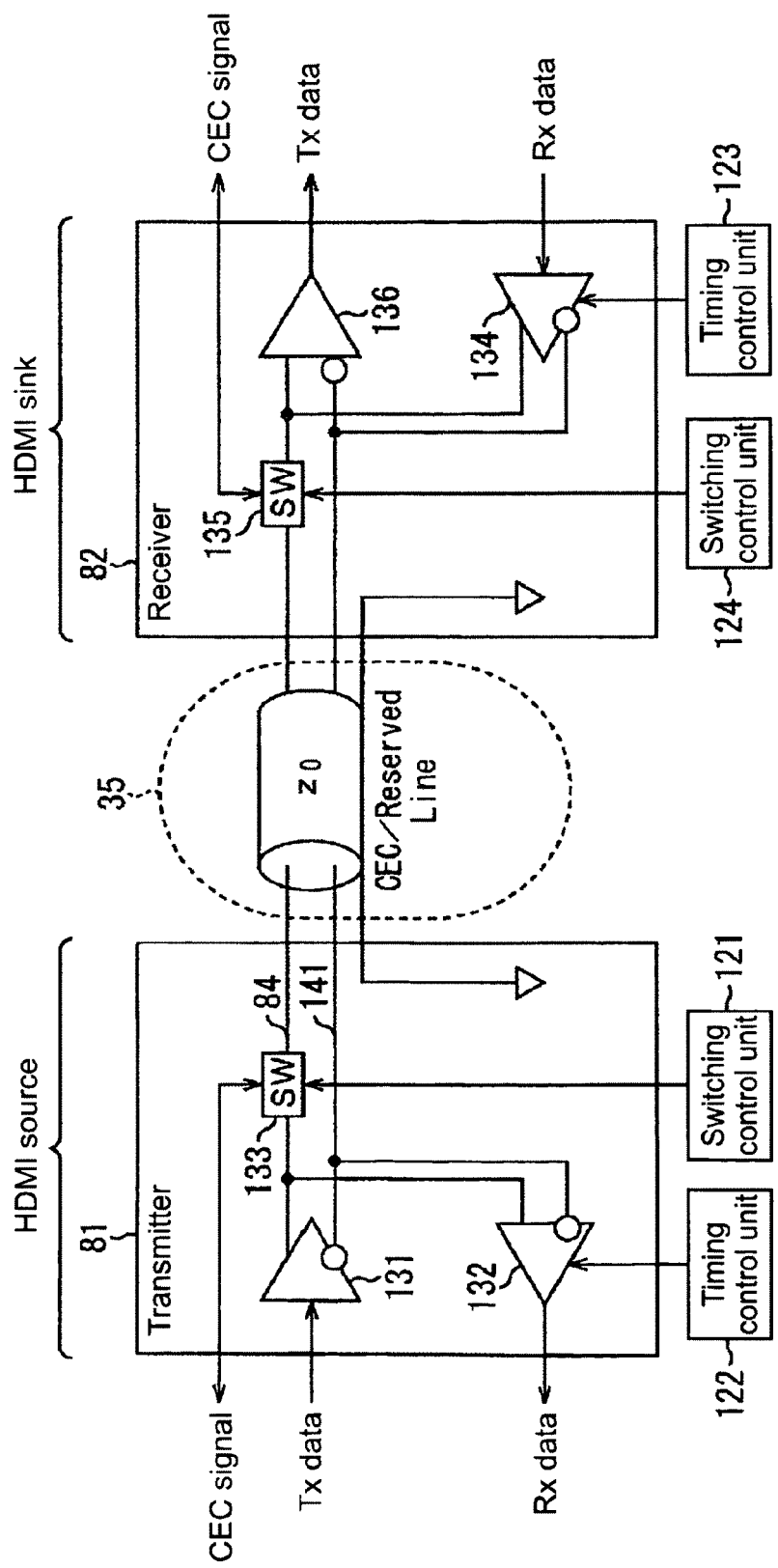
FIG. 6 A diagram showing a more-specific structural example of the HDMI(R) source and the HDMI(R) sink.
Figure 7:
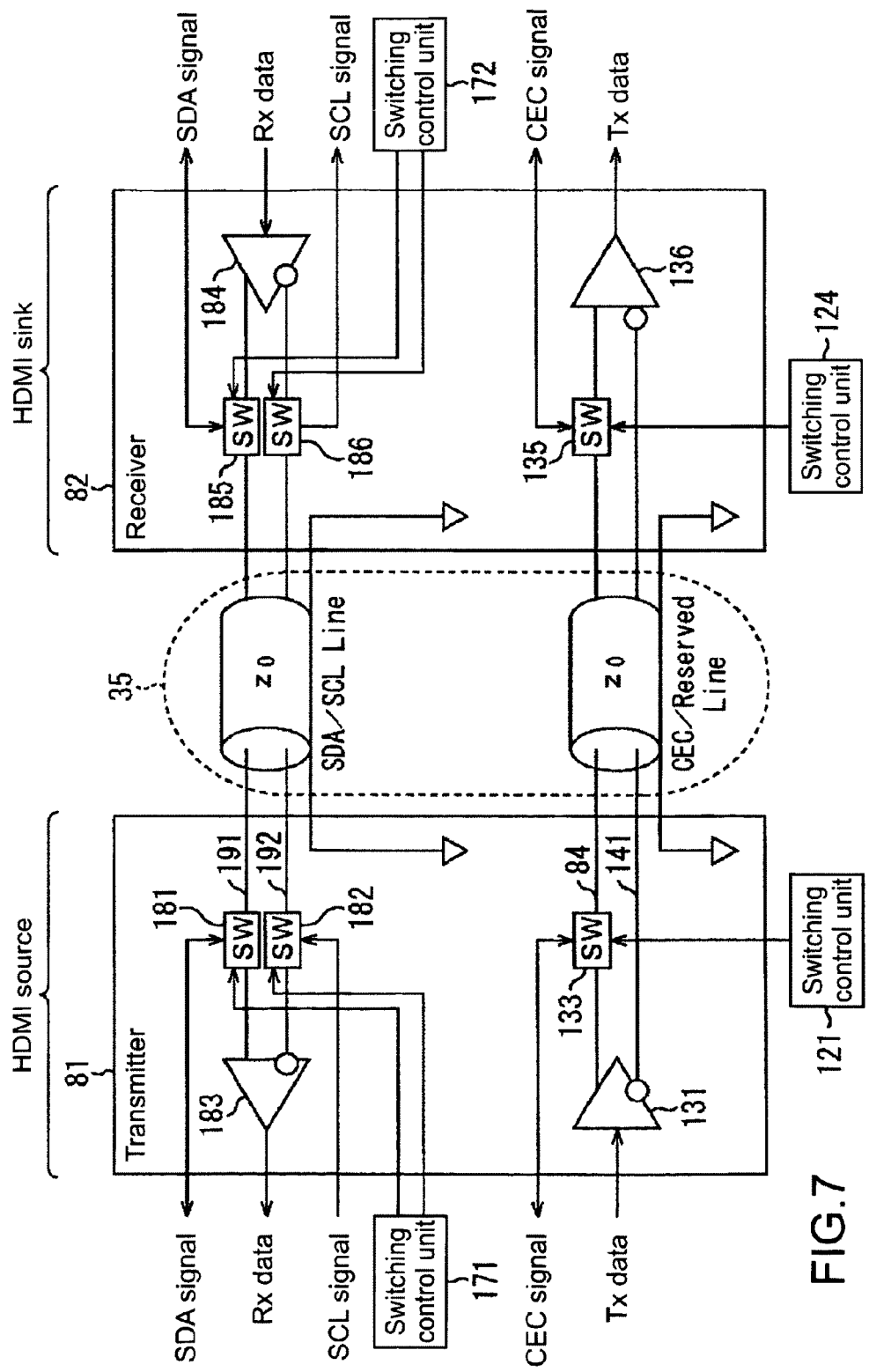
FIG. 7 A diagram showing another more-specific structural example of the HDMI(R) source and the HDMI(R) sink.
Figure 8:
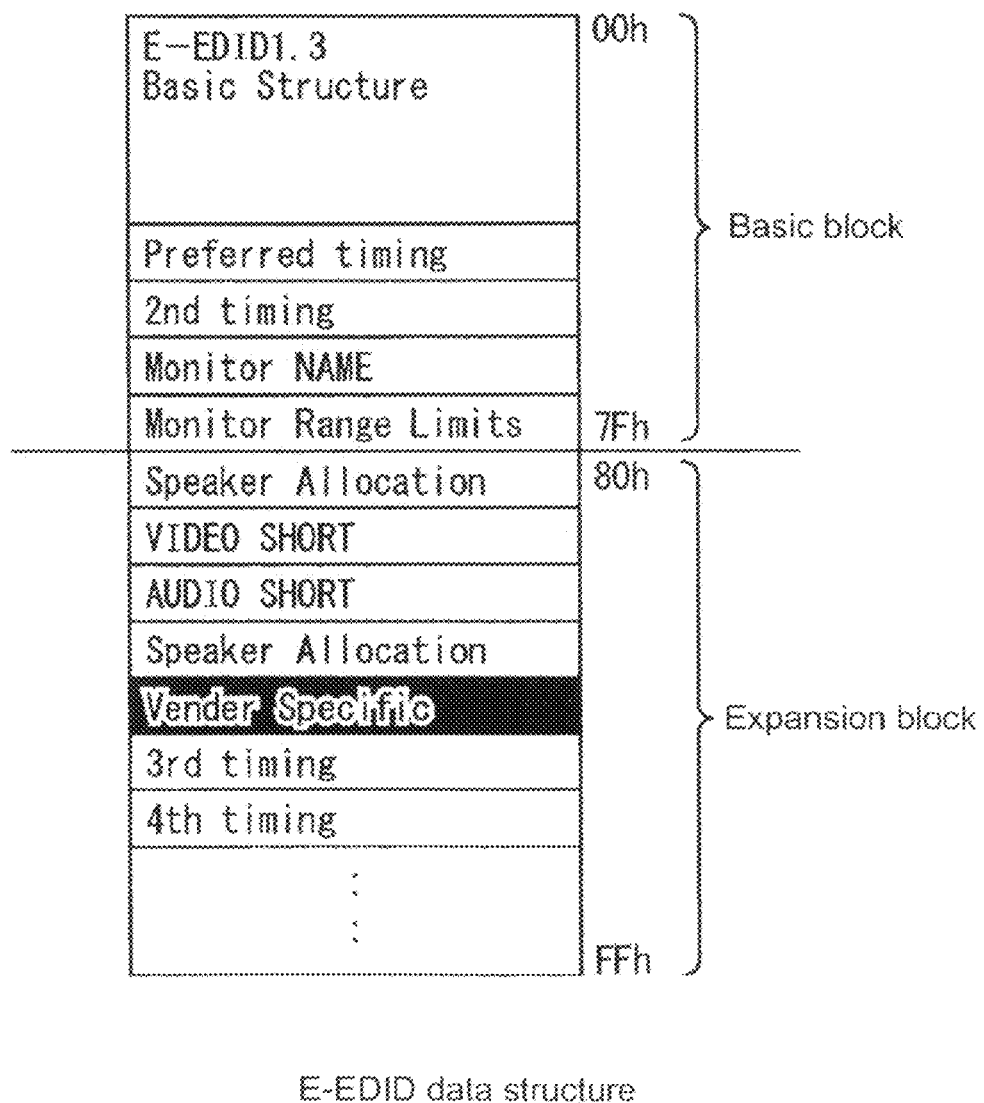
FIG. 8 A diagram showing an E-EDID data structure.
Figure 10:
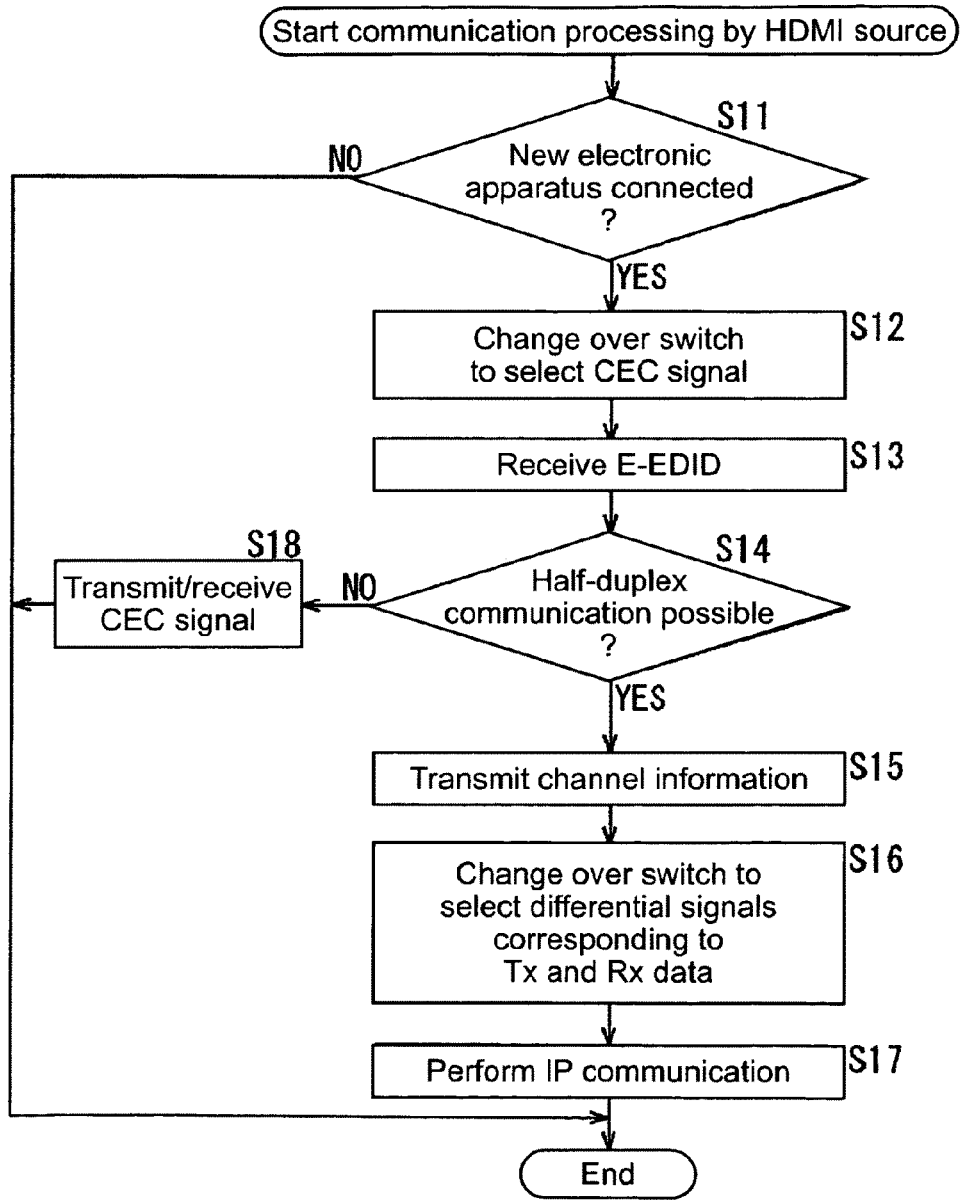
FIG. 10 A flowchart for explaining communication processing by the HDMI(R) source.
Figure 11:
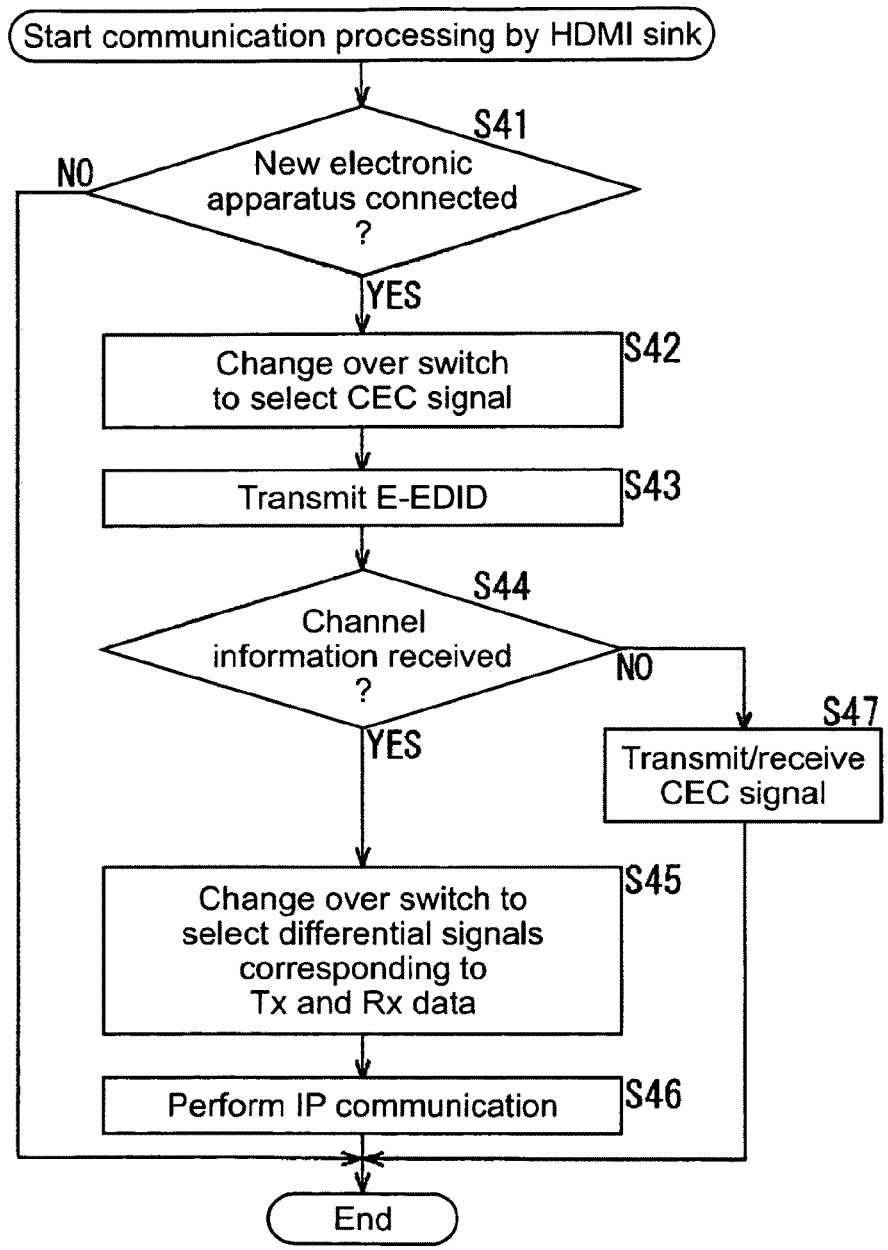
FIG. 11 A flowchart for explaining communication processing by the HDMI(R) sink.
Figure 12:
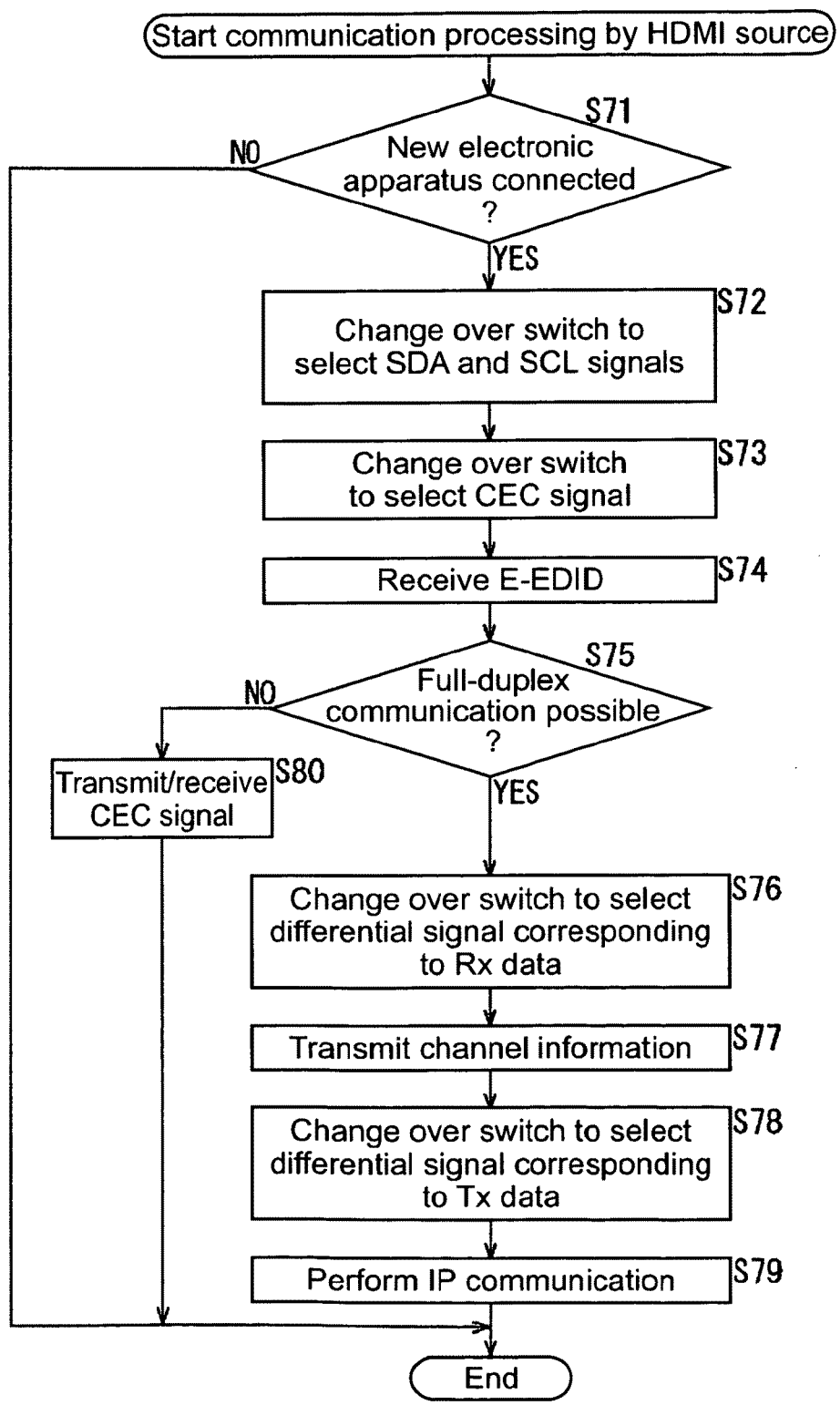
FIG. 12 A flowchart for explaining communication processing by the HDMI(R) source.
Figure 13:
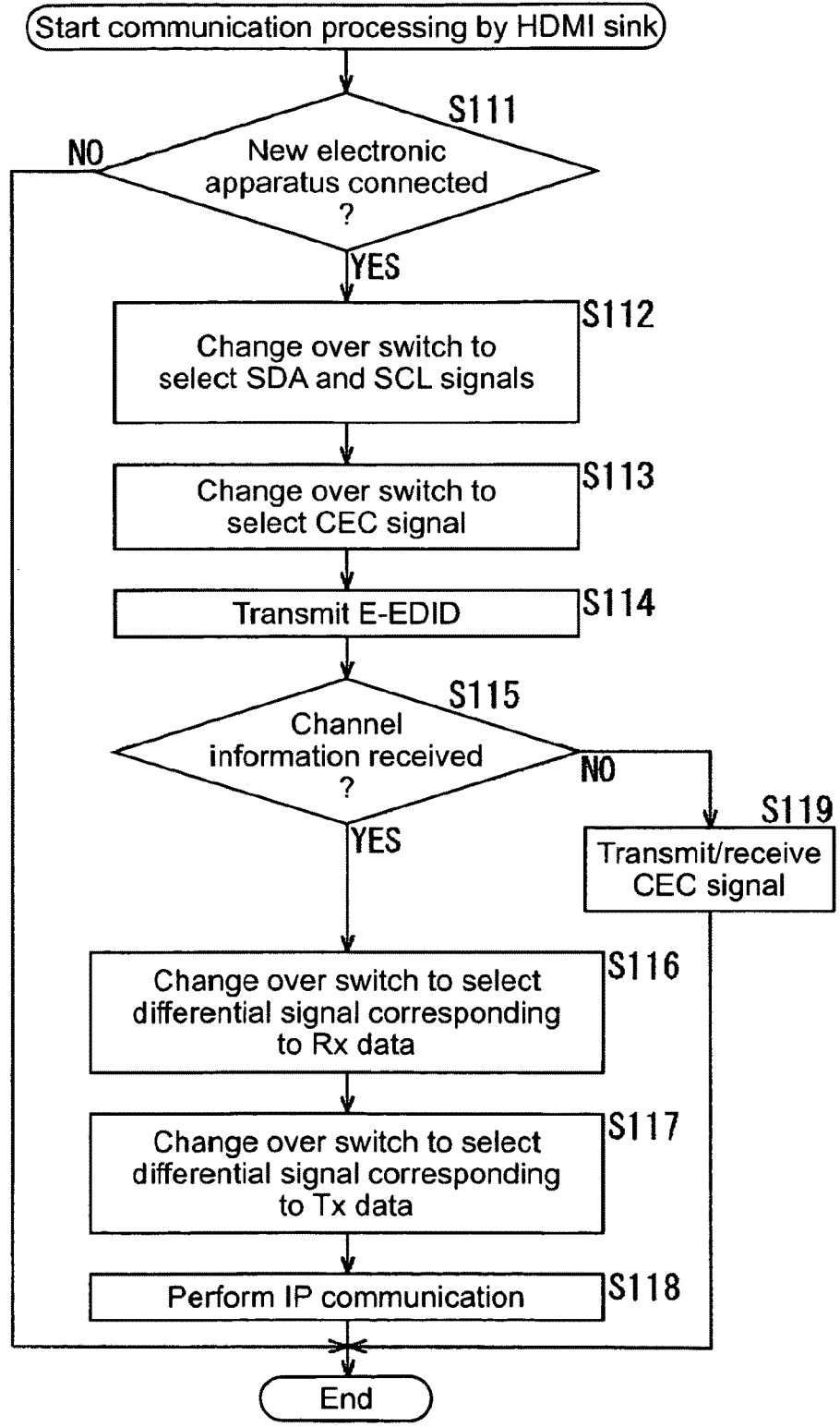
FIG. 13 A flowchart for explaining communication processing by the HDMI(R) sink.
Figure 14:
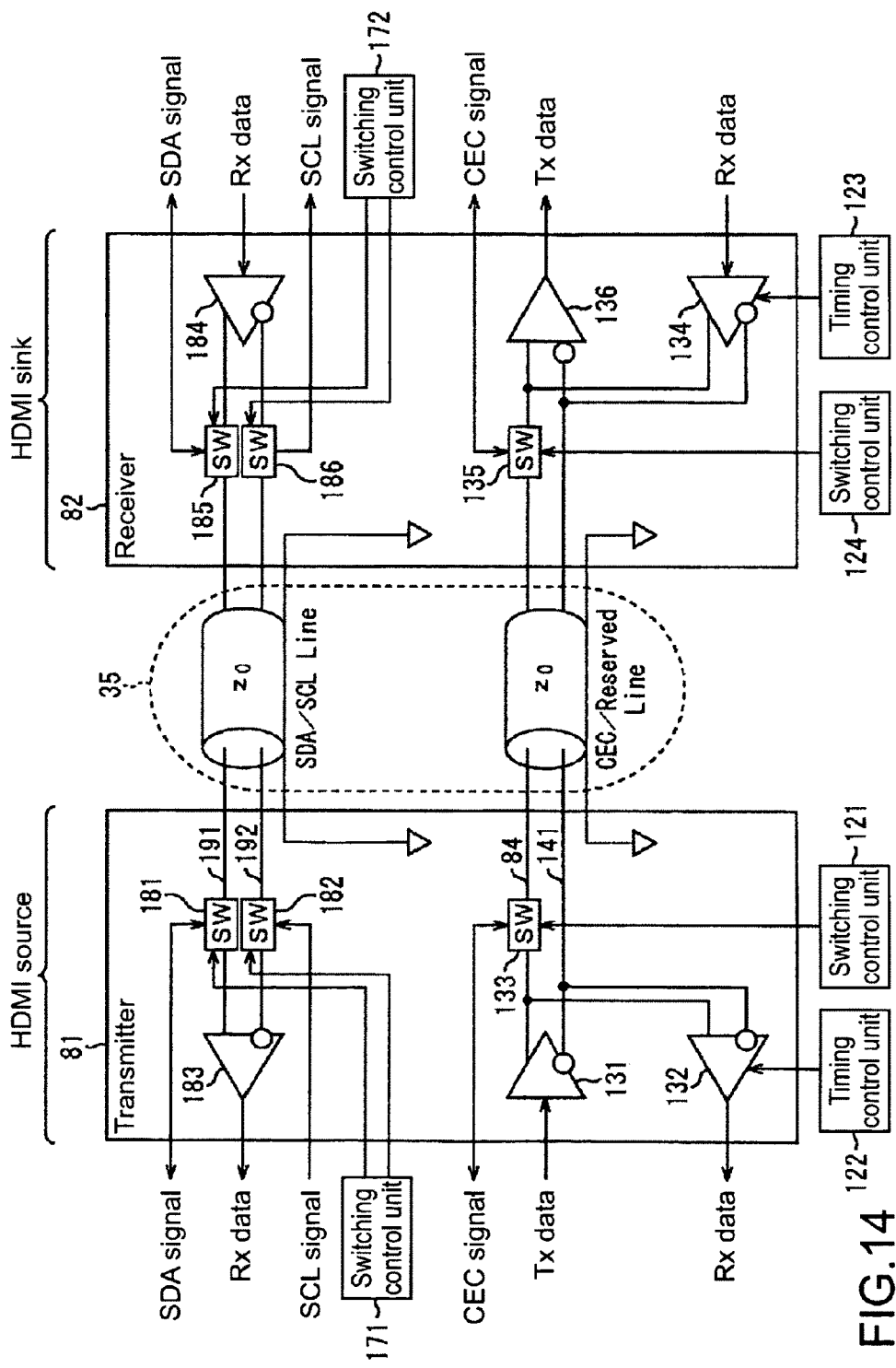
FIG. 14 A diagram showing another more-specific structural example of the HDMI(R) source and the HDMI(R) sink.
Figure 15:
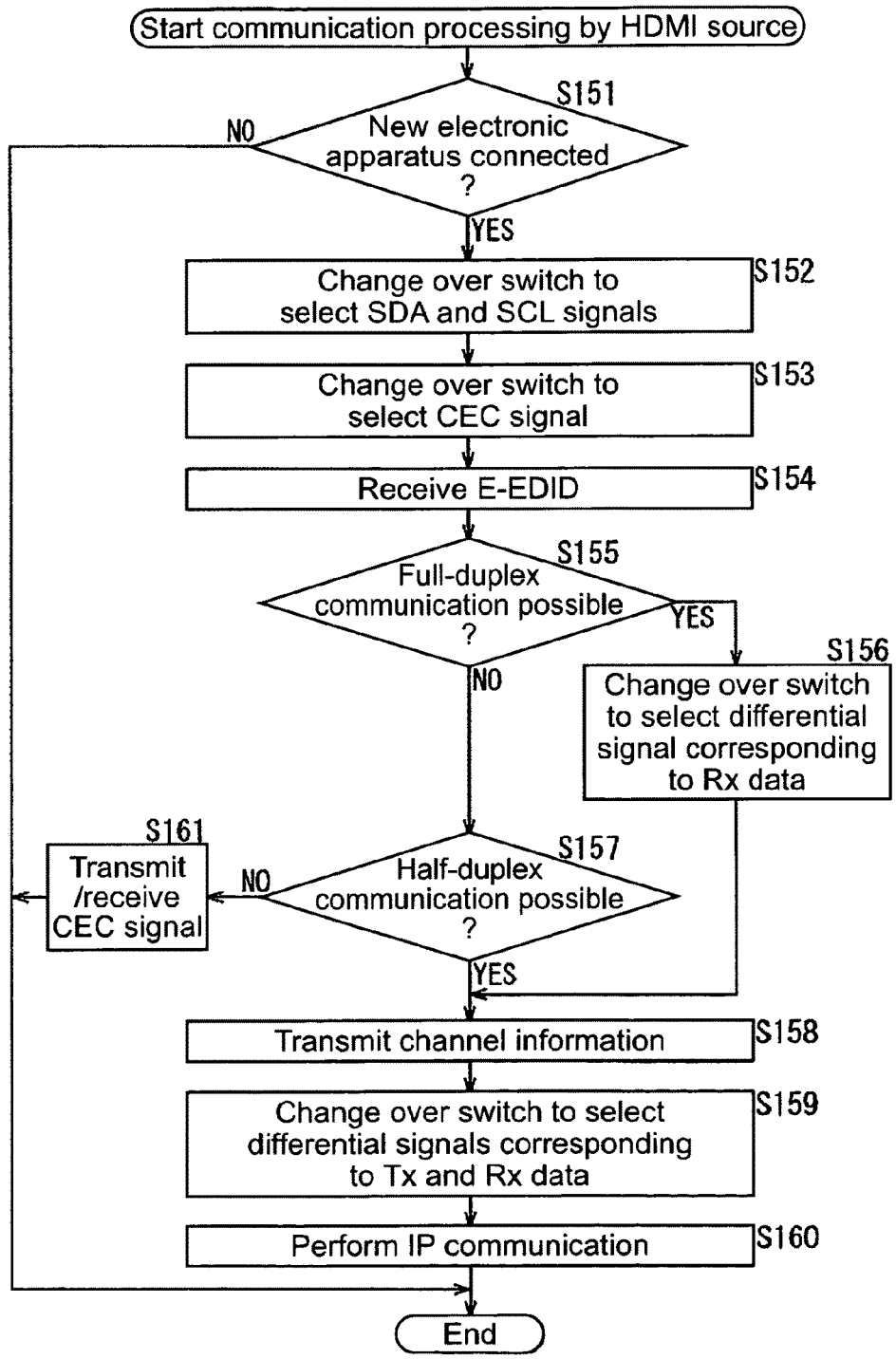
FIG. 15 A flowchart for explaining communication processing by the HDMI(R) source.
Figure 16:
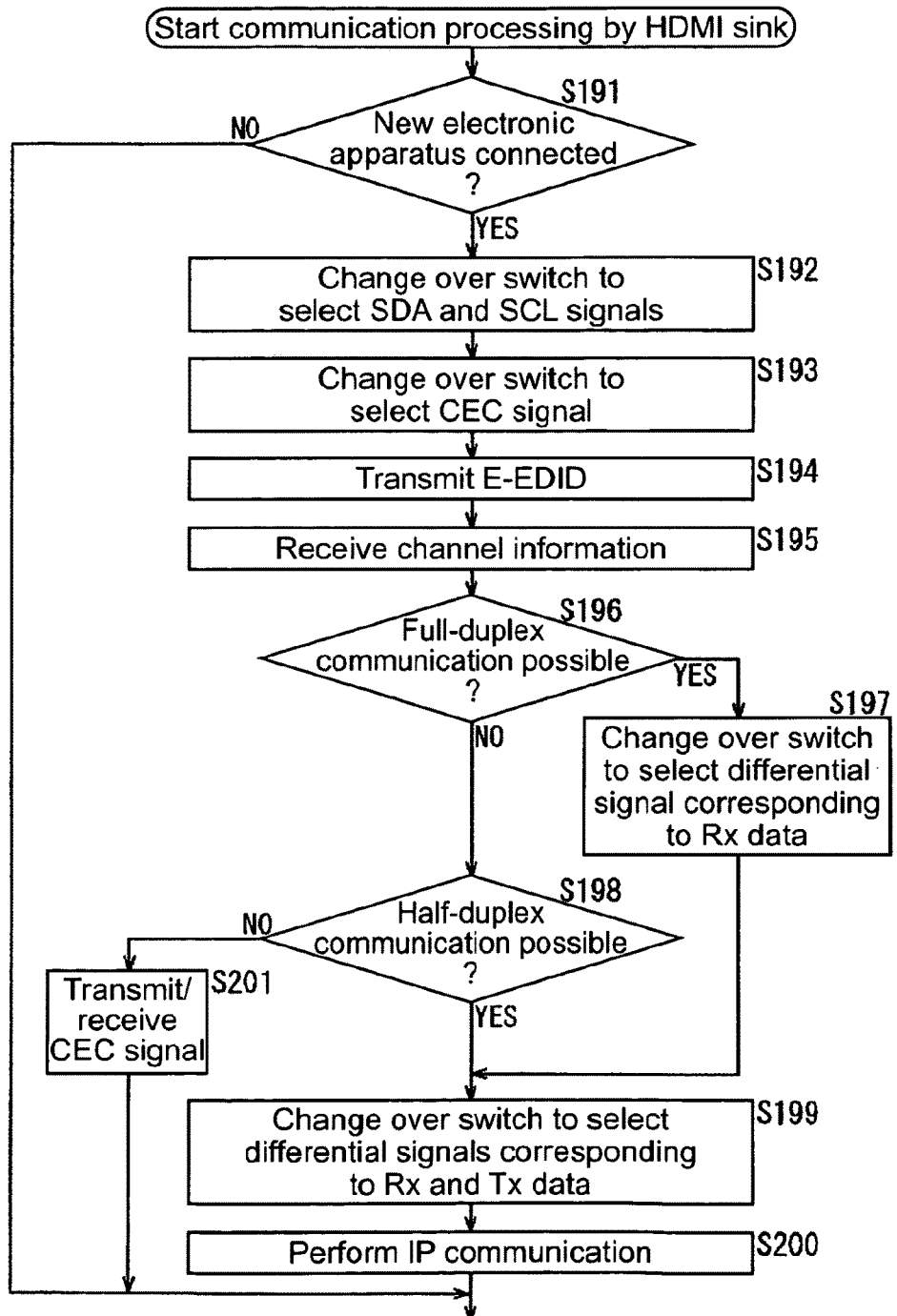
FIG. 16 A flowchart for explaining communication processing by the HDMI(R) sink.
Figure 17:
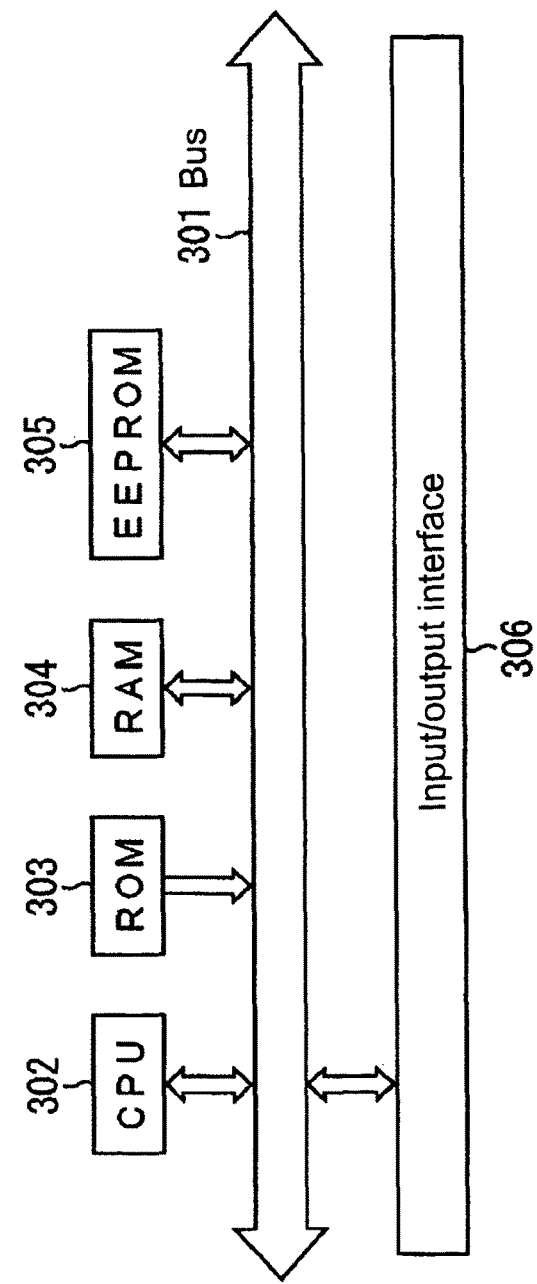
FIG. 17 A block diagram showing a structural example of a computer according to an embodiment to which the present invention is applied.
Figure 18:
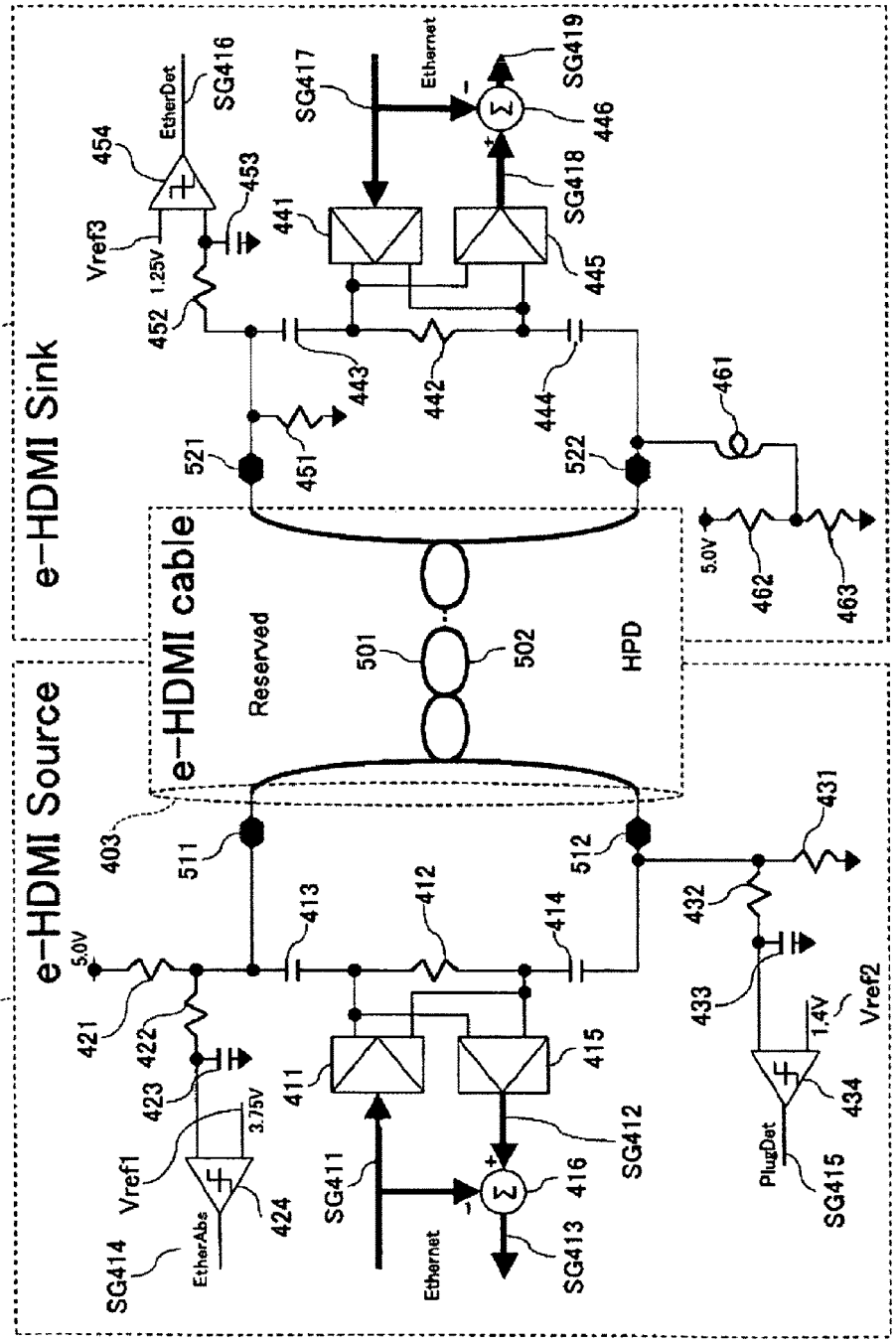
FIG. 18 A circuit diagram showing a first structural example of a communication system in which a connection state of an interface is notified based on a DC bias potential of at least one of transmission channels.
Figure 19:
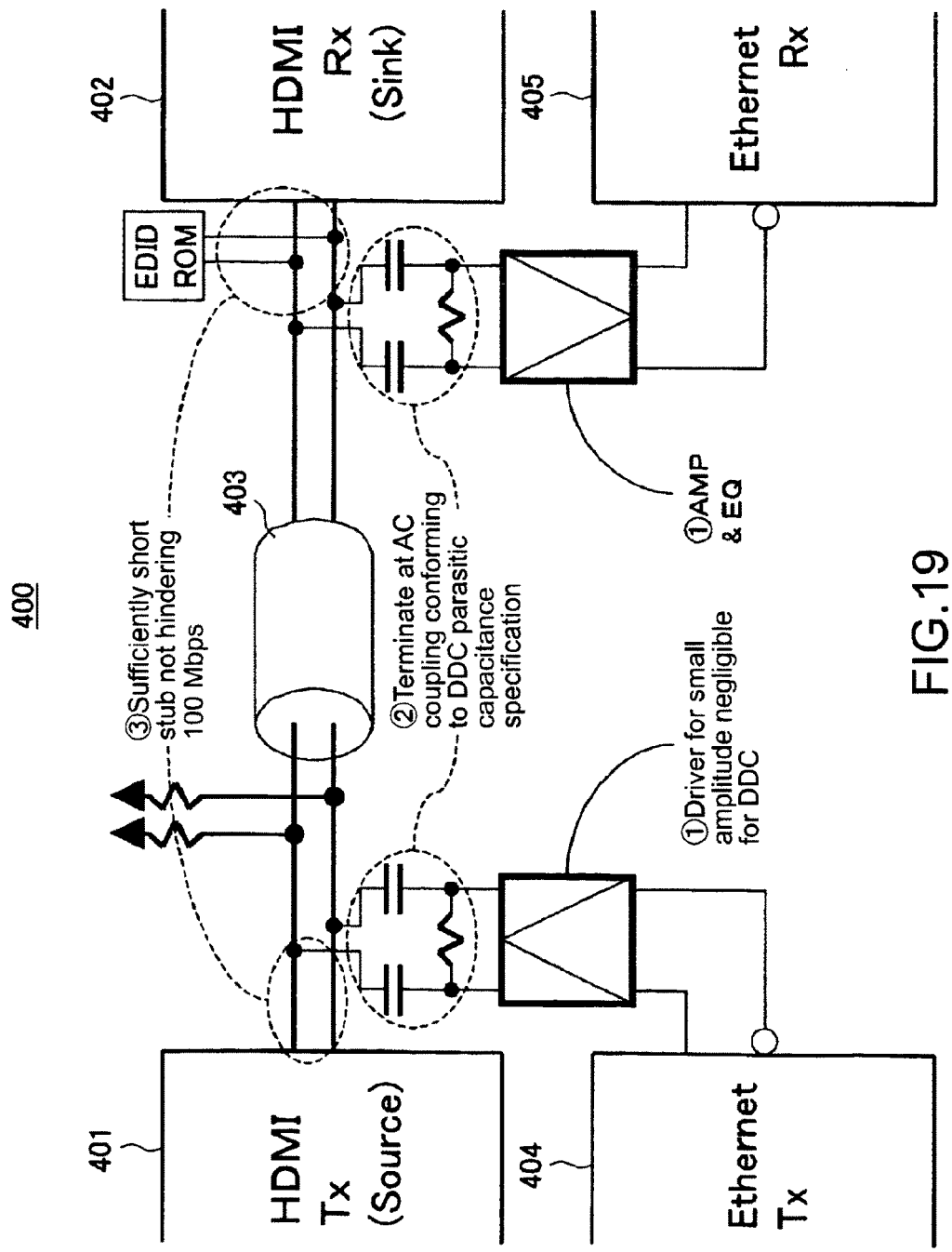
FIG. 19 A diagram showing a structural example of the system when using the Ethernet (registered trademark).
Figure 20:
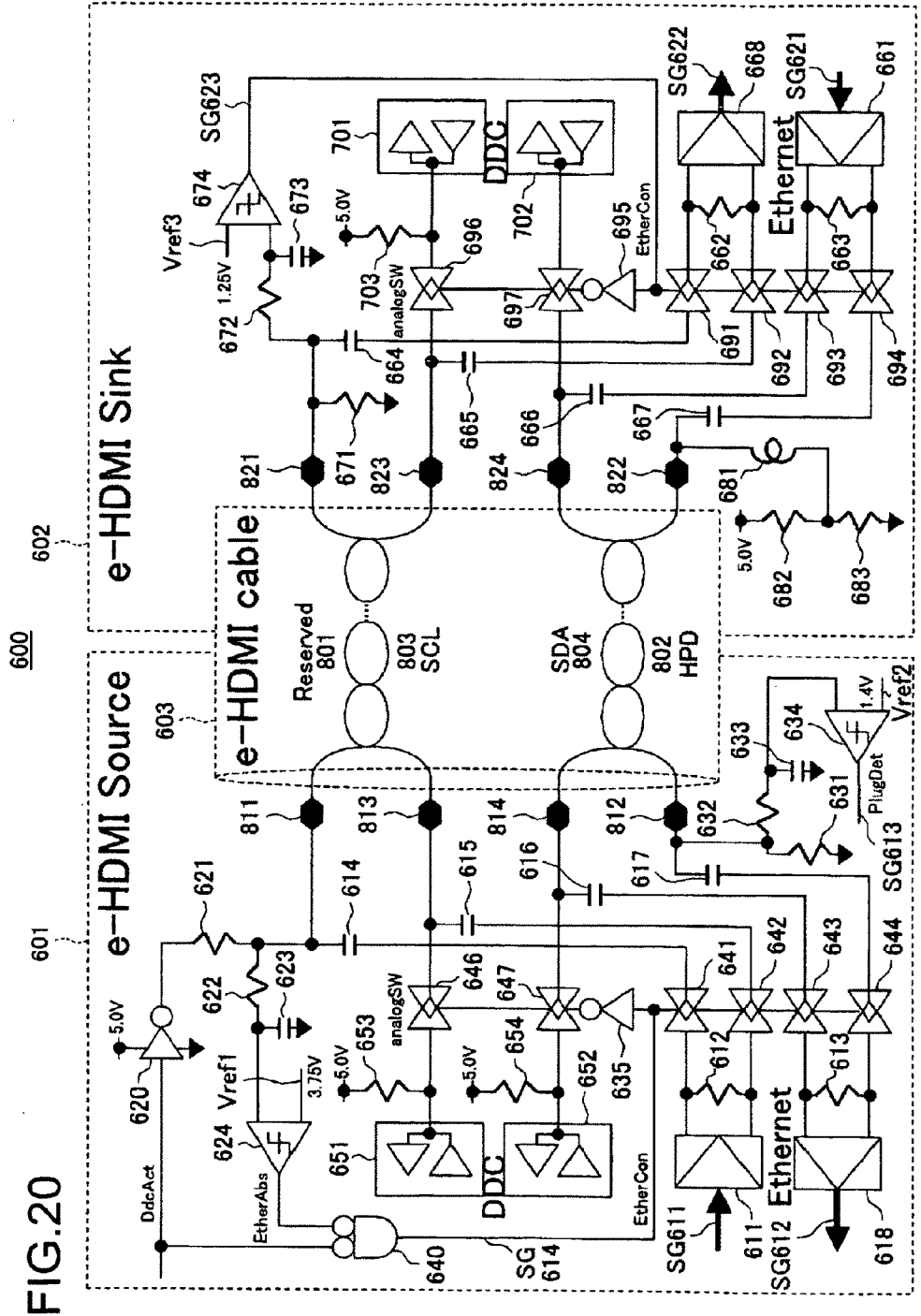
FIG. 20 A circuit diagram showing a second structural example of the communication system in which the connection state of the interface is notified based on a DC bias potential of at least one of the transmission channels.
Figure 21:
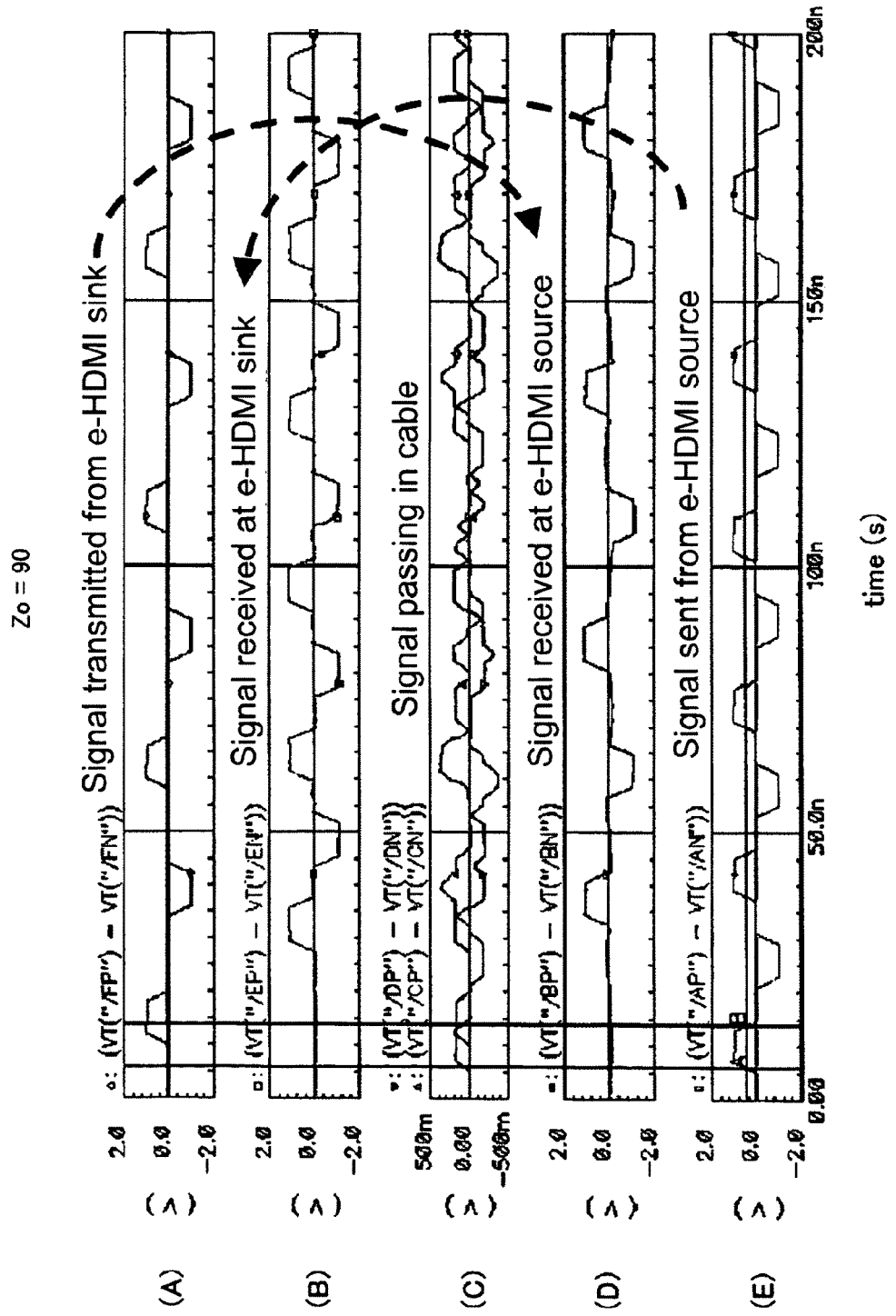
FIG. 21 A diagram showing a bidirectional communication waveform in the communication system of the structural example.
Figure 22:
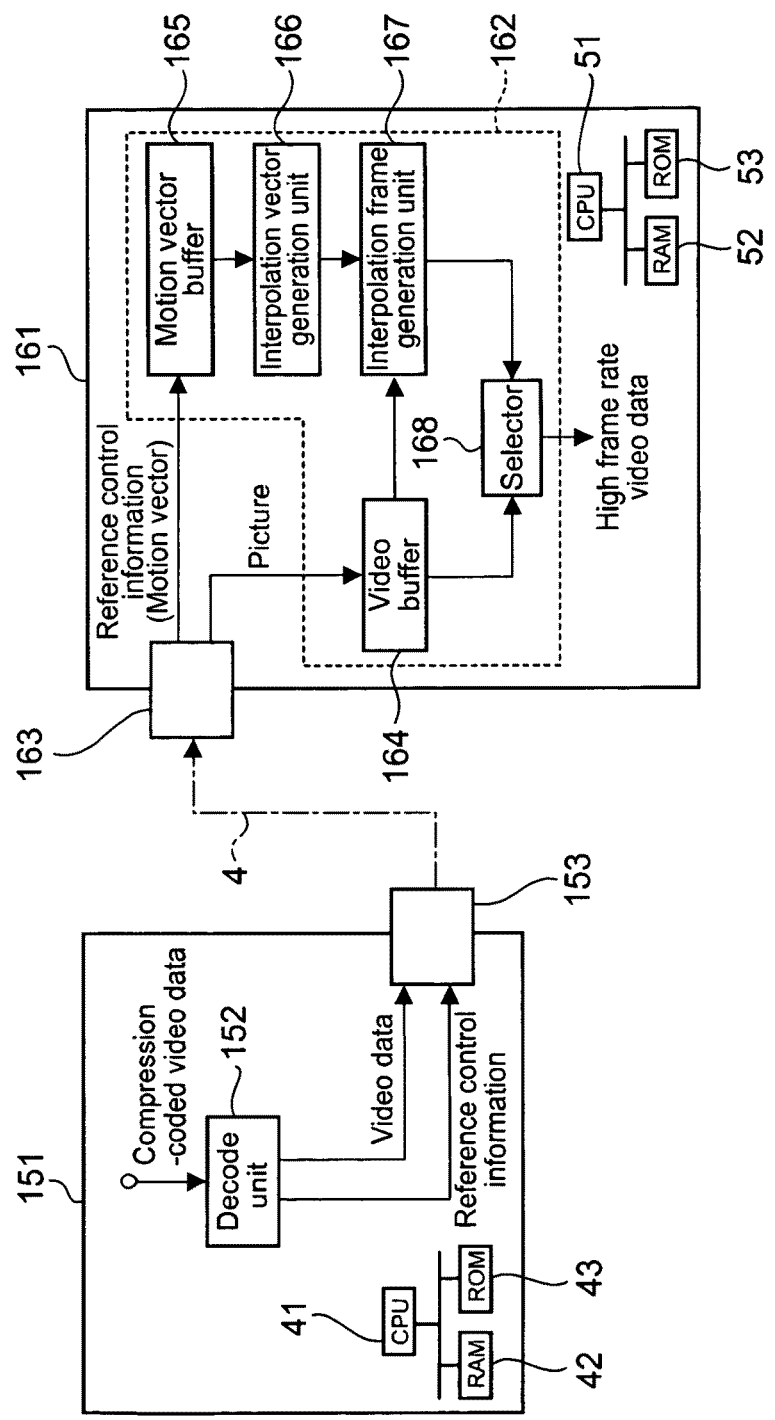
FIG. 22 A block diagram showing a structure of a frame rate conversion system according to an embodiment of the present invention.
Figure 23:
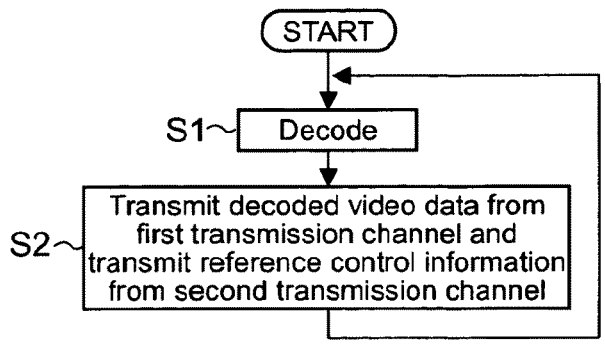
FIG. 23 A flowchart showing processing of a reproducing apparatus.
Figure 24:
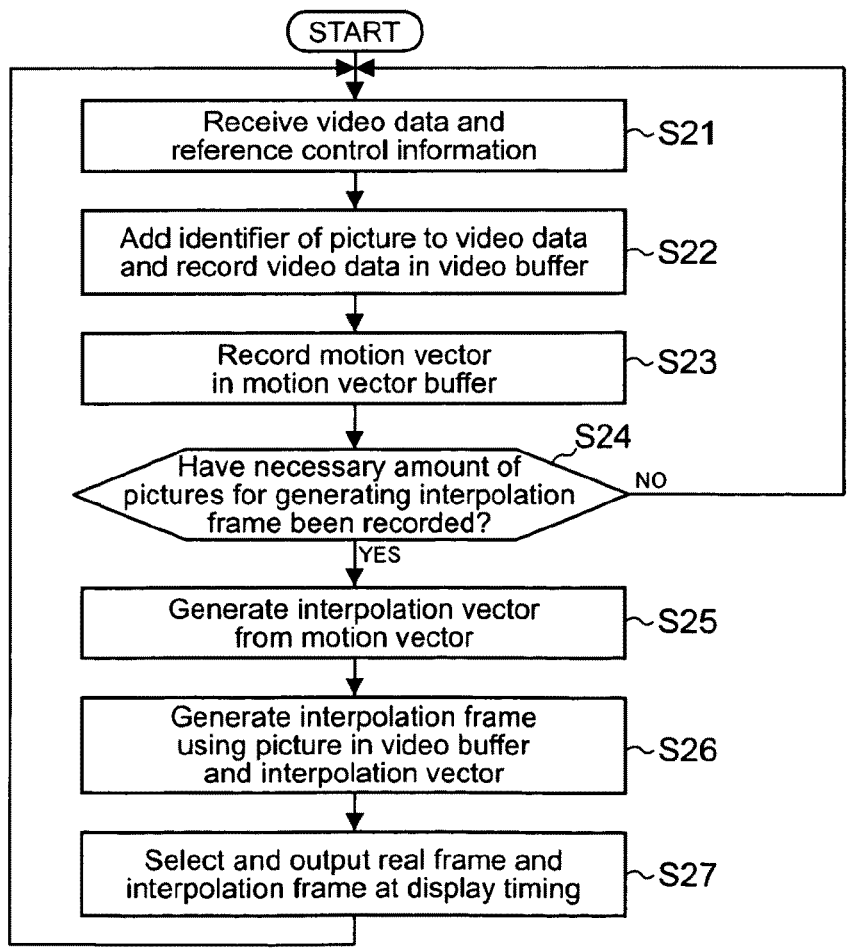
FIG. 24 A flowchart showing processing of a display apparatus.
Figure 25:
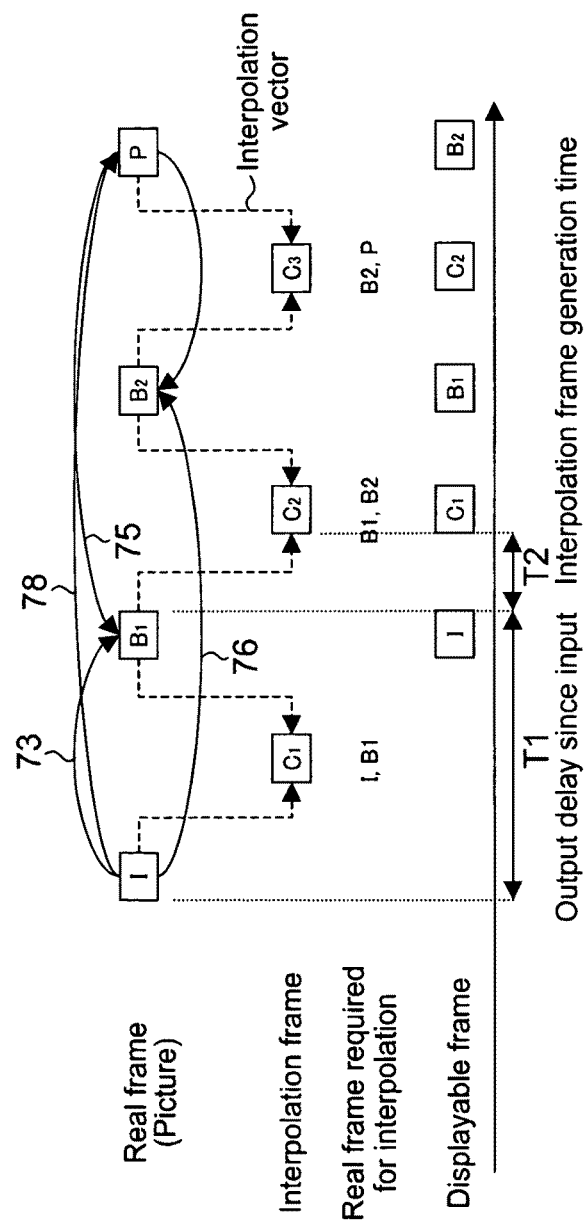
FIG. 25 A diagram exemplifying a picture necessary for generating an interpolation frame.
Figure 26:
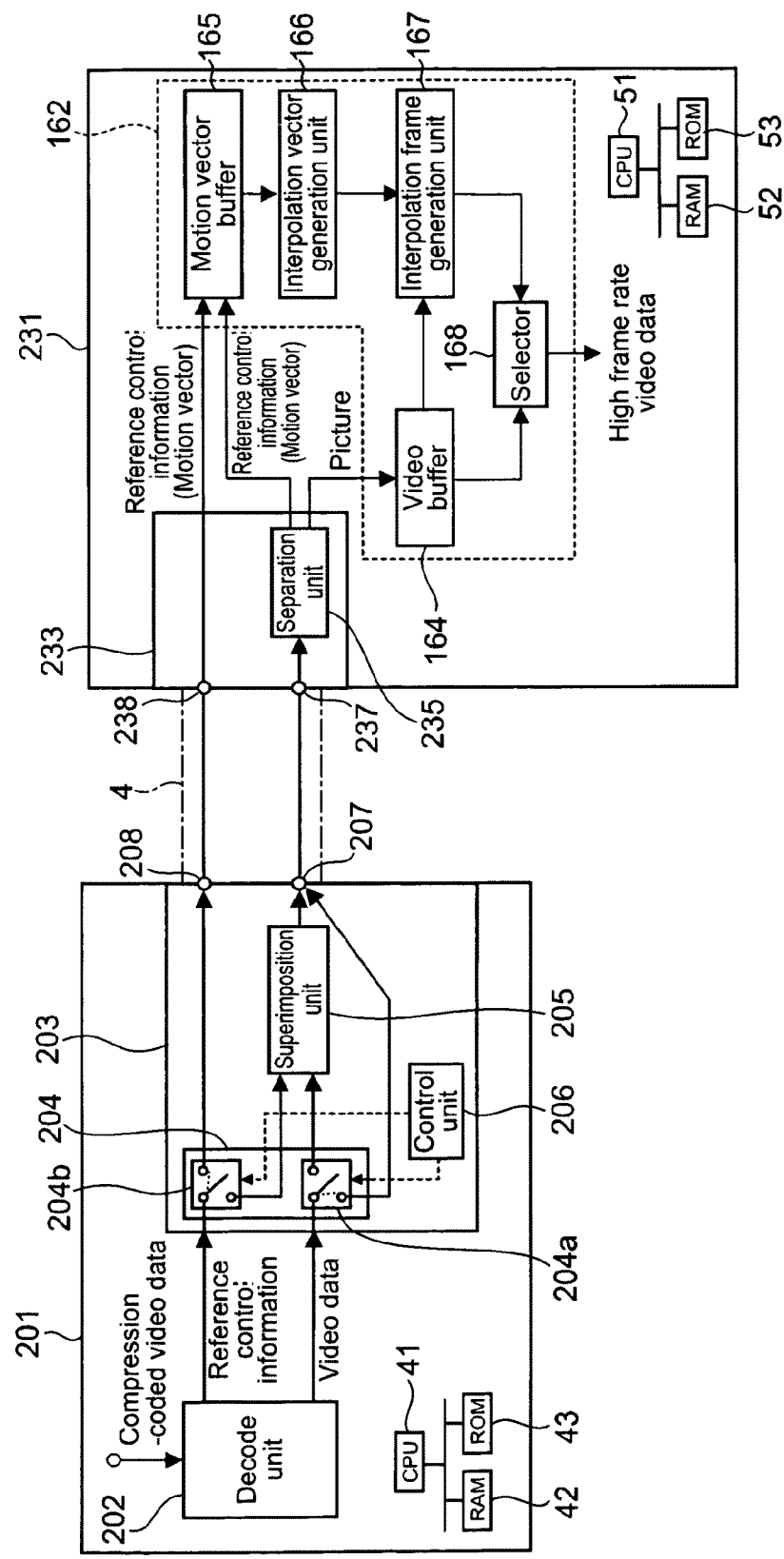
FIG. 26 A block diagram showing a structure of a frame rate conversion system according to another embodiment of the present invention.
Figure 27:
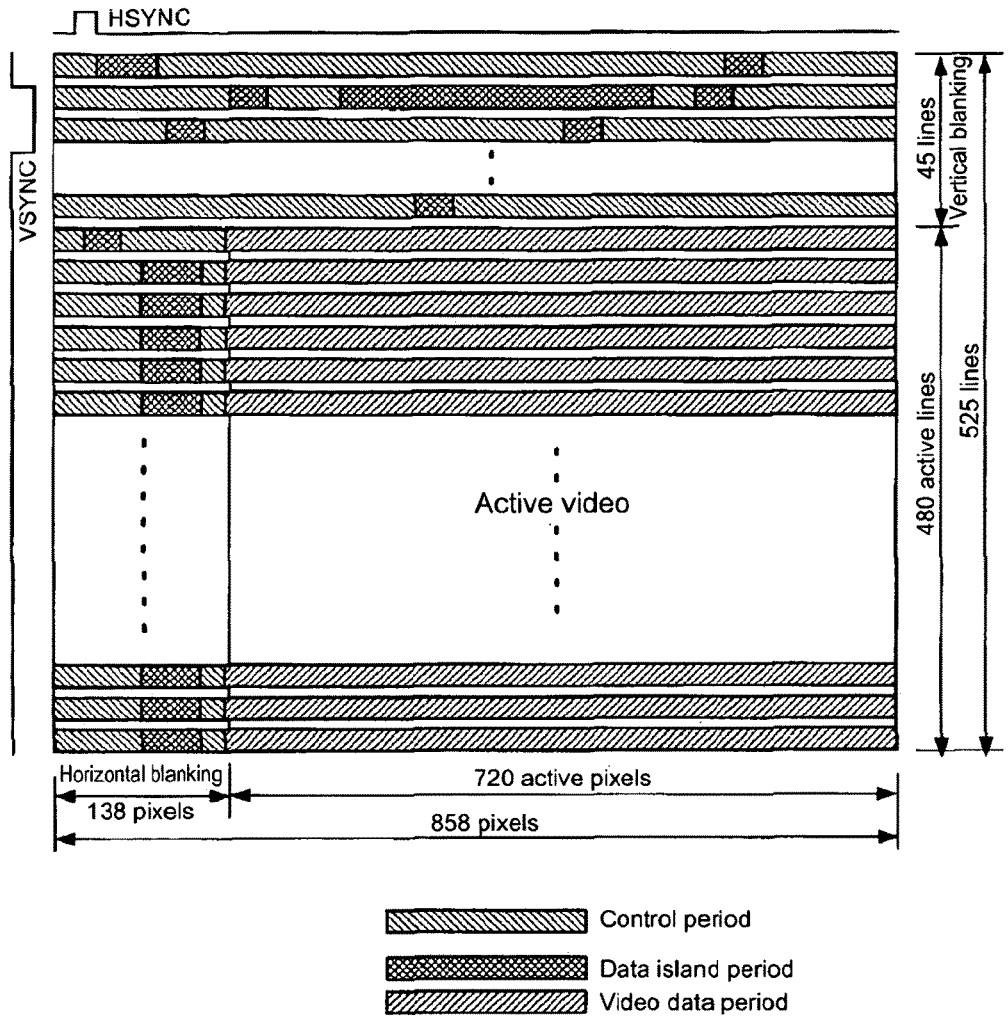
FIG. 27 A diagram showing an example of a data island period in a video frame in the HDMI.
Figure 28:
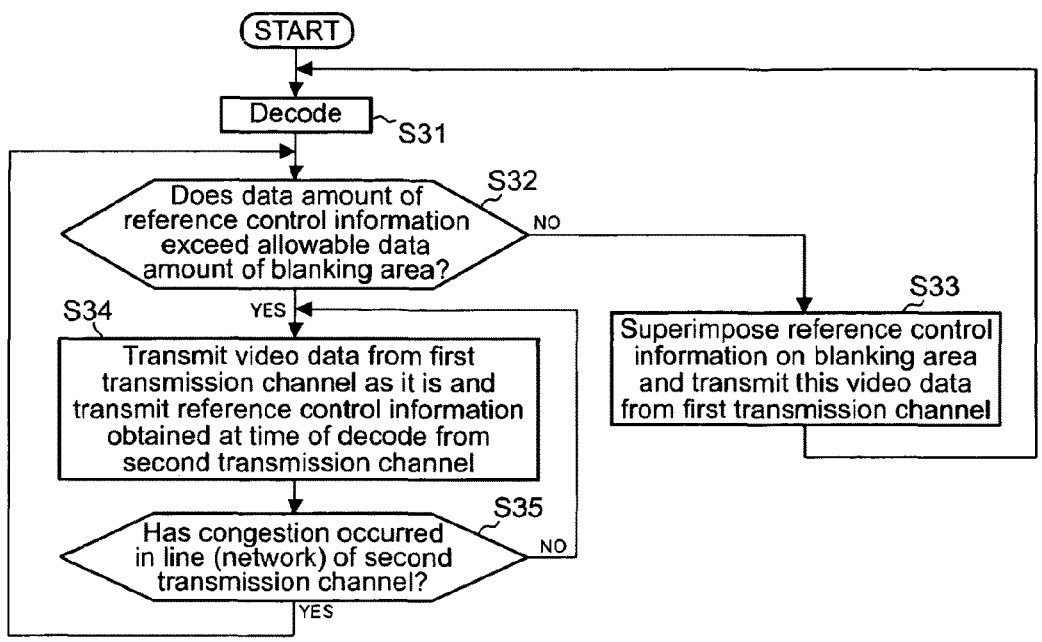
FIG. 28 A flowchart showing processing of the reproducing apparatus.
Figure 29:
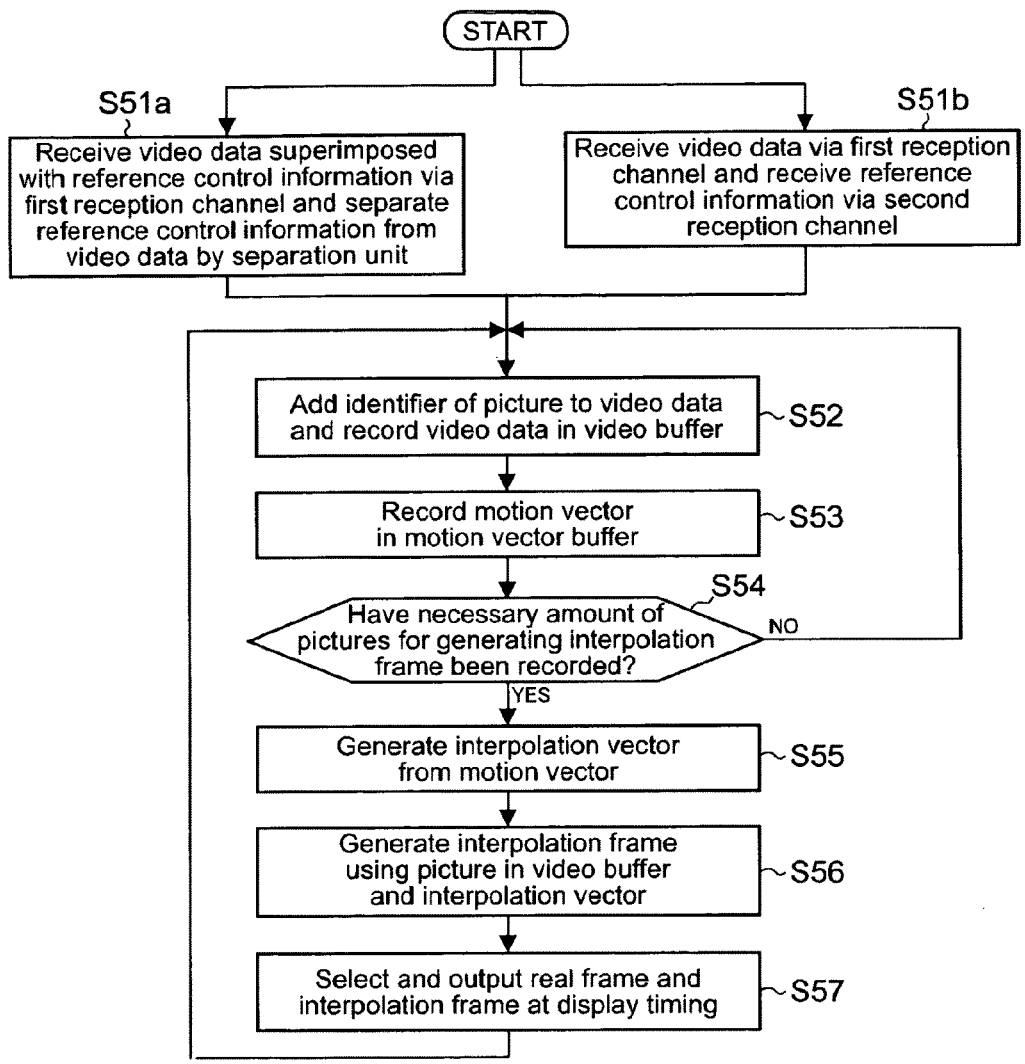
FIG. 29 A flowchart showing processing of the display apparatus.

DESCRIPTION OF REFERENCE NUMERALS 151, 201 reproducing apparatus
152, 202 decode unit
153, 203 transmission interface
161, 231 display apparatus
162 frame rate conversion unit
163, 233 reception interface
204 switch
205 superimposition unit
206 control unit
207 first transmission channel
208 second transmission channel
237 first reception channel
238 second reception channel

The invention claimed is:

1. A transmission apparatus transmitting video data to a reception apparatus, comprising:
   a decode unit to decode encoded video data encoded by a compression coding method that uses a motion vector;
   a transmission interface including a first transmission channel for transmitting the video data obtained by the decode to the reception apparatus and a second transmission channel for transmitting, to the reception apparatus, for the reception apparatus to generate an interpolation frame between frames of the video data and realize a high frame rate of the video data, reference control information that includes information on the motion vector and is obtained at a time the decode unit decodes the encoded video data,
   a superimposition unit to superimpose the reference control information on a blanking area of the video data obtained by the decode; and
   a control means for making a switch between processing of superimposing the reference control information on the blanking area by the superimposition unit and transmission processing of the reference control information from the second transmission channel.

2. The transmission apparatus according to claim 1,
   wherein the control means includes
      a judgment means for judging whether a data amount of the reference control information exceeds an allowable data amount of the reference control information that can be superimposed on the blanking area, and
      means for switching, when the data amount of the reference control information exceeds the allowable data amount, the superimposition processing by the superimposition unit to the transmission processing of the reference control information from the second transmission channel.

3. The transmission apparatus according to claim 1,
   wherein the control means includes
      a judgment means for judging whether a congestion is caused in a network between the second transmission channel and the reception apparatus, and
      means for switching, when the congestion is caused, the transmission processing of the reference control information from the second transmission channel to the superimposition processing of the reference control information by the superimposition unit.

4. The transmission apparatus according to claim 1,
   wherein the reference control information includes, in addition to the motion vector, an identifier that indicates a form of a predictive compensation and an identifier that indicates a display order of the decoded video data.

5. The transmission apparatus according to claim 1,
   wherein the transmission interface is an HDMI (High Definition Multimedia Interface).

6. The transmission apparatus according to claim 5,
   wherein the second transmission channel corresponds to at least one line out of a reserved line, an HPD (Hot-Plug Detect) line, an SCL (Serial Clock) line, and an SDA (Serial Data) line of the HDMI.

7. A transmission apparatus transmitting video data to a reception apparatus, comprising:
   a decode unit to decode encoded video data encoded by a compression coding method that uses a motion vector;
   a transmission interface including a first transmission channel for transmitting the video data obtained by the decode to the reception apparatus and a second transmission channel for transmitting, to the reception apparatus, for the reception apparatus to generate an interpolation frame between frames of the video data and realize a high frame rate of the video data, reference control information that includes information on the motion vector and is obtained at a time the decode unit decodes the encoded video data;
   a superimposition unit to superimpose the reference control information on a blanking area of the video data obtained by the decode;
   a judgment means for judging whether a data amount of the reference control information exceeds an allowable data amount of the reference control information that can be superimposed on the blanking area; and
   a control means for switching, when the data amount of the reference control information exceeds the allowable data amount, superimposition processing by the superimposition unit to transmission processing of the reference control information from the second transmission channel.

8. The transmission apparatus according to claim 7, further comprising
   a network judgment means for judging whether a congestion is caused in a network between the second transmission channel and the reception apparatus,
   wherein the control means switches, when the congestion is caused, the transmission processing of the reference control information from the second transmission channel to the superimposition processing of the reference control information by the superimposition unit.

9. A frame rate conversion system, comprising:
   a transmission apparatus including
      a decode unit to decode encoded video data encoded by a compression coding method that uses a motion vector,
      a transmission interface including a first transmission channel for transmitting the video data obtained by the decode and a second transmission channel for transmitting reference control information that includes information on the motion vector and is obtained at a time the decode unit decodes the encoded video data,
      a superimposition unit to superimpose the reference control information on a blanking area of the video data obtained by the decode, and
      a control means for making a switch between processing of superimposing the reference control information on the blanking area by the superimposition unit and transmission processing of the reference control information from the second transmission channel; and a reception apparatus including
- a reception interface that includes a first reception channel for receiving the transmitted video data and a second reception channel for receiving the transmitted reference control information, and
- receives, when the reference control information is superimposed by the superimposition unit on a blanking area of the video data and the video data on which the reference control information is superimposed is transmitted via the first transmission channel, the video data on which the reference control information is superimposed using the first reception channel,
- a separation unit to separate the reference control information from the blanking area of the video data, and
- a frame rate conversion unit to generate an interpolation from between frames of the received video data using the reference control information obtained by the second reception channel and the separation unit to thus realize a high frame rate of the video data.

10. A frame rate conversion method, comprising:

decoding, by a transmission apparatus including a transmission interface, encoded video data encoded by a compression coding method that uses a motion vector;

superimposing, by the transmission apparatus, the reference control information on a blanking area of the video data obtained by the decode;

transmitting, by the transmission apparatus, the video data obtained by the decode from a first transmission channel of the transmission interface;

transmitting, by the transmission apparatus, the reference control information that includes information on the motion vector and is obtained at a time the decode unit decodes the encoded video data, from a second transmission channel of the transmission interface;

making, by the transmission apparatus, a switch between processing of superimposing the reference control information on the blanking area and transmission processing of the reference control information from the second transmission channel;

receiving, by a reception apparatus including a reception interface, the transmitted video data using a first reception channel of the reception interface;

receiving, by the reception apparatus, the transmitted reference control information using a second reception channel of the reception interface;

receiving, by the reception apparatus, when the reference control information is superimposed on the blanking area of the video data and the video data on which the reference control information is superimposed is transmitted via the first transmission channel, the video data on which the reference control information is superimposed using the first reception channel;

separating, by the reception apparatus, the reference control information from the blanking area of the video data; and generating, by the reception apparatus, an interpolation frame between frames of the received video data using the reference control information obtained by the second reception channel and the separation unit to thus realize a high frame rate of the video data.

* * * * *